US007844368B2

(12) United States Patent
Alexanian

(10) Patent No.: US 7,844,368 B2
(45) Date of Patent: *Nov. 30, 2010

(54) IRRIGATION WATER CONSERVATION WITH TEMPERATURE BUDGETING AND TIME OF USE TECHNOLOGY

(76) Inventor: George Alexanian, 4761 W. Jacquelyn Ave., Fresno, CA (US) 93722

( * ) Notice: Subject to any disclaimer, the term of this patent is extended or adjusted under 35 U.S.C. 154(b) by 569 days.

This patent is subject to a terminal disclaimer.

(21) Appl. No.: 11/879,700

(22) Filed: Jul. 17, 2007

(65) Prior Publication Data

US 2007/0293990 A1   Dec. 20, 2007

Related U.S. Application Data

(63) Continuation-in-part of application No. 11/336,690, filed on Jan. 20, 2006, now Pat. No. 7,266,428, which is a continuation-in-part of application No. 10/824,667, filed on Apr. 13, 2004, now Pat. No. 7,058,478.

(60) Provisional application No. 60/465,457, filed on Apr. 25, 2003, provisional application No. 60/831,904, filed on Jul. 20, 2006, provisional application No. 60/899,200, filed on Feb. 1, 2007.

(51) Int. Cl.
G05D 11/00 (2006.01)
A01G 25/00 (2006.01)

(52) U.S. Cl. ...................... 700/284; 239/69

(58) Field of Classification Search ................ 700/284; 239/68–70; 137/78.2, 78.3
See application file for complete search history.

(56) References Cited

U.S. PATENT DOCUMENTS

| 3,114,243 A | 12/1963 | Winters |
| 3,372,899 A | 3/1968 | McPherson |
| 3,653,595 A | 4/1972 | Greengard |
| 3,726,477 A | 4/1973 | Shapiro |

(Continued)

OTHER PUBLICATIONS

US Department of the Interior Bureau of Reclamation Lower Colorado Region Southern CA Area Office Southern CA Area Office Temecula, CA & Rechnical Service Center Water Resources Planning Operations Support Group, Denver CO.; Weather and Soil Moisture Based Landscape Irrigantion Scheduling Devices; Reclamation Managing Water in the West, Aug. 2007; 135 pages; U.S. Department of the Interior Bureau of Reclamation Lower Colorado Region Sourthern CA area office.

(Continued)

*Primary Examiner*—M. N. Von Buhr
(74) *Attorney, Agent, or Firm*—Mark D. Miller

(57) ABSTRACT

The present invention provides numerous methods, systems and apparatus that use a novel form of water budgeting technology for water conservation without the use of complex ET (Evapotranspiration) data or methods. Embodiments include incorporating the technology directly into irrigation controllers, into modules added on to existing controllers, or into central units that broadcast a water budget that can alter the schedules of one, many, or selected groups of remotely located controllers or modules. The various methods of the present invention offer the choice of adjusting the station run times, accumulating the water budgets, altering the watering intervals, and/or combining the present water budgeting technology with local watering communities' restricted watering schedules. The result offers residential, commercial, and municipal users a wide range of practical choices for effective water conservation in landscape irrigation with temperature based water budgeting.

71 Claims, 26 Drawing Sheets

U.S. PATENT DOCUMENTS

| | | | |
|---|---|---|---|
| 3,787,728 A | 1/1974 | Bayer et al. | |
| 3,902,825 A | 9/1975 | Quillen | |
| 4,010,898 A | 3/1977 | Williams | |
| 4,146,049 A | 3/1979 | Kruse et al. | |
| 4,176,395 A | 11/1979 | Evelyn-Veere et al. | |
| 4,185,650 A | 1/1980 | Neves | |
| 4,208,630 A | 6/1980 | Martinez | |
| 4,209,131 A | 6/1980 | Barash | |
| 4,333,490 A | 6/1982 | Enter, Sr. | |
| RE31,023 E | 9/1982 | Hall, III | |
| 4,396,149 A | 8/1983 | Hirsch | |
| 4,396,150 A * | 8/1983 | Burrough | 239/75 |
| 4,431,338 A | 2/1984 | Homebrook | |
| 4,502,288 A * | 3/1985 | Lynch | 62/171 |
| 4,526,034 A | 7/1985 | Cambell | |
| 4,545,396 A | 10/1985 | Miller et al. | |
| 4,548,225 A | 10/1985 | Busalacchi | |
| 4,569,020 A * | 2/1986 | Snoddy et al. | 700/284 |
| 4,613,764 A | 9/1986 | Lobato | |
| 4,626,984 A | 12/1986 | Unruh | |
| 4,646,224 A | 2/1987 | Ransburg | |
| 4,684,920 A | 8/1987 | Reiter | |
| 4,691,341 A | 9/1987 | Knoble | |
| 4,709,585 A | 12/1987 | Altenhofen | |
| 4,755,942 A | 7/1988 | Gardner et al. | |
| 4,789,097 A * | 12/1988 | Anderson et al. | 236/1 EB |
| 4,837,499 A | 6/1989 | Scherer, III | |
| 4,852,802 A * | 8/1989 | Iggulden et al. | 239/64 |
| 4,856,227 A | 8/1989 | Oglevee | |
| 4,858,377 A | 8/1989 | Oglevee | |
| 4,876,647 A | 10/1989 | Gardner et al. | |
| 4,921,001 A | 5/1990 | Pittsinger | |
| 4,922,433 A | 5/1990 | Mark | |
| 4,934,400 A | 6/1990 | Cuming | |
| 4,952,868 A | 8/1990 | Scherer | |
| 4,962,522 A | 10/1990 | Marian | |
| 4,967,789 A | 11/1990 | Kypris | |
| 4,992,942 A | 2/1991 | Bauerle et al. | |
| 5,023,787 A | 6/1991 | Evelyn-Veere | |
| 5,097,861 A | 3/1992 | Hopkins et al. | |
| 5,101,083 A | 3/1992 | Tyler | |
| 5,121,340 A | 6/1992 | Cambell | |
| 5,148,826 A | 9/1992 | Bakhshaei | |
| 5,208,855 A | 5/1993 | Marian | |
| 5,229,937 A | 7/1993 | Evelyn-Veere | |
| 5,244,177 A | 9/1993 | Cambell | |
| 5,321,578 A | 6/1994 | Morrison et al. | |
| 5,341,831 A | 8/1994 | Zur | |
| 5,355,122 A | 10/1994 | Erickson | |
| 5,375,617 A * | 12/1994 | Young | 137/78.3 |
| 5,444,611 A | 8/1995 | Woytowitz et al. | |
| 5,445,176 A | 8/1995 | Goff | |
| 5,465,904 A | 11/1995 | Vaello | |
| 5,479,338 A | 12/1995 | Ericksen et al. | |
| 5,479,339 A | 12/1995 | Miller | |
| 5,638,847 A | 6/1997 | Hoch, Jr. et al. | |
| 5,696,671 A | 12/1997 | Oliver | |
| 5,836,339 A * | 11/1998 | Klever et al. | 137/78.2 |
| 5,839,660 A | 11/1998 | Morganstern et al. | |
| 5,853,122 A | 12/1998 | Caprio | |
| 5,870,302 A | 2/1999 | Oliver | |
| 5,908,157 A * | 6/1999 | Antonellis et al. | 239/70 |
| 5,921,280 A | 7/1999 | Ericksen et al. | |
| 5,960,813 A | 10/1999 | Sturman et al. | |
| 6,076,740 A | 6/2000 | Townsend | |
| 6,088,621 A | 7/2000 | Woytowitz | |
| 6,098,898 A | 8/2000 | Storch | |
| 6,102,061 A | 8/2000 | Addink | |
| 6,145,755 A | 11/2000 | Feltz | |
| 6,227,220 B1 | 5/2001 | Addink | |
| 6,250,091 B1 * | 6/2001 | Jerome | 62/171 |
| 6,259,955 B1 | 7/2001 | Brundisini et al. | |
| 6,267,298 B1 | 7/2001 | Campbell | |
| 6,298,285 B1 | 10/2001 | Addink et al. | |
| 6,314,340 B1 | 11/2001 | Mecham et al. | |
| 6,343,255 B1 * | 1/2002 | Peek et al. | 702/3 |
| 6,401,742 B1 | 6/2002 | Cramer et al. | |
| 6,452,499 B1 | 9/2002 | Runge et al. | |
| 6,453,215 B1 | 9/2002 | Lavoie | |
| 6,453,216 B1 | 9/2002 | McCabe et al. | |
| 6,585,168 B1 | 7/2003 | Caprio | |
| 6,589,033 B1 | 7/2003 | Johnson et al. | |
| 6,675,098 B2 * | 1/2004 | Peek et al. | 702/3 |
| 6,714,134 B2 | 3/2004 | Addink et al. | |
| 6,748,327 B1 | 6/2004 | Watson | |
| 6,766,817 B2 | 7/2004 | da Silva | |
| 6,823,239 B2 | 11/2004 | Sieminski | |
| 6,892,113 B1 | 5/2005 | Addink et al. | |
| 6,892,114 B1 | 5/2005 | Addink et al. | |
| 6,895,987 B2 | 5/2005 | Addink et al. | |
| 6,918,404 B2 | 7/2005 | da Silva | |
| 6,944,523 B2 | 9/2005 | Addink | |
| 6,947,811 B2 | 9/2005 | Addink et al. | |
| 6,950,728 B1 | 9/2005 | Addink et al. | |
| 6,963,808 B1 | 11/2005 | Addink et al. | |
| 7,010,394 B1 | 3/2006 | Runge et al. | |
| 7,048,204 B1 * | 5/2006 | Addink et al. | 239/63 |
| 7,050,887 B2 | 5/2006 | Alvarez | |
| 7,058,478 B2 | 6/2006 | Alexanian | |
| 7,058,479 B2 | 6/2006 | Miller | |
| 7,066,586 B2 | 6/2006 | da Silva | |
| 7,096,094 B2 | 8/2006 | Addink et al. | |
| 7,165,730 B2 * | 1/2007 | Clark et al. | 239/67 |
| 7,236,908 B2 | 6/2007 | Timko et al. | |
| 7,243,005 B1 | 7/2007 | Beutler et al. | |
| 7,248,945 B2 | 7/2007 | Woytowitz | |
| 7,266,428 B2 | 9/2007 | Alexanian | |
| 7,286,904 B2 | 10/2007 | Graham | |
| 7,317,972 B2 | 1/2008 | Addink et al. | |
| 7,330,796 B2 | 2/2008 | Addink et al. | |
| 7,337,042 B2 * | 2/2008 | Marian | 700/284 |
| 7,363,113 B2 * | 4/2008 | Runge et al. | 700/284 |
| 7,403,840 B2 * | 7/2008 | Moore et al. | 700/284 |
| 7,406,363 B2 * | 7/2008 | Doering et al. | 700/284 |
| 7,412,303 B1 * | 8/2008 | Porter et al. | 700/284 |
| 7,413,380 B2 * | 8/2008 | Corwon et al. | 405/37 |
| 7,430,458 B2 * | 9/2008 | Dansereau et al. | 700/284 |
| 7,444,207 B2 * | 10/2008 | Nickerson et al. | 700/284 |
| 7,513,755 B2 | 4/2009 | Geisinger et al. | |
| 7,522,975 B2 * | 4/2009 | Perez | 700/284 |
| 7,532,954 B2 * | 5/2009 | Evelyn-Veere | 700/284 |
| 7,552,632 B2 * | 6/2009 | Runge et al. | 73/170.17 |
| 7,584,023 B1 * | 9/2009 | Palmer et al. | 700/284 |
| 7,596,429 B2 * | 9/2009 | Cardinal et al. | 700/284 |
| 7,613,546 B2 * | 11/2009 | Nelson et al. | 700/284 |
| 7,640,079 B2 * | 12/2009 | Nickerson et al. | 700/284 |
| 2001/0049563 A1 | 12/2001 | Addink et al. | |
| 2002/0002425 A1 | 1/2002 | Dossey et al. | |
| 2002/0010516 A1 | 1/2002 | Addink | |
| 2002/0020441 A1 | 2/2002 | Addink | |
| 2002/0027504 A1 | 3/2002 | Davis | |
| 2002/0060631 A1 | 5/2002 | Runge et al. | |
| 2002/0072829 A1 | 6/2002 | Addink et al. | |
| 2002/0091452 A1 | 7/2002 | Addink | |
| 2002/0092965 A1 | 7/2002 | Addink | |
| 2003/0025400 A1 | 2/2003 | Hall | |
| 2003/0080199 A1 | 5/2003 | Condreva | |
| 2003/0109964 A1 | 6/2003 | Addink | |
| 2003/0178070 A1 | 9/2003 | Glicken | |
| 2003/0179102 A1 * | 9/2003 | Barnes | 340/870.07 |
| 2003/0182022 A1 | 9/2003 | Addink | |
| 2003/0183018 A1 | 10/2003 | Addink et al. | |
| 2003/0208306 A1 | 11/2003 | Addink | |
| 2003/0230638 A1 * | 12/2003 | Dukes et al. | 239/200 |

| | | |
|---|---|---|
| 2004/0011880 A1 | 1/2004 | Addink et al. |
| 2004/0015270 A1 | 1/2004 | Addink |
| 2004/0039489 A1 | 2/2004 | Moore et al. |
| 2004/0089164 A1 | 5/2004 | Addink |
| 2004/0117070 A1 | 6/2004 | Barker |
| 2004/0217189 A1 | 11/2004 | Regli |
| 2005/0019184 A1 | 1/2005 | Geisinger et al. |
| 2005/0137752 A1 | 6/2005 | Alvarez |
| 2005/0250440 A1 | 11/2005 | Zhou et al. |
| 2006/0043208 A1 | 3/2006 | Graham |
| 2006/0091245 A1 | 5/2006 | Ivans |
| 2006/0116792 A1 | 6/2006 | Addink |
| 2006/0122735 A1 | 6/2006 | Goldberg et al. |
| 2006/0155489 A1 | 7/2006 | Addink |
| 2006/0217846 A1 | 9/2006 | Woytowitz |
| 2006/0293797 A1 | 12/2006 | Weiler |
| 2007/0016334 A1* | 1/2007 | Smith et al. ............ 700/284 |
| 2007/0156318 A1* | 7/2007 | Anderson et al. ........ 701/50 |
| 2007/0179674 A1 | 8/2007 | Ensworth et al. |
| 2007/0191991 A1 | 8/2007 | Addink |
| 2007/0221744 A1 | 9/2007 | Simon et al. |
| 2007/0282486 A1 | 12/2007 | Walker et al. |
| 2008/0027586 A1* | 1/2008 | Hern et al. ............ 700/284 |
| 2008/0119948 A1* | 5/2008 | O'Connor ............... 700/9 |
| 2008/0154437 A1* | 6/2008 | Alexanian ............ 700/284 |
| 2009/0043427 A1 | 2/2009 | Addink |
| 2009/0202366 A1 | 8/2009 | Geisinger et al. |

OTHER PUBLICATIONS

Instructions, Model PK-1B pump controller, Mar. 1993.
Web pages (5 pags.); List of Principal Symbols and Acronyms; 2003.
Article (3 pgs.); Methods to Calculate Evapotranspiration Differences and Choices; by Cattaneo & Upham.
Article (2 pgs.); Water-Efficient Landscaping; 2001.
Article (2 pgs.); Residential Weather-Based Irrigation Scheduling: Jun. 2001 by Hunt & Lessick.
Article (19 pgs.); Appendix G Deficit Irrigation Practice; from Turf and Landscape Irrigation Best Management Practice by the Irrigation Association—Water Management Committee, Oct. 2002.
Article CTAHR Fact Sheet (1 pg.); A Simple Evapotranspiration Model for Hawaii: The Hargreaves Model; Engeineer's Notebook No. 106 May 1997; by Wu.
Web page (1pg); Technical Information—Using Evapotranspiration Data; Nov. 2002; by Austin Lawn Sprinkler Association.
Chart (1 pg); ET Different Formula.
Preface page Web Page (1pg.); by USFAO; Feb. 2003.

* cited by examiner

Extraterrestrial Radiation (RA) Expressed in Equivalent Evaporation (in mm/day)

| January | February | March | April | May | June | July | August | September | October | November | December | Latitude (degrees) |
|---|---|---|---|---|---|---|---|---|---|---|---|---|
| (1) | (2) | (3) | (4) | (5) | (6) | (7) | (8) | (9) | (10) | (11) | (12) | (13) |
| (a) Northern Hemisphere ||||||||||||||
| 3.8 | 6.1 | 9.4 | 12.7 | 15.8 | 17.1 | 16.4 | 14.1 | 10.9 | 7.4 | 4.5 | 3.2 | 50 |
| 4.3 | 6.6 | 9.8 | 13.0 | 15.9 | 17.2 | 16.5 | 14.3 | 11.2 | 7.8 | 5.0 | 3.7 | 48 |
| 4.9 | 7.1 | 10.2 | 13.3 | 16.0 | 17.2 | 16.6 | 14.5 | 11.5 | 8.3 | 5.5 | 4.3 | 46 |
| 5.3 | 7.6 | 10.6 | 13.7 | 16.1 | 17.2 | 16.6 | 14.7 | 11.9 | 8.7 | 6.0 | 4.7 | 44 |
| 5.9 | 8.1 | 11.0 | 14.0 | 16.2 | 17.3 | 16.7 | 15.0 | 12.2 | 9.1 | 6.5 | 5.2 | 42 |
| 6.4 | 8.6 | 11.4 | 14.3 | 16.4 | 17.3 | 16.7 | 15.2 | 12.5 | 9.6 | 7.0 | 5.7 | 40 |
| 6.9 | 9.0 | 11.8 | 14.5 | 16.4 | 17.2 | 16.7 | 15.3 | 12.8 | 10.0 | 7.5 | 6.1 | 38 |
| 7.4 | 9.4 | 12.1 | 14.7 | 16.4 | 17.2 | 16.7 | 15.4 | 13.1 | 10.6 | 8.0 | 6.6 | 36 |
| 7.9 | 9.8 | 12.4 | 14.8 | 16.5 | 17.1 | 16.8 | 15.5 | 13.4 | 10.8 | 8.5 | 7.2 | 34 |
| 8.3 | 10.2 | 12.8 | 15.0 | 16.5 | 17.0 | 16.8 | 15.6 | 13.6 | 11.2 | 9.0 | 7.8 | 32 |
| 8.8 | 10.7 | 13.1 | 15.2 | 16.5 | 17.0 | 16.8 | 15.7 | 13.9 | 11.6 | 9.5 | 8.3 | 30 |
| 9.3 | 11.1 | 13.4 | 15.3 | 16.5 | 16.8 | 16.7 | 15.7 | 14.1 | 12.0 | 9.9 | 8.8 | 28 |
| 9.8 | 11.5 | 13.7 | 15.3 | 16.4 | 16.7 | 16.6 | 15.7 | 14.3 | 12.3 | 10.3 | 9.3 | 26 |
| 10.2 | 11.9 | 13.9 | 15.4 | 16.4 | 16.6 | 16.5 | 15.8 | 14.5 | 12.6 | 10.7 | 9.7 | 24 |
| 10.7 | 12.3 | 14.2 | 15.5 | 16.3 | 16.4 | 16.4 | 15.8 | 14.6 | 13.0 | 11.1 | 10.2 | 22 |
| 11.2 | 12.7 | 14.4 | 15.6 | 16.3 | 16.4 | 16.3 | 15.9 | 14.8 | 13.3 | 11.6 | 10.7 | 20 |
| 11.6 | 13.0 | 14.6 | 15.6 | 16.1 | 16.1 | 16.1 | 15.8 | 14.9 | 13.6 | 12.0 | 11.1 | 18 |
| 12.0 | 13.3 | 14.7 | 15.6 | 16.0 | 15.9 | 15.9 | 15.7 | 15.0 | 13.9 | 12.4 | 11.6 | 16 |
| 12.4 | 13.6 | 14.9 | 15.7 | 15.8 | 15.7 | 15.7 | 15.7 | 15.1 | 14.1 | 12.8 | 12.0 | 14 |
| 12.8 | 13.9 | 15.1 | 15.7 | 15.7 | 15.5 | 15.5 | 15.6 | 15.2 | 14.4 | 13.3 | 12.5 | 12 |
| 13.2 | 14.2 | 15.3 | 15.7 | 15.5 | 15.3 | 15.3 | 15.5 | 15.3 | 14.7 | 13.6 | 12.9 | 10 |
| 13.6 | 14.5 | 15.3 | 15.6 | 15.3 | 15.0 | 15.1 | 15.4 | 15.3 | 14.8 | 13.9 | 13.3 | 8 |
| 13.9 | 14.8 | 15.4 | 15.4 | 15.1 | 14.7 | 14.9 | 15.2 | 15.3 | 15.0 | 14.2 | 13.7 | 6 |
| 14.3 | 15.0 | 15.5 | 15.5 | 14.9 | 14.4 | 14.6 | 15.1 | 15.3 | 15.1 | 14.5 | 14.1 | 4 |
| 14.7 | 15.3 | 15.6 | 15.3 | 14.6 | 14.2 | 14.3 | 14.9 | 15.3 | 15.3 | 14.8 | 14.4 | 2 |
| 15.0 | 15.5 | 15.7 | 15.3 | 14.4 | 13.9 | 14.1 | 14.8 | 15.3 | 15.4 | 15.1 | 14.8 | 0 |
| (b) Southern Hemisphere ||||||||||||||
| 17.5 | 14.7 | 10.9 | 7.0 | 4.2 | 3.1 | 3.5 | 5.5 | 8.9 | 12.9 | 16.5 | 18.2 | 50 |
| 17.6 | 14.9 | 11.2 | 7.5 | 4.7 | 3.5 | 4.0 | 6.0 | 9.3 | 13.2 | 16.6 | 18.2 | 48 |
| 17.7 | 15.1 | 11.5 | 7.9 | 5.2 | 4.0 | 4.4 | 6.5 | 9.7 | 13.4 | 16.7 | 18.3 | 46 |
| 17.8 | 15.3 | 11.9 | 8.4 | 5.7 | 4.4 | 4.9 | 6.9 | 10.2 | 13.7 | 16.7 | 18.3 | 44 |
| 17.8 | 15.5 | 12.2 | 8.8 | 6.1 | 4.9 | 5.4 | 7.4 | 10.6 | 14.0 | 16.8 | 18.3 | 42 |
| 17.9 | 15.7 | 12.5 | 9.2 | 6.6 | 5.3 | 5.9 | 7.9 | 11.0 | 14.2 | 16.9 | 18.3 | 40 |
| 17.9 | 15.8 | 12.8 | 9.6 | 7.1 | 5.8 | 6.3 | 8.3 | 11.4 | 14.4 | 17.0 | 18.3 | 38 |
| 17.9 | 16.0 | 13.2 | 10.1 | 7.5 | 6.3 | 6.8 | 8.8 | 11.7 | 14.6 | 17.0 | 18.2 | 36 |
| 17.8 | 16.1 | 13.5 | 10.5 | 8.0 | 6.8 | 7.2 | 9.2 | 12.0 | 14.9 | 17.1 | 18.2 | 34 |
| 17.8 | 16.2 | 13.8 | 10.9 | 8.5 | 7.3 | 7.7 | 9.6 | 12.4 | 15.1 | 17.2 | 18.1 | 32 |
| 17.8 | 16.4 | 14.0 | 11.3 | 8.9 | 7.8 | 8.1 | 10.1 | 12.7 | 15.3 | 17.3 | 18.1 | 30 |
| 17.7 | 16.4 | 14.3 | 11.6 | 9.3 | 8.2 | 8.6 | 10.4 | 13.0 | 15.4 | 17.2 | 17.9 | 28 |
| 17.6 | 16.4 | 14.4 | 12.0 | 9.7 | 8.7 | 9.1 | 10.9 | 13.2 | 15.5 | 17.2 | 17.8 | 26 |
| 17.5 | 16.5 | 14.6 | 12.3 | 10.2 | 9.1 | 9.5 | 11.2 | 13.4 | 15.6 | 17.1 | 17.7 | 24 |
| 17.4 | 16.5 | 14.8 | 12.6 | 10.6 | 9.6 | 10.0 | 11.6 | 13.7 | 15.7 | 17.0 | 17.5 | 22 |
| 17.3 | 16.5 | 15.0 | 13.0 | 11.0 | 10.0 | 10.4 | 12.0 | 13.9 | 15.8 | 17.0 | 17.4 | 20 |
| 17.1 | 16.5 | 15.1 | 13.2 | 11.4 | 10.4 | 10.8 | 12.3 | 14.1 | 15.8 | 16.8 | 17.1 | 18 |
| 16.9 | 16.4 | 15.2 | 13.5 | 11.7 | 10.8 | 11.2 | 12.6 | 14.3 | 15.8 | 16.7 | 16.8 | 16 |
| 16.7 | 16.4 | 15.3 | 13.7 | 12.1 | 11.6 | 11.6 | 12.9 | 14.5 | 15.8 | 16.5 | 16.6 | 14 |
| 16.6 | 16.3 | 15.4 | 14.0 | 12.5 | 11.6 | 12.0 | 13.2 | 14.7 | 15.8 | 16.4 | 16.5 | 12 |
| 16.4 | 16.3 | 15.5 | 14.2 | 12.8 | 12.0 | 12.4 | 13.5 | 14.8 | 15.9 | 16.2 | 16.2 | 10 |
| 16.1 | 16.1 | 15.5 | 14.4 | 13.1 | 12.4 | 12.7 | 13.7 | 14.9 | 15.8 | 16.0 | 16.0 | 8 |
| 15.8 | 16.0 | 15.6 | 14.7 | 13.4 | 12.8 | 13.1 | 14.0 | 15.0 | 15.7 | 15.8 | 15.7 | 6 |
| 15.5 | 15.8 | 15.6 | 14.9 | 13.8 | 13.2 | 13.4 | 14.3 | 15.1 | 15.6 | 15.5 | 15.4 | 4 |
| 15.3 | 15.7 | 15.7 | 15.1 | 14.1 | 13.5 | 13.7 | 14.5 | 15.2 | 15.5 | 15.3 | 15.1 | 2 |
| 15.0 | 15.5 | 15.7 | 15.3 | 14.4 | 13.9 | 14.1 | 14.8 | 15.3 | 15.4 | 15.1 | 14.8 | 0 |

Fig. 6

6540 Arlington Boulevard  
Falls Church, VA 22042

Tel: 703-536-7080  
www.irrigation.org

| Smart Water Application Technology™ (SWAT™) Performance Report |
|---|
| Testing Agency: Center for Irrigation Technology  www.californiawater.org |
| Product: Alex-Tronix Smart Clock® |
| Product Type: Climatologically Based Controller |
| Product Description: The Alex-Tronix Smart Clock® is a battery-operated controller with temperature and rain sensors. |
| SWAT™ Protocol*: Turf and Landscape Equipment Climatologically Based Controllers 7th Draft Testing Protocol (November 2006)<br>The concept of climatologically controlling irrigation systems has an extensive history of scientific study and documentation. The objective of this protocol is to evaluate how well current commercial technology has integrated the scientific data into a practical system that meets the agronomic needs of turf and landscape plants. The evaluation is accomplished by creating a virtual landscape subjected to a representative climate to evaluate the ability of individual controllers to adequately and efficiently irrigate that landscape. After initial programming and calibration the controller is expected to perform without further intervention during the test period. Performance results indicate to what degree the controller maintained root zone moistures within an acceptable range. If moisture levels are maintained without deficit, it can be assumed the crop growth and quality will be adequate. If moisture levels are maintained without excess it can be assumed that scheduling is efficient. |
| *All SWAT™ Protocol may be viewed at www.irrigation.org |

| Alex-Tronix Smart Clock® Controller SWAT™ Performance Summary ||
|---|---|
| Irrigation Adequacy | Irrigation Excess |
| Minimum of 6 test zones: 100% | Minimum of 6 test zones: 0% |
| Maximum of 6 test zones: 100% | Maximum of 6 test zones: 1.1% |
| Mean/Average of 6 test zones: 100% | Mean/Average of 6 test zones: 0.2% |
| Irrigation Adequacy represents how well irrigation met the needs of the plant material. This reflects the percentage of required water for turf or plant material supplied by rainfall and controller-scheduled irrigations. Research suggests that if this value is between 80% and 100%, the acceptable quality of vegetation will be maintained. | Irrigation Excess represents how much irrigation water was applied beyond the needs of the plant material. This reflects the percentage of water applied in excess of 100% of required water according to data from CIMIS station #80 Fresno State, Fresno County during the test period. |

| Product Detail Supplied by Manufacturer ||||||
|---|---|---|---|---|---|
| Alex-Tronix Smart Clock® |||||  www.alex-tronix.com |
| Installation | Data Source | Data Link | Initial Purchase | Additional Hardware | Additional Fees |
| Replaces existing controller or is installed on a new system. | Tested with on site temperature sensor with optional rain sensor. | Hard wired | Purchase price includes temperature sensor. | ❏ Rain Switch Pole mount<br>❏ Rain and Temperature Sensors Pole mount<br>❏ Latching Solenoid<br>❏ Stainless Steel Pedestal mount | None |
| Additional Features ||||||
| Zones | Time of Day | Day of Week | Other || If Data Link is Discontinued |
| Available with 6 zones | Capable of restricting the time of day for watering. | Capable of restricting watering days by selection or interval. | ❏ Multiple start times<br>❏ Programmable rain delay<br>❏ 5-yr Battery life with low battery indication || Smart Clock may be used as a standard irrigation controller including percent adjust and 4 independent programs with multiple start times. |

Fig. 9

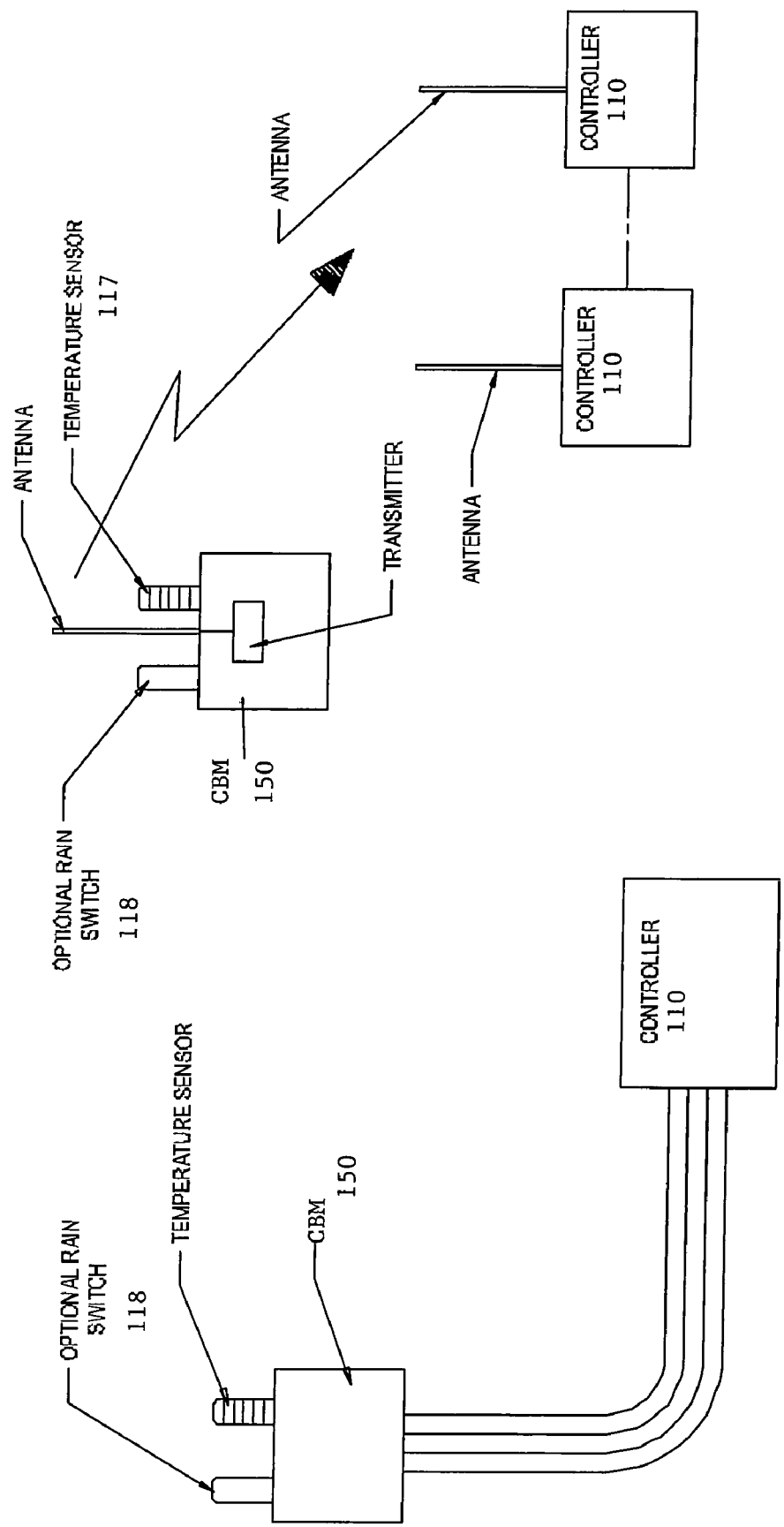

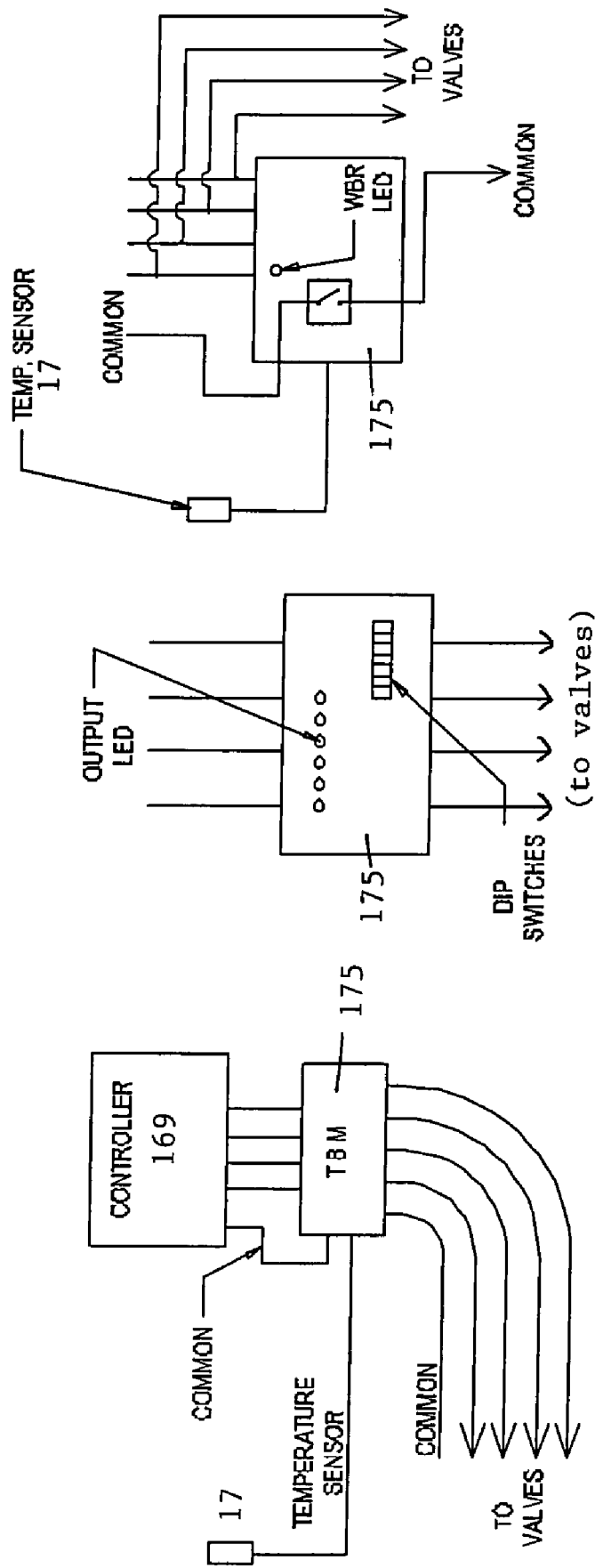

DROUGHT WATERING RESTRICTIONS

All water users have been assigned a watering group. Mandatory restrictions mean you may only run sprinklers on your groups' allowed watering day(s). To locate your group, check your bill, visit snwa.com or call your water provider.

My assigned group: _____

Southern Nevada Water Authority

| Watering Group | Winter<br>November - February | Spring / Fall<br>March - April, September - October | Summer<br>May - August |
|---|---|---|---|
| A | Monday | Monday, Wednesday, Friday | Any day |
| B | Tuesday | Tuesday, Thursday, Saturday | Any day |
| C | Wednesday | Monday, Wednesday, Friday | Any day |
| D | Thursday | Tuesday, Thursday, Saturday | Any day |
| E | Friday | Monday, Wednesday, Friday | Any day |
| F | Saturday | Tuesday, Thursday, Saturday | Any day |

For watering instructions, see inside panel.

[Prior Art]

Fig. 21

IRRIGATION WATER CONSERVATION WITH TEMPERATURE BUDGETING AND TIME OF USE TECHNOLOGY

This is a continuation-in-part of U.S. Utility patent application Ser. No. 11/336,690 filed on Jan. 20, 2006 now U.S. Pat. No. 7,266,428, which is a continuation-in-part of U.S. Utility patent application Ser. No. 10/824,667 filed on Apr. 13, 2004, now U.S. Pat. No. 7,058,478, which claims the benefit of U.S. Provisional Application No. 60/465,457 filed on Apr. 25, 2003, all of which are incorporated herein by this reference. This application also claims the benefit of U.S. Provisional Application No. 60/831,904 filed on Jul. 20, 2006, and 60/899,200 filed on Feb. 1, 2007, which are also incorporated herein by this reference.

BACKGROUND OF THE INVENTION

1. Field of the Invention

The present invention relates to the management and conservation of irrigation water, primarily for, but not limited to, residential, commercial, and municipal landscaping applications, and more particularly to methods and apparatus for adjusting irrigation schedules using simplified temperature based water budgeting methods that use local environmental and geographic data and/or implementations adapted for time of use watering restrictions.

2. Description of the Prior Art

Many regions of the United States lack sufficient water resources to satisfy all of their competing agricultural, urban, commercial and environmental needs. The "California Water Plan Update, Bulletin 160-98," published by the California Department of Water Resources using 1995 calendar year data, estimated that approximately 121.1 million acre feet (maf) of water is needed to satisfy the annual water needs of the State of California alone. Of this amount, approximately forty-six percent is required for environmental purposes, forty-three percent for agricultural purposes, and eleven percent (approximately 13.3 maf) for usage in urban areas. The Bulletin further estimated that California suffers a shortage of 1.6 maf during normal years, and 5.1 maf in drought years. These shortages are expected to increase steadily through the year 2020 due to expected significant increases in the state population.

At the Feb. 17, 2004, EPA-sponsored "Water Efficient Product Market Enhancement Program" in Phoenix, Arizona, for landscaping irrigation systems and controllers, it was projected that thirty-six states will have severe water shortages by the year 2010. A significant portion of this projected shortage was attributed to user neglect and irrigation controller inefficiency. The 2003 California census revealed that there were over twenty million single family residences and apartments within the state. The California Urban Water Conservation Council estimated that the average household utilized one-half acre foot of water (162,500 gallons) annually, and that fifty-five percent (89,375 gallons) of this amount was used for landscape irrigation. It further estimated that approximately one-third of the irrigation water was wasted, either due to inefficient irrigation systems or inadequate controller programming, oftentimes due in part to complicated controller programming procedures required of the operator. This results in a total annual waste of 1.81 maf of water for California households alone. Excessive water usages in municipal and commercial areas, golf courses and schools further contribute to the water shortage.

Such water shortages have forced many municipalities to enact strict water conservation measures. Two such measures include strongly encouraging the use of irrigation controllers that can adjust themselves to changing weather conditions, or instituting limitations of allowed watering days (Time-Of Use or TOU restrictions) during the various seasons. Some communities have also required the installation of water meters and auditors to enforce those schedules. Commercial and environmental users have enacted similar measures. For its part, the agricultural industry has responded to this shortage by resorting to drip, micro, and other low volume irrigation systems. However, there is no consensus to date among these various consumers, water agencies, manufacturers, or state or federal government entities as to the most effective water conservation method or automated control system.

Residential and commercial irrigation consumers are responsible for a significant percentage of wasted water. A report entitled "Water Efficient Landscaping" by the United States Environmental Protection Agency (EPA), dated September 2002, publication number EPA832-F-02-002, states the following: "according to the U.S. Geological Survey, of the 26 billion gallons of water consumed daily in the United States (Amy Vickers, 2002 "Handbook of Water Use and Conservation"), approximately 7.8 billion gallons, or 30% is devoted to outdoor uses. The majority of this is used for landscaping"

A significant reason for this over-utilization of landscape water was revealed in a marketing study conducted by the Irrigation Association (IA) and presented at the 2003 IA "Smart Water Application Technology" conference in San Diego, Calif. The study indicated that most consumers typically adjust their irrigation schedule only two to five times per year, rather than on a daily or weekly basis, regardless of changes in environmental conditions. The relatively high cost of labor in many municipalities further prohibits frequent manual adjustments of irrigation controllers. This generally results in over-irrigation and runoff, particularly during the off-seasons, oftentimes by as much as one to two hundred percent.

Soil moisture sensing devices and other methods of water conservation, have been available for decades, but have enjoyed only limited success. Such devices and methods generally call for inserting moisture sensors into the soil to measure the soil moisture content. Newer soil moisture sensing technologies have more recently been developed, and claim to be theoretically accurate in measuring plant water needs. However, regardless of the level of technology, such devices and methods are often problematic due to the location and number of sensors necessary to obtain accurate soil moisture readings, the high costs of installing and maintaining the sensors, and the integrity and reliability of the sensors' data.

Virtually all irrigation controllers and add-on modules utilize meteorological data to estimate the evapotranspiration, or ET, for a particular region. Some of these controllers and add-on modules are manufactured by Aqua Conserve, Weathermatic, Rain Master, ET Water Systems, and Hydro Point, among others, whose ET methods were reviewed by the Bureau of Reclamation in their May 2004 report entitled "Weather Based Technologies for Residential Irrigation Scheduling", updated in 2006. This ET represents the amount of water needed by plants to replace water lost through plant absorption and evaporation, and is expressed in inches or millimeters of water per day. The United States Food and Agriculture Office (USFAO), in its Irrigation and Drainage Paper No. 24, entitled "Crop Water Requirements," noted that "a large number of more or less empirical methods have been developed over the last fifty years by numerous scientists and specialists worldwide to estimate ET from different climatic variables."

There are at least 15 different ET formulas. Each of these formulas provides a different result for the reference ET (ETo). In their paper entitled "Methods to Calculate Evapotranspiration: Differences and Choices," Diego Cattaneo and Luke Upham published a four-year comparison of four different ETo formulas — The Schwab, Tool box, Formula box, and Penman-Monteith. Using the same four year data but different weather parameters and ET algorithms, the four theoretical ET calculations show results that vary by as much as seventy- percent (See FIG. 8) during certain times of the year.

Irrespective of these variations, the Penman-Monteith formula (which varies the most from the other three equations) is currently recognized as the "standard" by both the USFAO and California Irrigation Management Information System (CIMIS), with variances of less than twenty percent from this ET considered acceptable. The Penman-Monteith formula is as follows:

$$ETo = \frac{\Delta(Rn-G)}{\lambda[\Delta + Y(1+CdU2)]} + \frac{y\frac{37}{Ta+273.16}U2(Es-Ea)}{\Delta + Y(1+CdU2)}$$

The variables within this formula represent the following:
ETo=grass reference evapotranspiration in millimeters per day.
$\Delta$=slope of saturation vapor pressure curve kPa° C. at the mean air temperature.
Rn=net radiation (MJm$^{-2}$h$^{-1}$).
G=soil heat flux density (MJm$^{-2}$h$^{-1}$).
Y=psychrometric constant (kPa° C.).
Ta=mean hourly air temperature (° C.).
U2=wind speed at two meters (m s$^{-1}$).
Es=saturation vapor pressure (kPa) at the mean hourly air temperature
Ea=actual vapor pressure (kPa) at the mean hourly air temperature in ° C.
$\lambda$=latent heat of vaporization (MJkg$^{-1}$).
Cd=bulk surface resistance and aerodynamics resistance coefficient.

The simplest ET formula is the Hargreaves formula proposed by the College of Tropical Agriculture and Human Resources at the University of Hawaii at Manoa. Its equation is described in the College's Fact Sheet Engineer's Notebook No. 106, published May 1997, in an article entitled "[a] Simple Evapotranspiration Model for Hawaii," as follows:

$$ETo=0.0135(T+17.18)Rs$$

The variables within this formula represent the following:
ETo=potential daily evapotranspiration in mm/day.
T=mean daily temperature (° C.).
Rs=incident solar radiation converted to millimeters of water per day (MJ).

This formula relies upon the same ET theories and interrelationships as the other formulas disclosed above. As described herein, such reliance causes the Hargreaves formula to possess the same shortcomings as the other ET formulas.

In view of the significant discrepancies between various ET equations, as noted, the question is, which, if any, of these equations is the most accurate ET, or are they all merely theoretical estimations? The herein proposed invention is not so much theoretical as a practical and user-friendly alternative approach to water conservation with greater potential to save real rather than theoretical water.

In an October 2005 Assembly bill 2717 task force meeting in Sacramento, Calif., the state Department of Water Resources (DWR) was asked for their definition of "Smart" controllers. The DWR described "Smart" in the same manner as the Irrigation Association, the Center for Irrigation Technology, and the EPA, in that a smart controller is capable of adjusting itself daily based upon the time of the year and the current environmental conditions and that smart technology is not limited to ET controllers. A number of irrigation controller manufacturers currently offer ET based controllers. Several of them obtain the environmental data to calculate ET from historical records, while others utilize adjacently located weather stations to obtain real-time data. Others receive such information from a network of existing weather stations by radio, satellite or pager means for a monthly fee. The Irrigation Association announced at their November 2005 conference SWAT meeting in Phoenix, Ariz. that the Center for Irrigation Technology is continuing to test all climatologically based water saving systems to include ET, ground moisture sensing, and other types of smart technology.

The following U.S. patents all disclose various methods by which an irrigation controller calculates or adjusts an irrigation schedule based upon historical, distal, or local ETo: U.S. Pat. Nos. 4,962,522; 5,097,861; 5,208,855; 5,479,339; 5,696,671; 6,298,285 and 6,314,340. All of these methods calculate ETo values or receive them from external sources, and use such values to adjust and regulate irrigation. Such external sources may be CIMIS ET databases, local sensors, cable lines or broadcast stations. Several of these methods also utilize other data, such as precipitation.

Unfortunately, methods incorporating ET formulas, and the installation, comprehension and programming of controllers utilizing such methods, including those cited in the referenced patents above, are far too complex for the average user to understand and implement. Such a conclusion was reached in a recent study of ET controllers by the Irvine Ranch Water District, entitled "Residential Weather Based. Irrigation Scheduling Study." The study stated the following: "The water agency solution to date has been to conduct residential audits, leaving the homeowner with a suggested watering schedule, hoping it would then be followed. These programs have had limited effect and a short-term impact. A preferred solution would be to install irrigation controllers that automatically adjust watering times based on local weather conditions. Unfortunately, until now, these large landscape control systems have been far too complex and expensive for residential applications."

Such complexity is underscored by the one hundred forty-five principal symbols and acronyms identified by the USFAO for use and description of the factors and variables related to ET theory and its various formulas, covering such variables as: the capillary rise; the resistance correction factor; the soil heat capacity; the psychrometer coefficient; and the bulk stomatal resistance of a well-illuminated leaf. The sheer number of variables renders ET theory difficult to explain, understand and apply, especially for an unsophisticated consumer with little or no scientific or meteorological background. For example, the manual for one ET-based controller currently on the market comprises over one hundred fifty pages of instructions and explanations. Such unfamiliarity and complexity increase the margins of error already associated with the various ET formulas, further diminishing their effectiveness.

Water districts, irrigation consultants, manufacturers, the Irrigation Association, the Center for Irrigation Technology and other attendees at the EPA's Water Efficient Product Market Enhancement Program estimated that, due to the complexity, cost, impracticality of installation and difficulty in programming current irrigation controllers, less than one percent of all commercial and residential landscape irrigation systems currently and effectively utilize some form of the ET or moisture sensing method. To further emphasize this lack of acceptance, the Los Angeles Metropolitan Water District that serves 3.5 million households reports less than 0.3% conversion to ET based controllers either provided free of charge or up to 100% rebated. The Southern Nevada Water Authority that serves Clark County, Nev. reports that over nearly a three year period of rebates, fewer than 200 such "smart" based controllers have been rebated. Such paltry adoption exists despite over fifty years of ET research, and over thirty years of ground moisture sensing technology. The magnitude of such ineffectiveness is underscored by the fact that there are over two million new controllers installed annually in the United States alone, and fifty million controllers in use today. Even if the ET or ground moisture sensing methods provided one hundred percent efficiency, which they do not, the limited adoption of these methods renders them an ineffective means of significant water conservation, since less than one percent of the runoff and water waste would be prevented under perfectly-efficient conditions.

A second shortcoming of the ET method is its dependence upon numerous categories of local, real-time meteorological data. As indicated above, many variables must be measured in order to calculate ET. Data for each variable must be obtained by separate sensors, each one installed in a particular location. Such particularity requires an understanding of local environmental conditions and meteorology. Furthermore, accuracy requires that the data be received from local sensors. Given the numerous microclimates existing within any one geographical area, data received from remotely located sensors may be inaccurate. The data must also be received and processed in real-time, since average or historical ET data may be inaccurate during periods of unusual or excessive heat, cold, or rain, or other deviations from historical climate patterns. Any inaccurate data would result in even greater ET deviations and inefficient irrigation.

ET measuring devices are generally also expensive to install and maintain. Sensors or weather stations must be placed within each microclimate to measure the different variables utilized by the formula of choice. Each weather station may cost up to several thousand dollars. Furthermore, all of these sensors or stations must undergo regular inspection, maintenance and calibration to insure that they continue to provide accurate data. This further increases the actual cost of each station. The sensors and stations must also be powered in some manner—depending upon the particular geographic location, AC power may not be readily available. All of these considerations increase the cost of implementing an ET-based irrigation system to a prohibitive level, and limit the widespread adoption of this method. Finally, all of this assumes that the weather station or sensors is even installable in a particular area. Some areas, such as street medians or parks, are not suitable for weather station or sensor installation due to aesthetic reasons or the likelihood of vandalism.

Another shortcoming of ET-based controllers is that all of the ETo formulas (including the Hargreaves formula) are generally expressed in hundredths of an inch, or millimeters, of water per day. Thus, ETo must be converted to an actual irrigation time of minutes. Such a conversion is dependent upon the characteristics of the particular hydraulic system, such as the valve sizes, water flow rates, and sprinkler or drip irrigation precipitation rates. One conversion formula, proposed by the Austin (Texas) Lawn Sprinkler Association, calculates the sprinkler run time in minutes (T) as follows:

$$T = \frac{60 \times ETo \times Kc}{Pr \times Ea}$$

The variables within this equation represent the following:
ETo=reference evapotranspiration rate, in inches.
Kc=the percentage crop coefficient.
Pr=the sprinkler precipitation rate, in inches per hour.
Ea=the percentage application efficiency of the hydraulics system.

As an example of such complexity, the crop coefficient (Kc) is different for each crop or landscape plant or grass type. Determining the precipitation rate (Pr) requires knowledge of the hydraulic system specifications—the particular types of valves and sprinklers, the number of valves and sprinklers within the system, the water flow rate and operating pressure and an actual measurement of each type of water delivery sprinkler, bubbler, or dripper. Such information is not readily available to the average consumer. Instead, the consumer must expend additional time and money to retain an irrigation expert to configure and install the system.

Another ET-to-irrigation-time conversion method, the 'deficit irrigation practice,' was proposed by the IA Water Management Committee in Appendix G of its October 2002 article entitled "Turf and Landscape Irrigation Best Management Practices." This conversion method comprised ten separate formulas, and utilized a total of twenty-nine variables and constants, not including those utilized in calculating the ET value. Many of these variables represented concepts and relationships difficult for the average irrigation designer, much less a consumer, to understand, such as: the local landscape coefficient for the particular vegetation; available water depending upon the particular soil composition; allowable water depletion rate from the root zone; maximum percentage allowable depletion without plant stress; the water management factor necessary to overcome water management inefficiency; the whole day stress-based irrigation interval; water flow rates for the particular system; and, of course, ET.

Due to the urgency arising from severe national drought and environmental conditions, and the shortcomings of the various present technologies, the irrigation industry is currently researching alternative methods for water conservation and prevention of unattended runoff. The Center for Irrigation Technology in Fresno, Calif., recently renamed as the Irrigation Center for Water Technology (ICWT) along with other educational and research institutions and water conservation agencies, is conducting studies evaluating various water conservation methods. On the national level, the EPA is considering the introduction of a "WaterSense" irrigation efficiency rating program similar to the "EnergyStar" rating system currently in use for equipment energy efficiency. The purpose of such an irrigation efficiency rating program is to promote consumer awareness and compliance as an alternative to nationally and regionally mandated water conservation measures which would severely and negatively impact the irrigation industry, landscape aesthetics and the ecology.

It is clear from the foregoing discussion that the irrigation water management industry, in view of a politically and economically sensitive, and urgent, water crisis, is pursuing highly scientific, mathematical and/or theoretical approaches for resolving the problems of wasted irrigation water and drought conditions. Unsurprisingly, such approaches have met with limited success. The EPA, United States Department of Energy (DOE), Bureau of Reclamation, ecologists, environmentalists, municipalities, water agencies, research institutions, irrigation consultants, and manufacturers, are all searching for new methods that provide practical (as opposed to theoretical) improved irrigation efficiency—methods that overcome the particular shortcomings of the prior art.

The California Assembly bill 2717 task force established to propose new regulation concerning landscape irrigation has recommended that all irrigation controllers installed by the year 2010 be "smart". Their definition of a "smart" controller is not limited to ET controllers. Instead, they define a "smart" controller as one that is capable of adjusting itself daily based upon local weather conditions and proven capable by means of third party testing (such as offered by the ICWT) to provide enough water for a healthy landscape by maintaining an adequate root zone water supply with minimal (if any) waste or runoff. The resulting assembly bill 1881 was passed into law, and now requires that all controllers sold or installed in California after Jan. 1, 2012 be "smart."

Landscape water conservation also provides additional benefits. As noted by the EPA in its "Water Efficient Landscaping" guidelines, landscape water conservation also results in "decreased energy use (and air pollution associated with its generation) because less pumping and treatment of water is required and reduced runoff of storm water and irrigation water that carries top soils, fertilizers, and pesticides into lakes, rivers, and streams, fewer yard trimmings, reduced landscaping labor and maintenance costs, and extended life for water resources infrastructures (e.g. reservoirs, treatment plants, groundwater aquifers), thus reduced taxpayer costs." Thus, there is an urgent need for irrigation systems that conserve water and energy, and minimize negative impact upon the environment, by automatically adjusting their schedules periodically in response to meteorological and seasonal changes.

The problem of irrigation mismanagement, and the main hurdle faced by these entities, can be simply summarized as follows: once a system is properly designed, most of the wasted landscape irrigation water and runoff is caused by not adjusting for daily, periodic, or seasonal changes. For example, in California, most homeowners and municipalities continue to irrigate their system in the fall based upon the summer schedule until the first rain storm of the year occurs followed by a sharp drop in temperature. If the summer schedule is assumed to be 100%, and November irrigation actually only requires, for example, about 20% of summer irrigation to satisfy the vegetation needs, this means that as much as 80% of the water is wasted in the fall. Such inaction is usually caused by the complexity and difficulty of determining the particular adjustment amounts and the significant inconvenience of daily adjustments.

As an alternative to costly and impractical to install weather stations, some manufacturers are offering an ET service that broadcasts the daily ET signal by means of a satellite or pager system. An example of this approach is the AccuWater system which takes weather data collected through a private network of weather stations and or sensors. Another example is the HydroPoint Weather TRAK that requires every controller to have a receiver that either receives ET that affects the controller irrigation programming, or one that receives separate weather sensor data that is then calculated locally into an ET value (such as provided by Irrisoft with its Weather Reach Receiver). A typical residential controller costs less than $100, with some as low as $20. The least expensive functional "smart" controller on the market today retails for $298. Homeowners do not wish to pay a monthly fee ranging from $4-$12 a month for the life of a service fee based controller in addition to the much higher priced smart controllers.

As discussed in provisional patent applications 60/831,904 and 60/899,200 (which are incorporated herein by this reference), many communities also have water pumping and delivery issues due to drought and increasing population and demand on the infrastructure delivering that water. Many of those communities have enacted limitations on watering schedules in order to minimize the demand on those facilities. By limiting landscape irrigation to certain times of the day and by either even or odd street address designations, or by watering groups such as designated by the SNWA (Southern Nevada Water Authority) as shown in FIG. 21. In this case, watering is allowed every day during the summer, but not between the hours of 11 AM and 7 PM to minimize evaporation and high peak demand periods. During the spring and fall, irrigation is permitted any time of day, but only three times a week depending upon the assigned watering group. In the winter, only one watering day per week is permitted. Fines are issued for multiple offenders. However, this method is difficult to police because there are 500,000 customers in Clark County, Nevada, so many users commonly violate these rules. It is inconvenient for the homeowner, for example, to remember to change the watering schedule at least 4 times a year, particularly if they are not familiar with the programming of the controller. The SNWA estimates that after 5 years of public education and rules "enforcement", has resulted in 30% compliance. While not great, this is far better in terms of saving real water and easing infrastructure demands than rebated ET based controllers or ground moisture sensors have shown to date.

With ET related complexities and frequent disregard for watering time of use rules, a simple, intuitive solution would be highly preferred over the existing highly theoretical and technical, but impractical, state of the art ET-based and ground moisture sensing control systems and dependence upon human manual compliance with restricted watering schedules.

It is therefore desirable to provide a simple, user-intuitive, and therefore readily accepted water conservation approach, particularly for a clearly understood automated method of calculating and implementing irrigation schedules. It is further desirable to provide a method that does not necessarily rely upon ground or air moisture sensing means, weather stations, or ET (either directly, or as a basis for deriving the sprinkler operating times). It is further desirable to provide a method that minimizes the margins and sources of errors by minimizing the number of sensor inputs required by the variables in the formula. It is further desirable to provide a method that utilizes minimal local, real-time meteorological data that is not ET based. It is further desirable that such a method be cost-efficient, affordable, installable, and usable by a large number of people and entities within the irrigation industry with the widest range of applications possible. It is further desirable that such a method be understandable by the average consumer. It is further desirable that such a method be accomplished automatically, without requiring regular manual adjustments by the operator of the irrigation watering time settings or schedules. It is also desirable that temperature budgeting be adaptable to time of use restrictions established by various communities or water agencies.

SUMMARY OF THE INVENTION

The present invention provides simple and automated methods, apparatus and systems for water conservation and management, and which minimize runoff. The invention is independent of and does not utilize ground moisture sensing, weather stations, evapotranspiration (ET or ETo), or complicated formulas for calculating irrigation durations or sprinkler operating times based upon ETo. Instead, the present invention relies almost exclusively upon the time of year, current local temperature data, and information particular to the geographic location, to calculate and adjust one or more irrigation schedules on a daily or periodic basis. The present invention satisfies the definition of "smart" controller by using current temperature data and the information concerning the invention's geographic location to calculate a periodic (preferably daily) water budget ratio which is used to alter, adjust and/or modify one or more irrigation schedules. This is accomplished by comparing current geo-environmental data to historical geo-environmental data and calculating a percentage of water for the current day compared to a peak, summer or other benchmark irrigation schedule. Minimizing the number of climatic variables and simplifying the calculation in this manner renders the present invention easier and less expensive to install, operate and maintain, and therefore, much more appealing to the public. The present invention also provides apparatus and methods to combine simple temperature budgeting with time of use (TOU) to offer residential, commercial, municipal users and water districts options that best meet the needs of their local and regional water related issues. It is important to note that the present method does not use any environmental data to calculate ET, nor use any historically stored ET, nor does it transmit or receive ET. Evapotranspiration in this invention is only used as a means of comparison and in describing the current state of the art of "smart water" technology.

The water conserving smart technology methods of the present invention is sometimes referred to as "temperature budgeting," and the calculated result is a water budget or water budget ratio (WBR) that can be used to modify irrigations schedules in a variety of ways. The terms "water budget" and "water budget ratio" may sometimes be interchanged, both referring to a ratio of two numbers which is a percentage, and not a particular volume of water.

The temperature budgeting methods and embodiments of the present invention can be used with any irrigation controller system: AC, DC, battery, solar, water, wind, or ambient light powered, and with stand alone or central wired or wireless controllers, with or without remote programming, with wired or wireless sensors, as add-on modules to existing controllers that may be stand alone or independently or globally addressable as in a central control system, and in various combinations of these embodiments. Temperature budgeting embodiments of the present invention offer "smart water" technology that can also be used in the form of a module that may be mounted easily and inexpensively without a service fee at the irrigation valve(s) with independent valve operation from any existing controller. The present methods can also be combined with local communities time of use watering restrictions for full flexibility of choice of the method best suited for the local water related needs and conditions.

Temperature based water budgeting is guided by the following universally understood concepts:

1. More water is required to irrigate landscape or crops during periods of warmer temperatures.
2. Less water is required during periods of cooler temperatures.
3. Little or no water is required or desired below a certain temperature, or during certain times of the year.
4. No irrigation is required while it is raining, or for a period thereafter.
5. Published watering schedules must be followed, so devices or methods that will automatically enforce compliance with the local watering mandates are required, either alone or in combination with smart water technology such as those herein described.

The methods and apparatus of the present invention may be provided in a commercially available device having some or all of the following components: a means for an operator to enter data into the controller, such as a keyboard, touch screen, dial, magnetic card readers, remote or wireless device; a microprocessor or microcontroller to compute and adjust the irrigation schedule according to the present invention, based upon internal and external data; one or more data storage means (which may or may not be integrated with the processor), such as random access or read-only memory chips, or hard drives, containing the present invention and zip code or latitude and extraterrestrial radiation lookup tables and other data used herein, and storing the preliminary and adjusted irrigation schedules; a power source, either alternating-current (AC), direct-current (DC), battery, solar, ambient light, water, or wind powered; at least one temperature sensor, which may be provided in a separate unit that is in communication with the microprocessor (e.g., through a physical hard-wired connection, a wireless connection or radio transmission), or may be a component built into the irrigation controller; and means for controlling or limiting the water used by an irrigation system, such as cutoff switches or adjustable valves.

Additional optional features include at least one precipitation sensor, at least one relative humidity sensor, and a global positioning system (GPS). The precipitation and/or relative humidity sensor(s) may be provided in separate unit(s) that are in communication with the microprocessor (e.g., through a physical hard-wired connection, a wireless connection or radio transmission), or they may be components built into the irrigation controller. It is to be appreciated that each of the sensors may constantly or periodically provide a signal or input of raw data to the controller that is read, processed and used in determining the water budget ratio that will be applied to the irrigation schedule without performing any calculation of ET. The GPS system may also be provided in a separate (optionally removable) unit, or it may be integrated with the controller unit as well.

Some embodiments of the present invention are installed within a common poly-vinyl-chloride (PVC) irrigation pipe. The pipe may be inserted into the ground so that it extends only slightly above the ground to offer improved wireless reception. This placement minimizes the profile of the controller, increasing the aesthetic appeal of the surrounding environment and reducing the likelihood of vandalism. The controller utilizes wireless communication means (such as radio or infrared), allowing the operator to program the apparatus remotely. A temperature sensor is installed within the pipe at a position that minimizes sun-loading effects. Such a location may be near or just below ground level, or on top of the pipe under a shaded and ventilated cover. An optional precipitation sensor, with or without a rain-catcher, may be mounted at the top end of the pipe to detect rainfall, or at another location in wired or wireless communication with the controller.

A preferred embodiment is battery-powered, using commercially available technology emphasizing energy conservation and the long-distance operation of irrigation valves. Significantly extended battery life, and the extended range of DC valve operations, such as those disclosed in this inventor's U.S. Pat. Nos. 5,914,847 and 6,351,366, allows the controller to be placed in remote areas, without the need for AC power or solar panels. Such battery power minimizes the dangers of power surges and outages, and improves electrical safety and aesthetic appeal. It also eliminates the installation and maintenance cost of power meters, and their unattractiveness in the landscaped area.

Alternative embodiments provide for an irrigation controller or module to be housed within a valve box, with externally mounted temperature and optional precipitation, relative humidity, or wind sensor(s) affixed upon the valve box or elsewhere, and provided in wired or wireless communication with the controller or module. The unit may be powered by using any one or more of the power sources described above, depending upon its particular placement relative to such available sources. This approach may be better suited for certain residential, commercial, and turf irrigation applications.

Other embodiments provide for the controller or module to be housed in its own enclosure that is provided in near proximity to an AC power source, and to the switches or valves to be operated. The temperature sensor and optional precipitation/humidity sensors may be mounted on the enclosure, or provided nearby in wired or wireless communication with the unit. A typical application of such an embodiment is a residential controller installed inside the garage. In this case, the temperature sensing probe can be routed out of the garage in the same manner as the valve wiring and exposed to the ambient temperature. One or more additional optional sensors (e.g., a precipitation sensor) can also be mounted outside the garage such as on an eave.

In commercial use with AC power, the operator first attaches the irrigation controller or module to an existing irrigation system. This can be done at any time of the year, not merely during the summer months. He also installs the temperature sensor within the target geographical area, and initiates its communication with the controller. An optional readily available rain sensor and/or humidity sensor may also be installed, and placed in communication with the controller. Finally, an optional GPS system may also be installed and placed in communication with the controller.

With the most basic programming methods, that can be used worldwide, the operator initially programs the controller using either a data entry device at or on the controller or its enclosure, or using wireless or radio input that is received by the controller. The programming steps are as follows: the user first enters the current date and time (e.g., time-of-day, month, day, and year). The user then enters the expected summer high (referred to herein as the "stored" or "standard") temperature at the particular controller location. The user then provides the latitudinal location of the controller. The latitudinal location may be determined by the operator from information provided by various sources, such as online databases or a reference chart in the controller owner's manual. Alternatively, the latitudinal location may be determined by the controller itself when the operator enters the local zip code, the controller using an internal lookup table to match the zip code with an approximate latitude. An exemplary initial setup screen would thus have an appearance similar to the following:

| | |
|---|---|
| Current Time/Date: | 10:15 AM Feb. 15, 2004 |
| Expected Summer High Temperature: | 98° F. |
| Latitude of this Location: | 36 N |

As an alternative to entering the local latitude and average summer high temperature, and as the preferred embodiment, the end user may simply enter a local 5-digit zip code. In 1993, Oregon State University developed a Spatial Climate Analysis Study. The result was entitled the "PRISM" model (Parameter-elevation Regressions on Independent Slopes Model) which takes all the zip codes in the United States and reports 10, 20 and 30 year averages of various climatological data such as maximum, minimum and average temperatures, rainfall, etc. The study took 4 kilometer square areas of the United States, and using the closest weather stations, interpolated the meteorological parameters taking into account topography such as elevation and proximity to water bodies. This study and data is recognized by the USDA National Resources Conservation Service, the Forest Service, and the NOAA Office of Global Programs.

By entering a zip code into the controller, the latitude and average summer high temperature may be automatically determined using such stored historical data. This eliminates the need for the user to enter the local latitude and estimated summer high temperature manually, simplifying the programming procedure further. This approach still requires providing the controller with an initial (summer) irrigation schedule. An example programming screen for this approach appears as follows:

| | |
|---|---|
| Current time/date: | 10:15 AM Feb. 15, 2004 |
| Local zip code: | 93711 |

In other embodiments, a GPS system is provided either with the controller or module, or in a separate, optionally removable unit. Upon power up, the GPS system determines the location (through satellite communication or the like), which is provided to the controller. Then, as with the zip codes discussed above, the latitude and/or average summer high temperature may be automatically determined from stored historical non ET based data using the position information from the GPS system, instead of user input. The user must still provide an initial irrigation schedule. In a preferred aspect of this embodiment, since the controller is not generally intended to be moved after it is deployed, the GPS system may be removed after the controller position is determined and downloaded, with the position information stored in nonvolatile memory. Alternatively, the GPS system may be part of the deployed controller system, and remain with it.

As an alternative to the GPS method or zip code entry from which the controller or module internally determines the latitude and the average summer high temperature for that PRISM cell, that information or zip code could be inputted by the local irrigation distributor along with the date and the local time at or before the time of delivery of the unit. In this manner, the end user would only have to program the controller for its summer irrigation schedule and connect the temperature sensor and optional other sensors.

The controller requires a preliminary (preferably summer) irrigation schedule. This may be a default schedule, or an initial schedule provided by the operator. This preliminary schedule may be obtained from a system designer, consultant, equipment distributor or architect, any of whom may recommend an appropriate summer irrigation schedule based on the soil type, slope, variety of landscape vegetation, types of valves and sprinklers, and water available for that particular area.

The controller or module then automatically determines the extraterrestrial radiation factor (RA) for the standard date and location from a look-up table stored within the unit. The RA utilized by this invention must be distinguished from the solar radiation value (Rn or Rs) provided by weather stations and sensors, and utilized by ETo formulas. Specifically, RA is a function of the angle at which the sun strikes the earth at various times of the year at various latitudes, while solar radiation is a measure of the actual intensity of sunlight at a particular time. The zip code entry (or other location information input) determines the latitude and the historical average summer high temperature for that zip code/location. The latitude in turn determines the extraterrestrial radiation factor, which comprise the stored historical geo-environmental data of this invention.

The controller or module then automatically calculates the standard temperature budget factor (STBF) using the summer high temperature, its date and the latitude, and any number of relatively simple formulas utilizing the RA value for the high temperature date. Specifically, and as described in greater detail herein, one method of calculating the STBF is to multiply the high summer temperature (from a stored table, or provided by the operator) by an RA (the RA determined by the particular geographic location of the controller, and either the estimated date of the summer high temperature or the average summer RA values for the particular geographic location). The STBF is then stored within the controller and used for subsequent determinations of the water budget ratio (WBR), as described in greater detail herein.

The controller or module also obtains the actual high temperature and RA for the particular current period, the former from its temperature sensor and the latter from its internal look-up table. Such periodic data is used to calculate the periodic temperature budget factor (PTBF). The PTBF is calculated utilizing the same formula for calculating the STBF, but using currently available data.

In one aspect of the invention, the controller or module then computes the WBR by dividing the PTBF by the STBF. This ratio is then used to adjust the preliminary irrigation schedule for that particular period. In this aspect of the invention, preliminary irrigation schedule may be multiplied by the WBR to obtain the modified (actual) irrigation schedule. The present invention then irrigates the irrigation area pursuant to the modified irrigation schedule, as described in greater detail herein.

Because the present method relationally adjusts the irrigation station times or varies the watering schedule or watering days, it is suitable for nearly all conditions and locations. It inherently compensates for all of the characteristics and specifications of the existing irrigation system—unlike the prior art, it does not require multiple complicated formulas or variables. The method also inherently compensates for particular environmental conditions. For example, it may be applied to the "cycle and soak" method commonly utilized for sloped landscapes, since the present method increases or decreases the initial irrigation schedule for the sloped landscape based upon the WBR.

Several alternative embodiments of the present invention provide a temperature budgeting module outside of a stand-alone irrigation controller. Such a module is placed along the output path of an existing irrigation controller, so that it intercepts and processes any signals (typically the 24 VAC) from the controller to the irrigation system. Such modules permit the operator to add the desired features described herein to any existing irrigation controller without replacing the old controller entirely. In most embodiments, such a module will include a temperature sensor for use in determining current local temperature, to be used in calculating the WBR as described herein. In other embodiments, such a module may include additional optional sensors (e.g. precipitation, relative humidity, wind, etc.). In other embodiments, such a module may include a receiver for receiving a signal containing the WBR. In other embodiments, the signal received by the module may include any or all of the following information: current temperature, precipitation/wind information, and/or other information that is used by the module to calculate the WBR.

Other alternative embodiments of the present invention permit the operator to install the present invention upon an existing irrigation controller by making the appropriate software changes to the instruction set of the controller, and by adding a temperature sensor to an available input port.

Some embodiments of the present invention do not require the operator to input the actual date of the expected high temperature. Instead, the present invention may assume that such date occurs during the summer months, and average the RAs for the summer months to obtain an average RA for the STBF calculation.

Other embodiments of the present invention allow the operator to input the temperature, date and preliminary irrigation schedule for any time of the year. The present invention then determines the STBF from such data. The WBR remains accurate due to the ratio relationship between the PTBF and STBF, as described herein.

Other alternative embodiments of the present invention utilize AC power instead of battery power. While the latter is the preferred embodiment herein because it is the most technically challenging due to its power availability limitations, residential applications constitute over half of all landscape irrigation controllers, and virtually all of these residential controllers are AC-powered. Such embodiments may be installed anywhere upon the residential property, such as within a garage. They may be operated by input means built into the controller, or by wireless transmission from a remote. The temperature and rain sensors are mounted outdoors to measure ambient temperature, at various locations (such as the eave of the garage). These sensors may be hardwired to the controller or in short-range wireless communication with the controller. The method of calculating the WBR, and the operation of the cutoff switches and valves, remain unchanged.

Optional procedures may also be incorporated into the present invention. For example, after entering the expected summer high temperature and latitude or the zip code, the operator may specify the minimum irrigation temperature. This insures that the irrigation schedule is not activated when the temperature is near or below a certain point, such as freezing temperature. Such minimum temperature requirement serves two primary purposes—first, to conserve water, and second, to protect the safety of vehicles and pedestrians traveling through the irrigation zone during freezing temperatures. A second option permits the operator to further adjust the irrigation schedule according to the particular circumstances and/or limitations, such as the water delivery method utilized by the irrigation system, the specifications of the system, or the type of plants being watered. This allows the operator to fine-tune the irrigation schedule based upon personal experience, observations or unusual field situations. A third option is to attach a commonly available precipitation sensor to the irrigation controller, either directly or indirectly as a separate unit in communication with the irrigation controller (e.g., through a physical hard-wired connection, a wireless connection or radio transmission) or as a component built into the irrigation controller, so that the controller may detect the occurrence of rainfall and suppress the irrigation schedule during the affected periods.

The particular effect of current or recent precipitation upon the irrigation schedule may be determined by the operator.

For example, the operator may cause the present invention to suppress the irrigation schedule if precipitation occurred within the previous twenty-four hours, or only if precipitation is occurring at the particular moment of irrigation. It is to be appreciated that a precipitation sensor (switch or precipitation measuring device) may periodically or constantly provide a signal or input to the controller or module that is read, processed and used in determining the water budget ratio that will be applied to the irrigation schedule, and that the mere presence of such a signal alone is not sufficient to terminate any irrigation cycle. The precipitation sensor may be a rain switch or rain sensor that measures actual rainfall. In some embodiments, the signal may only be provided once, or at periodic intervals, during which the controller reads and stores the data from the signal. Then, at a later time (such as just before an irrigation cycle is scheduled to commence), the controller processes the previously read and stored data to determine whether to shorten or skip the irrigation cycle. It is to be appreciated that at the time this processing is done, the signal may no longer be present.

In other embodiments, the previously disclosed controller or module housed inside a PVC pipe may be alternately mounted inside a valve box. A number of manufacturers offer valve box controllers in residential or commercial applications. These controllers are virtually all battery powered, as described by this inventor's U.S. Pat. No. 6,335,855 entitled "Battery powered programmable remote switch controller." Temperature budgeting could be incorporated into these controllers which can be programmed directly by removing the valve box cover and inputting the irrigation program by means of data entry switches, or by downloading the program by using a portable programming unit which is then plugged into to the valve box controller. These valve box controllers can also be programmed by a wireless hand held programmer. These controllers would incorporate the same geo-environmental (non ET based) data as previously described (summer average high temperature and latitude or zip code) which can be obtained from the PRISM model and calculate the water budget ratio with the daily high temperature data from a wired or wireless temperature sensor. In this and other embodiments, a central temperature sensor or other regional broadcast of temperature could be used to provide the temperature and rain information to a large number of valve box controllers over a wide area with common latitude and average high temperature.

In cases where a central broadcasting temperature/rain sensor system is not available or feasible, or it is not practical to mount a temperature sensor near the valve box above the ground, an alternative approach provides the battery powered valve box controller with its zip code or other local geographic information, which determines the STBF. With the PRISM data, it is feasible to provide the valve box controller with its daily or periodic historical RA and average temperatures, providing the means for an approximate WBR calculation. While this is not a real time WBR calculation, it is an improvement over no periodic water budget adjustment, therefore saving the labor of frequent water budget adjustments during the course of the year, resulting in some water conservation.

In other embodiments of the present invention, the controller or module (AC or DC, solar, inside valve box, etc.) does not itself calculate the WBR. A centrally located processor with rain and temperature sensors is pre-programmed with the 5-digit zip code or other local geographic identification information, which determines the average summer high temperature and latitude for that and other environmentally similar zip codes. As noted previously, zip codes are preferred for use within the U.S. because of their simplicity. For worldwide applications where there are no zip codes, the summer average high temperature and latitude can be substituted. This apparatus can be called a CBM (Central Broadcast Module). While measuring the daily temperature and monitoring for rain with any one of a variety of commonly available rain switches, rain tipping buckets, or the like, embodiments of the centrally located processor calculate the WBR and transmit the WBR percentage to all controllers or modules within their range in a wired or wireless configuration. The CBM may or may not also transmit any weather sensor data to the remote controllers or modules. Typically, these embodiments forward only the calculated WBR by wired or wireless means, much like ET data is currently transmitted to irrigation controllers. However, in alternative embodiments, other data (e.g., temperature, wind, precipitation, and/or controller/module identification information) may also be transmitted. The basic water budget factor is the WBR =PTBF/STBF, as discussed previously. In a wireless configuration incorporating a rain switch or some other sensor, this equation can be further refined as follows: $WBR_M = STBR/PTBF \times ESF$ where $WBR_M$ is the modified water budget ratio (modified based on the additional sensor input), and ESF is the Environmental Sensor Factor, which can consist of a rain, wind, humidity, or solar sensor, or combinations thereof.

As an example, when the rain switch is closed (when it is not raining), ESF=1, not affecting the WBR. In the case of rain, this factor can be a small number (less than 1) decreasing the $WBR_M$ to a percentage at or near 0. The same method is used to restrict or eliminate irrigation during cold temperatures if the temperature is below a set point. In this embodiment, the WBR is calculated remotely outside the controller or module and transmitted to the controller(s) or module(s) within its hard-wired or wireless proximity. This embodiment is suitable for battery powered valve box controllers, commercial AC or DC powered controllers, or central control systems in larger projects such as parks, schools, golf courses, and large apartment complexes.

There are a number of advantages to this remote approach to transmitting the WBR using a CBM:
1. The individual controllers do not have to be programmed individually by zip codes. Even the current time and date can be transmitted to the remote field or slave controllers from the central processor.
2. There are no significant data storage requirements for the remote controllers. All the zip code information and look up tables are eliminated as this data is incorporated into the CBM. The remote controllers merely execute the water budget ratio prescribed by the central processor suitable for their local area.
3. This simplifies the modifications to the software in each of the remote controllers. Since most irrigation controllers already incorporate a method of changing the watering times by means of a manually-entered universal water budgeting software, it would be a simple conversion to automate this budgeting method with the temperature budgeting WBR approach.

In yet another embodiment that demonstrates the extensive flexibility of the temperature budgeting method of the present invention, a temperature budgeting module (TBM) may be provided between any existing irrigation controller's output and its cutoff switches (valves).

At this point, a distinction is made between the CBM (central broadcasting module) and the TBM (temperature budgeting module). In most embodiments, both the CBM and the TBM are capable of calculating a daily (or periodic) watering budget by comparing the historical average summer high temperature at that location and the daily high temperature readings and the time of the year. If additional sensors are provided, a $WBR_M$ may also be calculated. However, in some embodiments, the WBR (or $WBR_M$) is calculated by the CBM and broadcast to one or more TBMs (or controllers). Such TBMs (or controllers) in these instances do not have to perform the WBR (or $WBR_M$) calculation, and therefore do not require their own temperature (or other) sensors. These TBMs (or controllers) then modify their associated irrigation schedules according to the WBR (or $WBR_M$) received.

It is to be appreciated that the calculation provided by the present invention is frequently expressed as a water budget ratio (WBR). This is done to clarify that the resulting calculation is a percentage, which is a ratio of two numbers, and to insure that the water budget is not misinterpreted as a volume of water (such as a number of gallons, cubic feet, or acre feet). In this invention, the terms "water budget" and "water budget ratio" may sometimes be interchanged, both meaning a percentage and not a budgeted volume of water. Also, it is to be noted that the use or transmission of the WBR is a percentage (by definition) and not a transmission of ET or any climatic data from which any ET calculation can or will be performed. The temperature sensor, and optional rain, wind, humidity, solar and/or other sensors (used for $WBR_M$ calculations) may be hard wired to or incorporated integrally with the CBM microprocessor for the WBR or $WBR_M$ calculation, and the CBM then provides a percentage (water budget ratio—WBR or $WBR_M$) of summer irrigation to one or more irrigation controllers (or modules), by wired or wireless means. Each controller or module receiving the WBR or $WBR_M$ uses it to adjust the output durations, watering days, and/or watering intervals (watering schedules). These methods would normally require hardware and software changes within the controllers to accept and process the WBR or $WBR_M$. However, TBMs containing the appropriate programming may be installed with existing controllers to receive the WBR or $WBR_M$ from the CBM, and accomplish the modification of the controller's irrigation schedule(s) without having to make modifications to the controller. From programming viewpoint, using a TBM means that no user programming change is required in the controller.

A typical TBM requires no controller hardware, software, or programming changes in the existing controller, and is compatible with any new or existing 24 VAC output controller (about 90% of all controllers). With minimal adaptations, it is also compatible with DC controllers. It affects valve operation directly either at the outputs of an irrigation controller, as shown in FIG. 13, or at the valves in the field as shown in FIG. 13E and described below in example 4. A small inexpensive module is placed at each valve or set of valves, and can modify valve operating time without having to change or modify existing controllers. It is estimated that scores of millions of controllers are in current use and operating about 100 million valves in the U.S. The TBM embodiment allows every irrigation system valve and controller to be temperature budgeted without changing controllers, valves, or the wiring from the controller to the valves.

The TBM can be programmed with its zip code by any number of methods such as being pre-programmed at the factory based upon its sales destination, programmed upon receipt at the retail or wholesale location, or field programmed by means of a small display and/or adjusting switches. By way of example only, and without limiting the foregoing, one method of programming the zip code is with a dip switch labeled numerically from 0 to 9. If the zip code is, for example, 93711, the #9 dip switch is flipped on for one second and turned off, then the #3 dip switch turned on for one second and turned off, then the #7, then the #1, then #1 again. Or, five dip switches may be provided, with each switch being set to correspond to one of the digits of the 5-digit zip code. Using dip switches eliminates the need for a display or entry buttons, thereby reducing cost and size, and improving reliability. Other simple non-display data inputs are also contemplated in this embodiment. In some applications, a display may be preferred for visible ease of programming, particularly if a combination of smart technology is combined with time of use.

In a typical existing residential application, the homeowner may use an existing controller mounted in the garage. The user would normally already know the summer irrigation schedule based upon the original system design, or by experience. A temperature sensor with or without a rain switch is mounted outside the garage and the wires are routed to the TBM. The power to the TBM may be derived from the commonly existing 24 VAC transformer powering the existing controller, or the TBM may be self-battery powered. A typical residential irrigation system may have from 2 to 8 valves. The output from the controller to each valve is first wired to the input of the TBM (along with the wiring common). The output of the TBM is wired to the existing wires attached to the valves. Once these connections are made, the user programs the controller with its summer irrigation schedule during any time of the year and proceeds to operate the system as if it were summer. If no watering is desired at the time of the TBM setup, the common to the valves from the TBM could be disconnected so no actual irrigation occurs.

The homeowner may then activate the summer watering program by either programming an automatic start or performing a manually initiated semi-automatic cycle. The activated stations are each typically powered with 24 VAC, which is intercepted by the TBM. When the stations go off after the appropriate summer irrigation watering durations, the TBM microprocessor remembers the operating time of each station. Once every utilized station has been activated with its summer irrigation duration, the TBM stores that information within its memory. After this initial "training" or "learning" session, the common to the valves is reconnected for normal operation. The TBM uses the zip code information as discussed previously to calculate the STBF for that specific location. It then uses the temperature reading from its externally mounted temperature sensor to calculate its PTBF from which the WBR is calculated.

Each day, a new WBR is calculated by the TBM. Upon the next start of an irrigation cycle, as each station comes on, the TBM recognizes which station is activated from the output which is energized. Once the percentage of the summer schedule is reached, the TBM turns off the output prior to the end of its summer run time. The run time for each successive station is adjusted similarly. By this method, any existing controller, (residential or commercial) can be adapted to save irrigation water by adjustment of its output running time. Since it is recommended that deficit irrigation is preferred to over-irrigating, it is not likely that much more than 100% of summer irrigation would be required or necessary for the healthy growth of landscape vegetation.

An optional rain switch or sensor can be used to terminate the irrigation altogether with its signal to the TBM or the controller by means of a pre-determined reduced water budget percentage. An override method may also be supplied to the TBM which would allow manual operation of valves for maintenance purposes without disrupting the previously set irrigation time(s). This override can be in the form of a push-button or other switch which directs the TBM to ignore its WBR for that day or for some other suitable period of time.

No time of day or accounting for daylight saving time is required to be programmed within the TBM because it is only looking for a 24 VAC signal from the controller outputs. Only the date and month is needed for the WBR calculation, and these can be pre-set at the factory. It does not matter where the TBM is located since a time shift of a few hours does not affect the WBR calculation which is based on the day of the month. See FIG. 13 for a typical TBM installation. The signal from the temperature sensor to the TBM can be wired or wireless. The TBM itself is not an irrigation controller but a water budget calculator and proportional valve activator. See example 4 below for a discussion of a TBM mounted at a valve.

It is to be appreciated that in some embodiments, the temperature budgeting modules TBMs that are installed between existing controllers and their valves are capable of receiving the signal broadcast from a CBM. In these embodiments, instead of containing programming to calculate a WBR or $WBR_M$, these TBMs receive the WBR from a CBM, and then utilize the WBR in the same way as other TBMs described previously. These TBMs may be programmed to recognize that a broadcast of a reduced WBR (e.g., a WBR of 1% or less) means not to water on that day.

In an alternate method of modifying the irrigation schedule while using temperature budgeting, a threshold minimum water budget percentage level can be programmed into the controller, CBM, or TBM. For example, because of a non-porous soil condition, it may be preferred that deeper irrigation occurs to insure efficient watering into the vegetation root zone. Deeper watering generally requires a longer watering time. During colder months of the year, a certain day may have a temperature based calculated water budget of, for example, 12%. If the original summer run time was set for 8 minutes, the resulting irrigation would only be about 1 minute. In most cases, this is of little or no value to watering the plant root zone with low porosity soil. It may therefore be more efficient to both feeding the root zone and conserving water to set a minimum irrigation threshold of, for example, 60% of the summer station operating (run) time to allow for deep penetration. Accordingly, in these embodiments, the controller, TBM or CBM is programmed or instructed to accumulate the daily water budget percentages (e.g., the exemplary 12% daily budget above) until the 60% level is reached. The calculated water budget for each day is added until the threshold level is reached, which may result in a delay of four or five days before enabling irrigation. If the accumulation day falls upon a non-watering day in communities that have watering day restrictions, the budget is further accumulated until an allowed watering day is reached. (See FIG. 4A for the flow diagram illustrating this process.) In this manner, the same amount of the calculated watering need is supplied, but instead of watering for small percentages of time each day, deep watering occurs on an allowed day after a desired accumulation level is met, for more efficient irrigation, particularly in poorly porous soil conditions.

As mentioned previously, other embodiments combine the temperature budgeting smart water technology discussed above with the time of use method of restricting allowable watering days. The local community can choose to implement smart technology according to the present invention in numerous ways, including without limitation (i) incorporated within the controller to make it smart, (ii) added on as a TBM that can alter the outputs of any existing irrigation controller to make it smart, and/or (iii) as a CBM that communicates with one or a multitude of controllers or modules for selective or universal adjustments of remote controllers' station watering durations or watering schedules with the budget accumulation method, or by changing the watering intervals based upon the WBR.

In some fast growing communities, another significant water related issue is of great concern. Even if those communities have sufficient water supply, they may not have the pumping capacity or water delivery infrastructure to deliver that water. As a consequence, the delivered water pressure is inadequate for all water uses, including domestic and landscape needs. Those communities have adopted restrictions on landscape watering schedules such as limitations on allowed watering days or times of day during various times of the year. These limitations can be described as "Time of Use" (TOU) limitations or restrictions. An example of such a restriction is shown in FIG. 21. It would be desirable for such communities to be able to select smart controller technology, time of use limitations, or both, in one of the various implementations or embodiments set forth herein, to address their specific needs and limitations.

In larger commercial and municipal applications, central based irrigation systems are frequently used. Rain Bird® Maxicom2®, Rainmaster Evolution™, or the Toro Sentinel™ are examples of centrally controlled irrigation systems. Typically, a custom software package is loaded onto a dedicated computer at a central office and the irrigation schedules for a multitude of field (satellite) controllers are entered onto this central computer. A wireless signal (radio, satellite, pager, or the like) is transmitted to the field controllers directing them to operate the valves under their local control. Generally, all system operations can be controlled and/or monitored from the central computer. ET based data is commonly provided to those central systems by means of a local weather station or wireless ET data from an ET service provider. As an alternative to ET, embodiments of the present invention (e.g., a CBM) can provide the WBR or $WBR_M$ information to such a central computer which would then modify the irrigation schedules under its control, and periodically broadcast the updated irrigation schedules/programs to the field controllers as modified by the WBR or $WBR_M$. The CBM may be hard-wired to the computer through a USB port, RS232 input, or wirelessly provided to the PC with an interface receiver module.

In alternative embodiments, the necessary data and programming for computing the WBR may be incorporated into the central computer itself, and a communication link (wired or wireless) established to a local temperature sensor. In this way, the same central computer can receive the temperature information, calculate the WBR, and modify the irrigation schedules of the controllers under its control. If any of the optional environmental sensors (precipitation, wind, humidity, etc.) are used, the central computer may also use this information to calculate a $WBR_M$ and provide appropriate modified instructions to the controllers under its control.

With any of the herein described methods, all irrigation stand alone controller models incorporating the present invention would appear, install, and program virtually identically to their non-smart predecessor. This approach would have great advantages from a manufacturing and marketing standpoint for the manufacturers:

1. Front panel programming remains virtually identical to non-smart models.
2. Plastic molds for enclosures and front panels and other parts are the same.
3. No need to resubmit units in most cases for updated Underwriters Laboratories testing for safety.
4. Controller is the same size and shape and mounts interchangeably with previous unit, including its wiring.

5. Same programming means that manufacturer's salesmen, sales representatives, inside technical support, distributors, or contractors would not have to be retrained.
6. End users would already be familiar and comfortable with the new temperature budgeting smart models.
7. Temperature budgeted smart controllers would meet the California requirements for smart water technology by 2012.
8. Should meet the national EPA WaterSense labeling requirements.
9. Qualifies for smart controller rebates in areas where available.
10. Temperature budgeting has no monthly service fees.
11. Requires no expensive weather station.
12. Extremely cost effective to manufacture.
13. Simplest programming controller available.
14. If provided as a CBM, can provide wireless smart technology to a large number of irrigation controllers.
15. If manufactured as a Time of Use and Smart controller combination, provides various communities the choice of using one or both technologies within one enclosure within the controller, in TBM module, or as a centrally broadcast (CBM) water saving or infrastructure demand reducing means.

There may be applications where there is no convenient location for locating a temperature sensor and/or a precipitation sensor. One such example may be a street median where it is unsightly to mount a temperature sensor or precipitation sensor on a tall pole. In addition, the controller may not be equipped to receive a wireless signal from a CBM. It would be very convenient if such a field (outdoor) controller with temperature budgeting software be self-contained. There are several problems to be overcome in order to accomplish this self contained embodiment. The first is that the temperature sensor must not be exposed to vandalism. Secondly, placement of the temperature sensor must be such that it should obtain a reasonably accurate ambient temperature reading. Issues concerning the optional precipitation sensor are that it should also not be subject to vandalism, that it be exposed to precipitation, but not exposed to the irrigation sprinklers themselves for the purposes of obtaining a modified water budget ratio.

In most applications, mounting environmental sensors on a separate pole is undesirable, aesthetically unpleasing, impractical, costly, or prone to vandalism. Research and experiments have shown that mounting the temperature sensor at or near the ground inside a pedestal (metal or non-metallic), provides temperature readings that closely approximate the ambient temperature. This avoids "sun loading" effects in an enclosure such as a pedestal that can increase the temperature reading by as much as 30% during the summer and adversely affect the water budget calculations. In addition, it is possible to mount a precipitation sensor only slightly elevated above the controller enclosure, or entirely within the enclosure (See FIGS. 18A and 18B). These embodiments provide a completely self-contained (outdoor mounted) controller with smart water technology. A precipitation or other sensor(s) could be mounted securely and compactly on top of the pedestal in a sturdy metallic housing.

It is therefore an objective of the present invention to provide simple methods, systems and apparatus for irrigation water conservation.

It is also an objective of the present invention to provide a variety of methods, systems and apparatus for irrigation water conservation that are naturally intuitive and that may be used in a variety of different configurations by people or entities in different circumstances.

It is another objective of the present invention to provide methods, systems and apparatus for conserving water by automatically adjusting irrigation schedules in response to varying climatic conditions.

It is another objective of the present invention to provide methods, systems and apparatus that utilize greatly simplified local, real-time meteorological data to calculate and maintain the irrigation schedule.

It is another objective of the present invention to provide methods, systems and apparatus that minimize the margins and sources of error within the automatically and climatically adjusted irrigation schedules by limiting the number of variables and relationships necessary to calculate and maintain the schedules.

It is another objective of the present invention to provide methods, systems and apparatus that may be embodied into or used with any irrigation controller that is inexpensive to manufacture, install, operate and maintain.

It is another objective of the present invention to provide practical water conservation methods, systems and apparatus means that can potentially save more water than theoretical ET methods because of its comparative cost and simplicity.

It is another objective of the present invention to provide irrigation controllers that are capable of adjusting existing irrigation schedules according to the geographic location of the controller and a recent temperature reading, without using ET.

It is another objective of the present invention to provide add on modules that may be used in conjunction with irrigation controllers to adjust the controller's irrigation schedules according to the geographic location of the module and a recent temperature reading, without using ET.

It is another objective of the present invention to provide a central processor or system that calculates an adjustment to be made to irrigation schedules and provides that adjustment by wired or wireless means to receivers which use the adjustment to modify the irrigation schedules of the controllers they are associated with.

It is another objective of the present invention to provide both smart water technology and time of use technology within a controller, within a TBM, or within a CBM in communication with one or more controllers or modules, in order to offer communities alternative choices for the most effective means to address their particular water related problems.

It is another objective of the present invention to provide temperature budget smart water and/or time of use technology for use in central irrigation systems.

It is another objective of the present invention to provide methods, systems and apparatus for incorporating smart technology to controllers without the need for externally mounted environmental sensors.

It is another objective of the present invention to provide methods, systems and apparatus that use modules that are added onto existing controllers to implement water budgeting, smart water and/or time of use technology without requiring the replacement of such controllers.

Additional objects of the present invention shall be apparent from the detailed description and claims herein.

BRIEF DESCRIPTION OF THE DRAWINGS

FIG. 6 is a table of extra terrestrial radiation values at various latitudes.

FIG. 9 shows a third party testing report for an embodiment of the present invention from the Center for Irrigation Technology conducted during May, 2007, based upon a test protocol developed in association with the Irrigation Association, the EPA, and various water purveyors and agencies.

FIG. 11A is a diagrammatic illustration of a Central Broadcast Module (CBM) with an optional rain switch mounted on the outside of a residential garage sending the WBR data to the controller in the garage.

FIG. 11B is a diagrammatic illustration of the CBM module of FIG. 11A mounted on a light, sign, telephone pole, or the like wirelessly communicating to one or more commercial or residential controllers, AC or DC powered.

FIG. 13B is a detailed view of the wiring of the TBM module of FIG. 13A.

FIG. 13C is a detailed view of the TBM of FIG. 13A.

FIG. 13D is a schematic diagram of a simplified TBM showing breaking the common

FIG. 21 illustrates a typical municipal watering restriction program.

DETAILED DESCRIPTION

Figure 1:
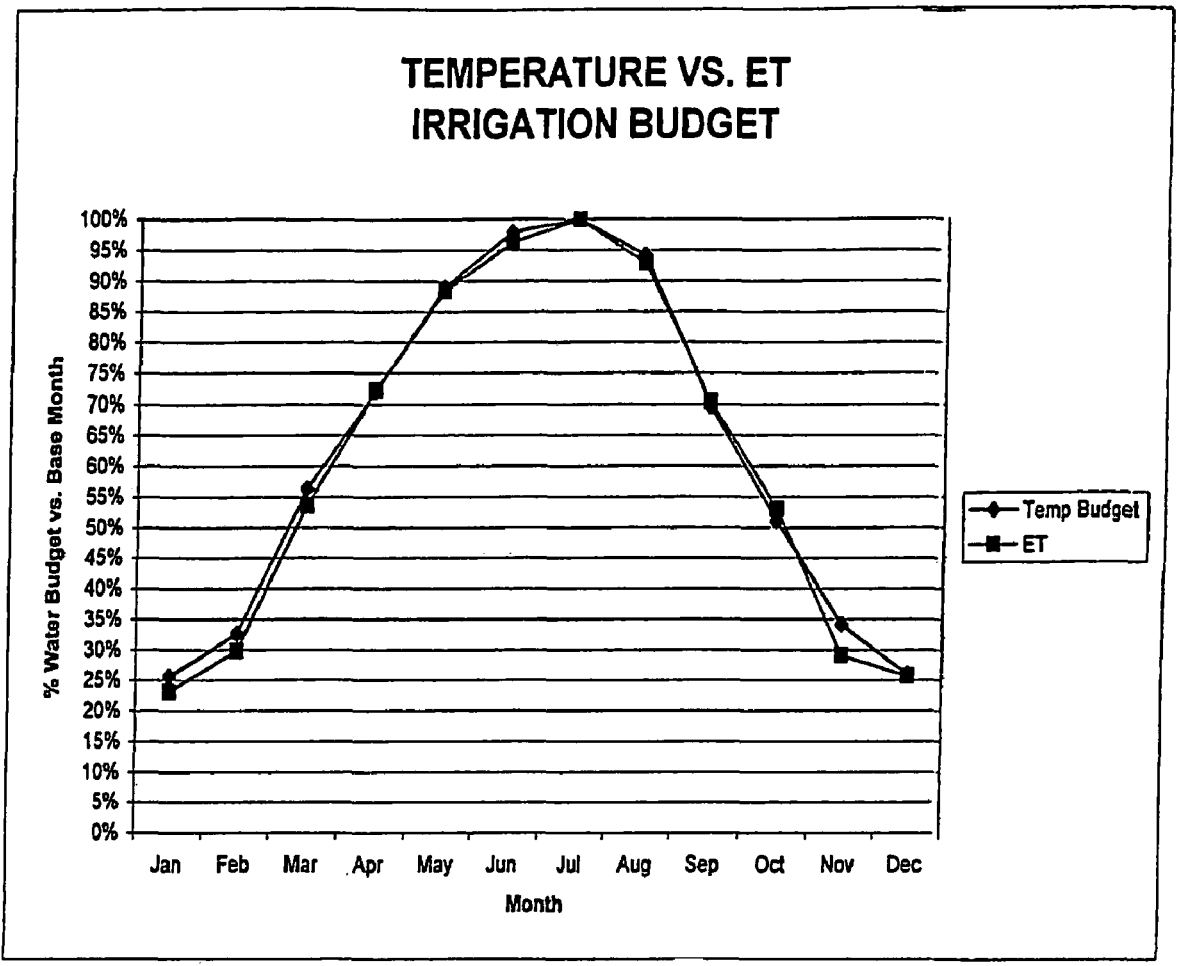
FIG. 1 is a comparison of evapotranspiration and temperature budget values in an analytical study for certain geographical areas of California over a five year period, beginning in 1997.

FIG. 1 compares the monthly ET values obtained using the Penman-Monteith formula (currently favored by the USFAO and CIMIS) with the ratios obtained utilizing the formula of the preferred embodiment described herein. Such comparison was made over a period of five years at twenty-five environmentally-diverse locations within the State of California. Both formulas used the same CIMIS data. For the Penman-Monteith formula, the published historical monthly ETo was divided by the historical summer ETo. The monthly temperature budget factors obtained by the present invention were similarly divided by the summer temperature factor. The ETo ratio is then compared to the WBR for relative accuracy. As indicated by FIG. 1, the values obtained using the formula herein closely approximate the Penman-Monteith, generally more so than the other ET formulas. This indicates that the present invention is superior to the other ET formulas, since a simple to understand method that is ninety-five percent as accurate as the current accepted 'standard' will save much more water than a more complicated method that is less accurate, and not as easily understood or utilized.

Furthermore, the present invention is advantageous over the Penman-Monteith, or any other ET formula, in that it achieves equivalent irrigation without relying upon the numerous variables and relationships of ET theory, or a subsequent calculation of irrigation time settings. Instead, the present invention utilizes only two variables—ambient temperature and the extraterrestrial radiation factor. Given this relative simplicity, and its intuitive approach, the present invention is much more likely to be adopted by the general public.

Another advantage of the present invention over the Penman-Monteith formula, or any other ET formula, is in terms of hardware costs. Specifically, in one alternative embodiment, only a temperature sensor is required—the existing irrigation controller, assuming that it satisfies certain minimum system requirements (such as the availability of an input port for the temperature sensor, sufficient memory to store the RA lookup table, and the ability to receive the software instructions for the present invention), may be used. This controller may be AC, DC, solar, or battery-powered.

Figure 2:
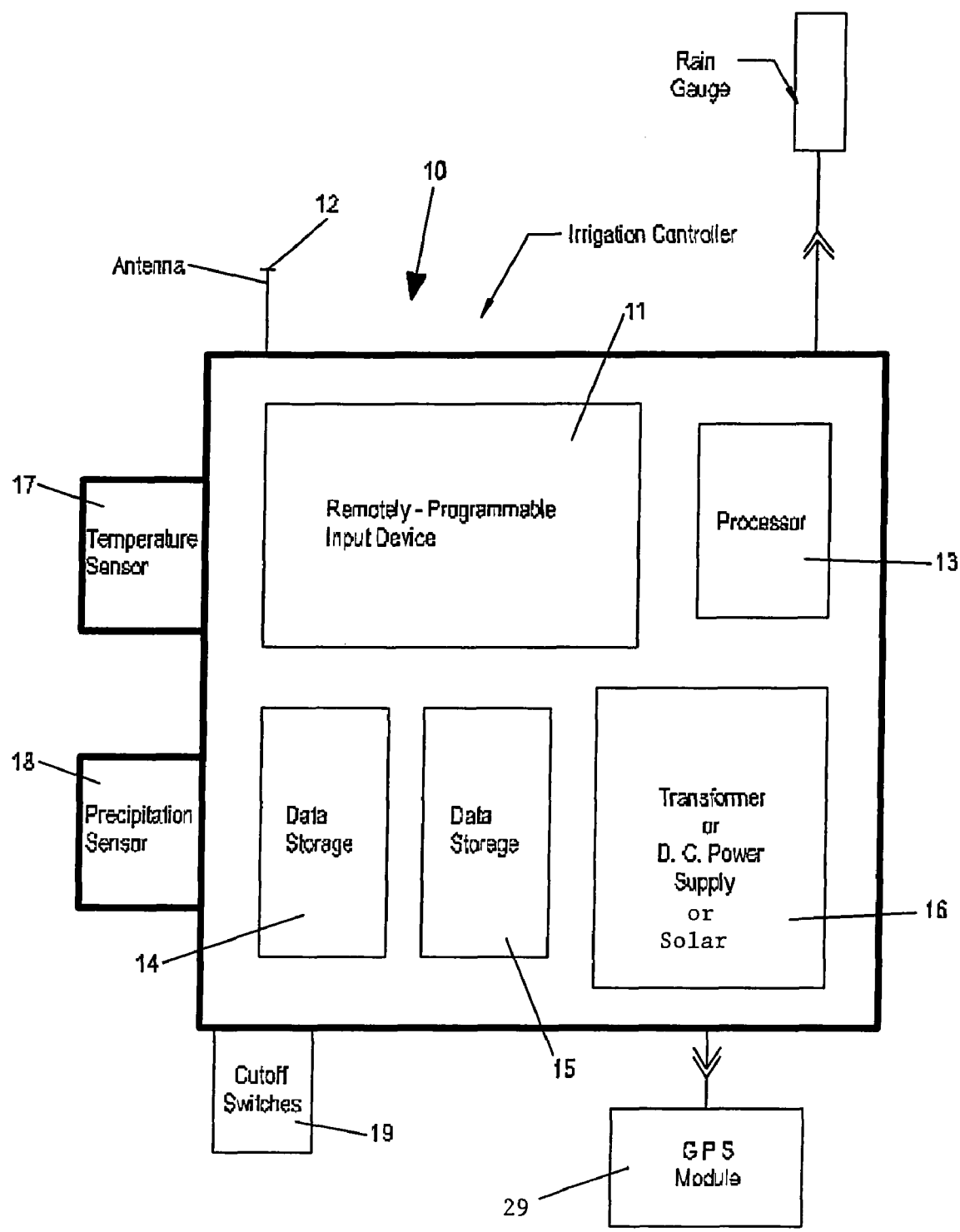
FIG. 2 is a block diagram of an irrigation controller embodying the present invention.

FIG. 2 depicts an irrigation controller 10 embodying the present invention. Such controller comprises the following components: a remotely-programmable input device 11 for entering data into the controller; an optional antenna 12 for receiving data from the operator via wireless means; a microprocessor or microcontroller 13; a first data storage means 14, such as a hard drive, containing a zip code/latitude lookup table formatted in a conventional manner, an extraterrestrial radiation lookup table formatted in a conventional manner, and the formula of the present invention, all for computing and adjusting the irrigation schedule based upon the data received; a second data storage means 15, such as a hard drive, for storing and maintaining the irrigation schedule information and data received by the controller; a battery, solar panel, or AC power supply, such as a transformer, 16; a temperature sensor 17 built into the irrigation controller or externally mounted in communication with the controller; an optional precipitation sensor 18, also built into the irrigation controller or externally mounted in communication with the controller; and one or more cutoff switches 19 for controlling water output from the irrigation system. It is to be appreciated that the first and second storage devices 14 and 15 may be integrated into a single storage device, and that either this single storage device or either or both of storage devices 14, 15 may be made part of the processor 13—potentially eliminating the separate storage devices 14 and 15 altogether. An optional GPS (Global Positioning System) receiver 29 may also be attached to controller 10.

Figure 3:
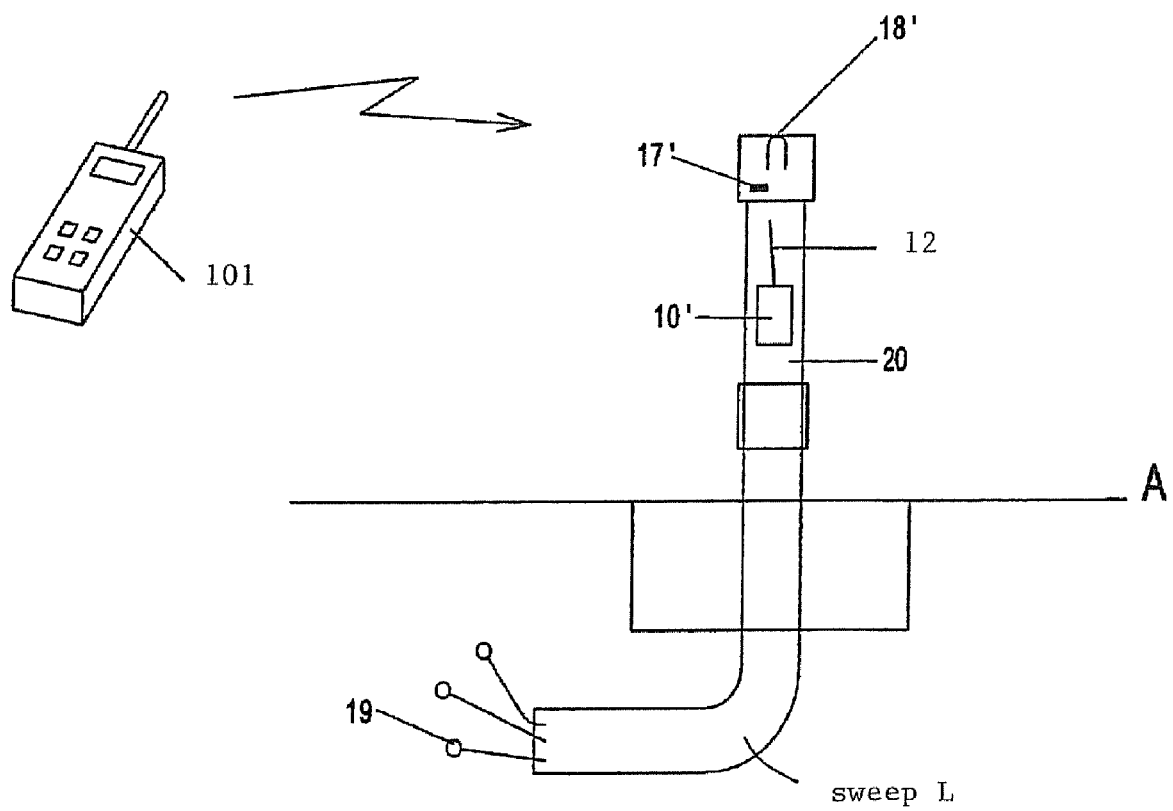
FIG. 3 is an environmental view of an alternative housing for the irrigation controller embodying the present invention.

FIG. 3 depicts an alternative housing for the irrigation controller 10' of the present invention. Here, it can be seen that the main body of the irrigation controller 10' (comprising the remotely-programmable input device 11, microprocessor or microcontroller 13, first 14 and second 15 data storage devices, and battery 16, none of which are depicted in this particular figure) and antenna 12 are placed above ground level A. The temperature sensor 17' and optional precipitation sensor 18' may be incorporated with controller 10' and mounted, for example on top of the pipe as shown. Alternatively, these sensors may be mounted above ground level A, and in communication with the irrigation controller 10' by wired means. The controller housing 20 (which may be a common PVC pipe) encloses and protects the controller 10' from the environment. The wires from the controller 10' to the cutoff switches (valves) 19 extend out of the housing 20 to the valves located in the field. It is to be understood that communications between sensors 17', 18' and the controller 10' may also be accomplished using wireless means by adding an antenna 21 to the sensors 17', 18' and the controller body 10', and placing the sensors in wireless communication with the irrigation controller 10'.

Figure 4:
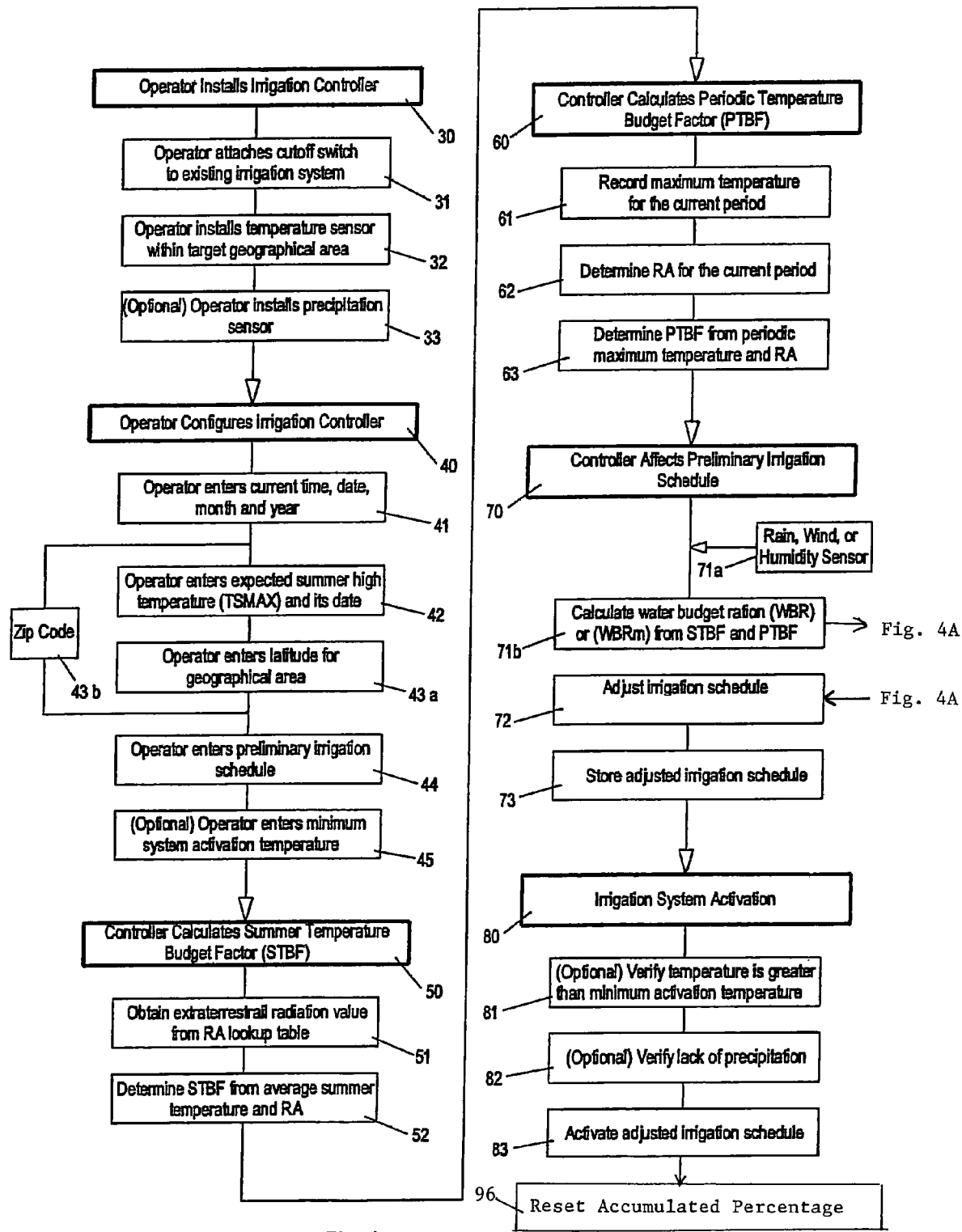
FIG. 4 is an exemplary flowchart depicting the complete and comprehensive steps of the present invention, including those steps performed manually by the operator.

FIG. 4 illustrates an exemplary method of the present invention when programming a temperature budgeting controller or TBM device comprising the following steps: first, the operator installs the irrigation controller or TBM device 10 (step 30) by attaching one or more cutoff switches 19 to an existing irrigation system (step 31) and installing temperature sensor 17 within the target geographical area (step 32). The optional precipitation sensor 18 or other sensors may also be installed within the target geographical area (step 33). These sensors are then placed in communication with the irrigation device 10.

The operator then configures the irrigation controller (step 40). In one embodiment, the operator enters the current time (e.g., time-of-day, and/or month, and/or day and/or year) (step 41). The operator also enters the expected maximum summer temperature ($T_{SMAX}$) and may enter the date of such temperature (step 42). The operator then provides the latitude for the geographical area (step 43a), if known. If the latitude is unknown, the operator may instead enter the zip code (step 43b) or some other geographical information (e.g., city, county, state, country, etc.) which the microprocessor or microcontroller 13 may use to obtain the latitude for the location from an appropriate internal lookup table. In the U.S., entering the zip code is more convenient. Outside the U.S., the user input may be made by means of a cellular telephone or pager. Alternatively, an optional GPS system could provide the controller location (zip code), and with that information the controller can automatically determine both the latitude and/or the average summer high temperature for the location. The operator also enters a preliminary (summer) irrigation schedule having one or more run times (step 44). The operator may also enter the minimum system activation temperature (step 45). All of this information may be stored within the first or second data storage means 14, 15, or in the processor itself.

In alternative embodiments, it is possible that little or no user input may be required. For example, in some embodiments, the processor may include an internal clock which already has the current date and time available, so no user input of this data may be required. In some embodiments, a default irrigation schedule may already be provided, so no user input of this information may be required. In some embodiments, a GPS system may be provided so that the user is not required to input any latitudinal information or zip code. Instead, the GPS system automatically determines the latitude and provides that information to the processor. In some embodiments, an internal table of average high temperatures according to general location may be provided, so no user input of this data may be required. It is to be appreciated that the scope of the invention includes any combination of user input and/or automatic determination of the following data items: (a) date/time, (b) irrigation schedule, (c) latitude or zip code, (d) expected high temperature and date. In a basic example, instead of entering the local latitude and expected summer average high temperature, merely entering the zip code would perform this function.

The microprocessor or microcontroller 13 then calculates the standard temperature budget factor (STBF) using the TSMAX and extraterrestrial radiation (RAS) (step 50). The RAS value is obtained from the extraterrestrial radiation lookup table within one of the data storage means 14 or 15 (or processor itself) (step 51), based upon the latitude of the location and the estimated date of the expected maximum temperature. If the operator did not provide a particular date for the expected maximum summer temperature, an embodiment of the present invention will generate a RAS value by averaging the RA values for the summer months (which may be November-January in the Southern Hemisphere). The STBF is then determined using the following formula: (step 52)

$$STBF = T_{SMAX} \times RAS$$

Using a summer RA factor is preferred because it is relatively constant throughout the summer months (June, July, and August, in the northern hemisphere), and those are the months that would typically require the highest amounts of irrigation. However, it is to be understood that the present invention is not limited solely to those particular RA values, and that the RA for any month may be used. In particular, other embodiments of the invention may allow for use of an average high temperature over a period of time (e.g., annual, bi-annual, quarterly, monthly, weekly, etc.) from which a corresponding RAS value is determined and used in the formula.

Another embodiment of the present invention would permit the operator to input a preliminary irrigation schedule and temperature for any time of the year, followed by the particular date such information is applicable. The date is then used by the device 10 to determine the applicable RA. Such value is likewise accurate when used with the ratio method of the present invention.

As the formula demonstrates, the maximum (standard) temperature (Ts$_{MAX}$) and extraterrestrial radiation (RAS) are the only factors required by the present invention to determine STBF. The Ts$_{MAX}$ directly affects the plants' water requirements. The RAS is important because evaporation is also affected by the angle at which the rays of the sun strike the Earth; such angles vary depending upon the latitude and the time of year.

The controller of the present invention then calculates the periodic temperature budget factor (PTBF) (step 60). Using temperature sensor 17, the device 10 records the maximum temperature (TP$_{MAX}$) for a particular predefined period (step 61). These temperatures are recorded by temperature sensor 17 on a periodic basis (e.g., hourly, daily, etc.), and stored within one of the data storage devices 14, 15 (or processor itself) until the end of the period. At the end of the predefined period, the microprocessor or microcontroller 13 calculates the PTBF using the maximum temperature (TP$_{MAX}$) for the period, and the current/present extraterrestrial radiation (RAP) for the same period. The RAP factor can be obtained or extrapolated from the chart (based upon the particular day, week, or month, as provided by the time-keeping function of the CPU) (step 62). For a subsequent period, the recorded high temperature for the previous period is replaced with the latest measured high temperature. If this is done on a daily basis, the previous high temperature is replaced with highest temperature recorded during the past 24 hours. To conserve controller memory, the RAP chart could be stored monthly in increments of two degrees of latitude, as depicted in FIG. 6. The microprocessor 13 could then determine the PTBF, as follows: (step 63)

$$PTBF = TP_{MAX} \times RAP$$

Once the PTBF is calculated, the microprocessor 13 may then affect the preliminary irrigation schedule (step 70), specifically by calculating the water budget ratio (WBR) as follows (step 71):

$$WBR = \frac{PTBF}{STBF}$$

A WBR value of one (1) indicates that the periodic TBF equals the summer TBF, in other words, that the irrigation needs for that particular period are satisfied by the initial summer-based irrigation schedule. Thus, no automated changes to the initial irrigation schedule would be needed for that particular period. A WBR value of greater than one would indicate that the PTBF was higher than the STBF, such that the irrigation needs for that particular period are greater than the irrigation needs for an average summer day. This would cause the controller to increase the irrigation schedule for the following period by a corresponding amount. A WBR value less than 1, which would be the case most of the time that is not during the summer, indicates that less irrigation is needed than the average summer day, causing a decrease in the irrigation schedule for the following period.

Figure 4A:
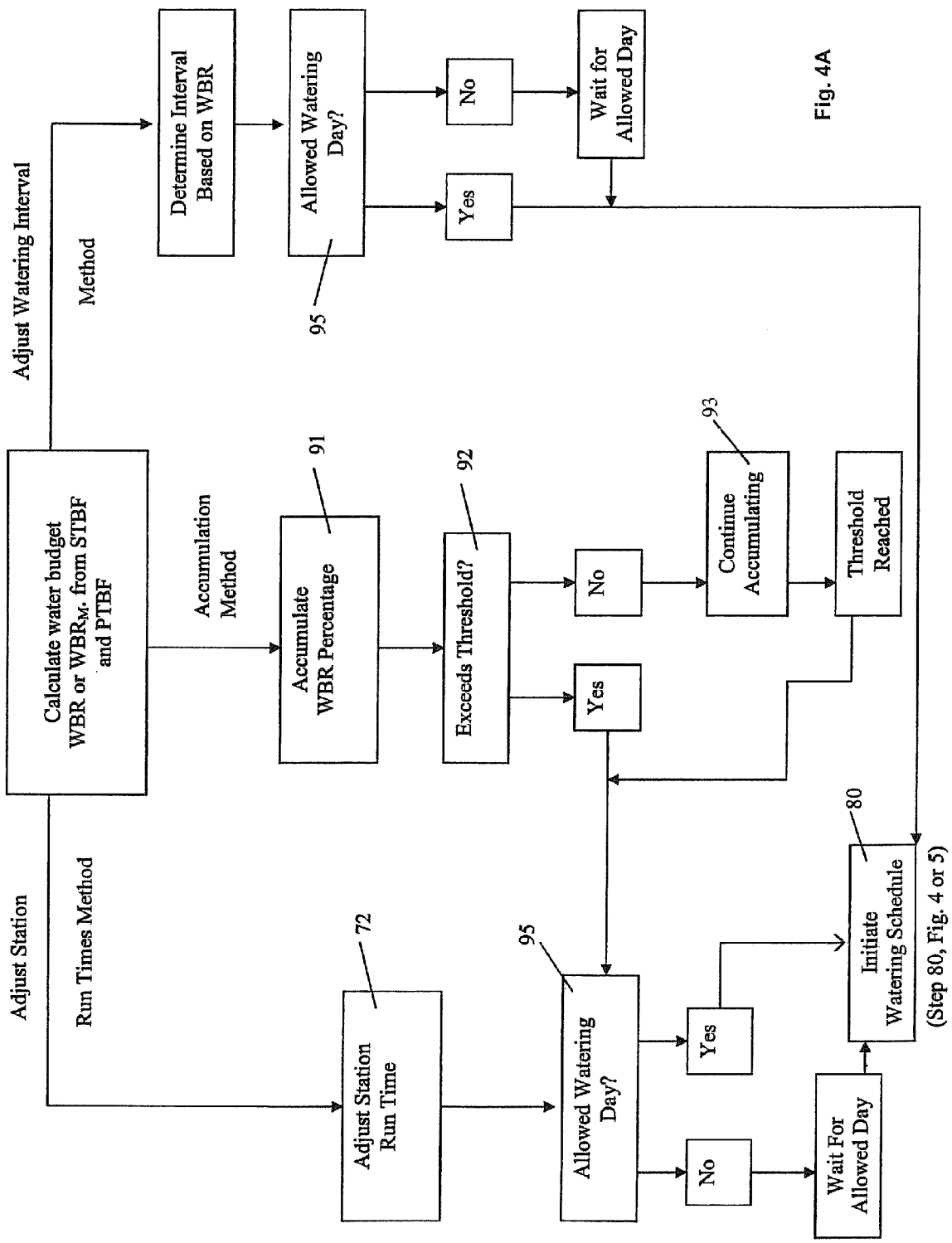
FIG. 4A is an exemplary flowchart depicting alternative implementations of a calculated water budget ratio (percentage, accumulation, and watering intervals).

If time of use (TOU) with accumulation of water budget percentages is used, or adjustment of station run times with time of use is used, the procedure starts with step 71b of FIG. 4, and proceeds as shown in FIG. 4A. Temperature budget adjusted station run times with TOU is illustrated on the left path of FIG. 4A. Here, the microprocessor or microcontroller 13 multiplies the preliminary irrigation schedule by the WBR value (step 72). This causes the irrigation schedule adjustment to be determined by the ratio of the two temperature and RA values, ensuring that the area does not receive too little or too much water. A check is then performed to determine whether watering is allowed on the current day (step 95). If not, no watering is performed. If so, watering takes place according to the adjusted irrigation schedule (step 80). This adjusted schedule is then stored upon the second data storage device 15, to be utilized for the following period (step 73).

If accumulation is used, processing continues as illustrated on the middle path of FIG. 4A. Here, the water percentage is added to any previously accumulated percentages (step 91), and compared to a pre-established threshold (step 92). If the accumulation meets or exceeds the threshold, then a check is performed to determine whether watering is allowed on the current day (step 95). If not, no watering is performed (step 93), and the accumulation carries over to the next day, and so on, until an allowed watering day arrives, whereupon watering takes place. In the interim, if there are consecutive non-watering days, additional percentages may accumulate for these days. When the watering eventually takes place, it will be according to the accumulated stored percentage, which is then reset to zero to start over (step 96). This allows for deeper watering according to the threshold established by the user on potentially fewer days. If the accumulation does not meet the threshold, then it is stored and carried over until the next day (step 93), and no watering occurs. When the next day arrives, the percentage for that day is then added to the accumulation, and so on, day after day, until the threshold is eventually met.

If the selected watering method is based upon adjusting watering intervals, the right path of FIG. 4A is followed. The calculated WBR determines the interval of days. For example, a WBR in the vicinity of 33% would change the watering interval to once every three days. A 50% WBR would result in watering every other day, and a 10% WBR would result in watering every 10 days—unless optional sensors are used indicating that it is raining, too cold, too windy, etc., in which case watering may be suspended (see Step 80 below). A check is then performed on the watering interval day to determine if it is an allowed watering day (step 95). If not, the irrigation is postponed until an allowed watering day arrives. Following irrigation, the interval is reset according to an updated WBR.

When the irrigation schedule calls for watering to take place (step 80), the irrigation device 10 may verify the temperature (step 81), using temperature sensor 17, and if provided, the precipitation, wind or other environmental sensors (step 82). If the current temperature is greater than the previously specified minimum system activation temperature, and there is no recent or current precipitation, wind or other prohibitive environmental factor (as previously defined by the operator), the device 10 activates the irrigation system (step 83) according to the adjusted/accumulated schedule. If either of those conditions fails (step 81 or 82), the irrigation system is not activated. This prevents activation of the irrigation system on very cold, rainy or windy days. Whether or not the irrigation system is activated, the device 10 also continues recording (step 61) the TP$_{MAX}$ values for subsequent PTBF calculation and schedule modification.

This method for adjusting the irrigation schedule may be used year-round, and at any geographic location. For example, the winter PTBF will typically be much lower than the STBF, resulting in a much lower WBR value. This in turn significantly decreases the irrigation duration, which is consistent with the average consumer's understanding that irrigation is not as necessary during the winter months. When the operator inputs a minimum temperature and/or utilizes the precipitation sensor, the present invention is able to significantly reduce or completely cease irrigation during unnecessary periods. In a typically wired installation from the temperature sensor and/or the rain sensor to the controller, the present invention is able to completely cease irrigation during unnecessary periods.

When optional rain, wind, or humidity sensors are used, their sensor input(s) can affect the WBR calculation (step 71a) by adding another factor to the WBR calculation: The modified WBR would be the WBR$_M$=WBR×ESF (External Sensor Factor). For example, if a rain switch is used, but insufficient rain has occurred to activate the rain switch or tipping rain bucket, the WBR would be unchanged: WBR=WBR$_M$ since an inactive rain or wind sensor ESF would be 1. If the rain is sufficient, or the wind exceeds a certain speed, etc., the ESF could be a very low number such as a 0.01 to effectively minimize, terminate, or inhibit the irrigation cycle.

It is important to recognize that the present invention does not store, receive, or calculate ET from environmental data. ET or ET data is used interchangeably to mean the calculated theoretical measure of how much water is needed to satisfy the landscape (or agricultural) vegetation in inches or millimeters of water per day, week, or month. Secondly, it should also be recognized that the present invention does not transmit any raw environmental data such as a rain cutoff signal, temperature, wind, solar radiation, or humidity. These environmental sensor data may be used by either the CBM, TBM or controller to calculate the basic WBR or the modified WBR known as the WBR$_M$ which may take sensor data other than temperature to calculate the WBR$_M$ which is then used to adjust irrigation schedules as described below.

Temperature budgeting can alter the irrigation schedule in one of at least three ways. First the summer station run times may be adjusted periodically during the year by the calculated WBR or WBR$_M$ (percentages). Second, an alternative method may be selected that accumulates the periodic water budget percentages to meet a minimum set watering threshold (a cumulative percentage). If the resulting threshold level falls upon a community mandated non-watering day, the periodic or daily temperature budgeted percentages continue to accumulate until an allowed watering day is reached. See FIGS. 4, 4A and 5 and example 5 for detailed sequences. A third method is to alter the interval of watering days by percentages. For example, a water budget percentage of 50% would cause irrigation every other day. A 30-35% budget would cause irrigation every third day, a 25% budget would cause watering every fourth day, and so on.

It is to be appreciated that the previous discussion of exemplary embodiments of the present invention is for illustrative purposes only, and is not meant to limit the claims herein, nor the numerous alternative embodiments that are also available. In particular, the same steps may be performed within a CBM device, or divided between performance by a combination of CBM and TBM devices.

Figure 5:
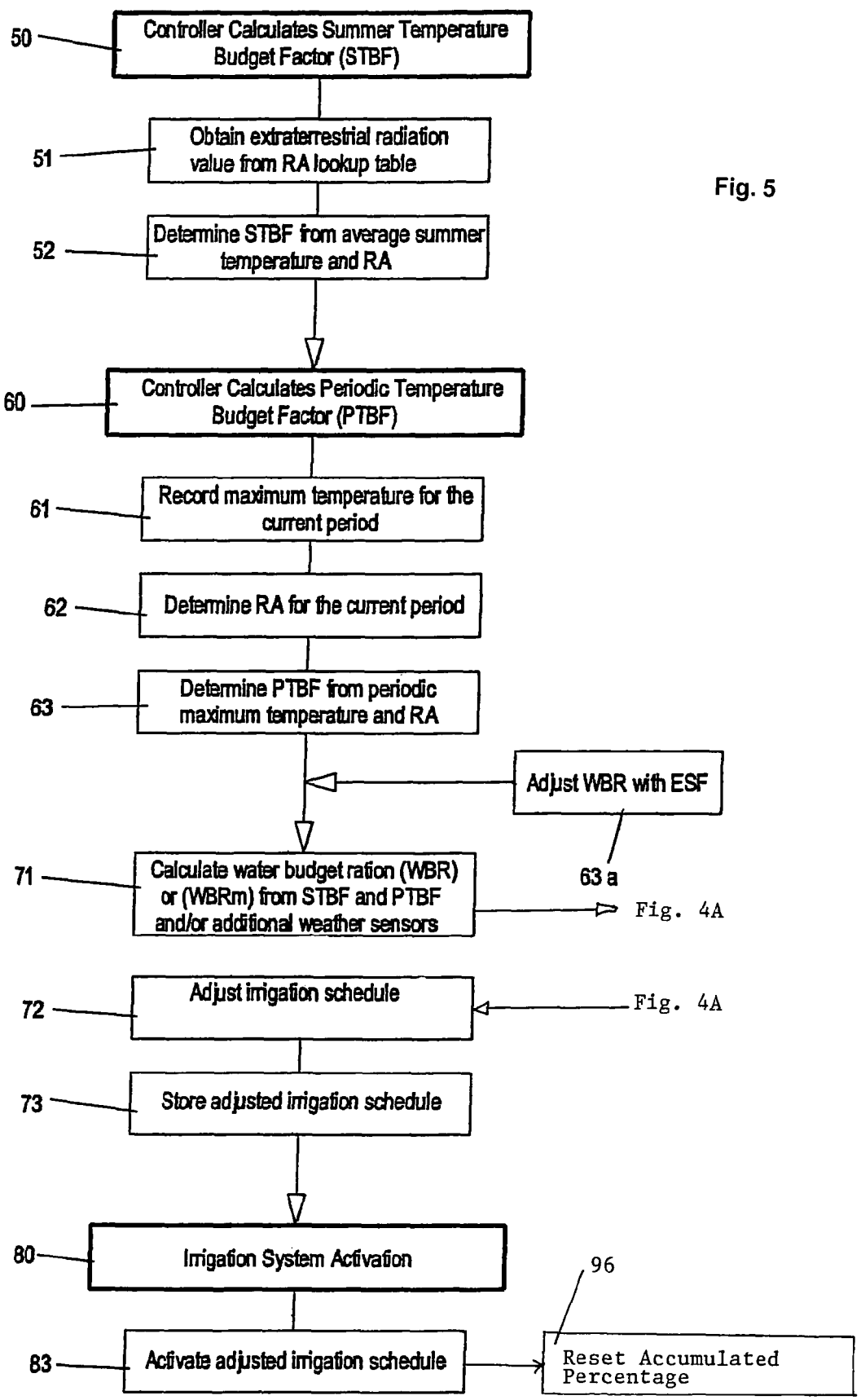
FIG. 5 is an exemplary flowchart depicting the basic steps of the present invention, particularly only those steps performed automatically by the controller embodying the present invention.

FIG. 5 depicts a portion of the method of the present invention performed by the controller, CBM or TBM device itself. From step 71b of FIG. 4. the sequence flows through FIG. 4A, then back to step 72 of FIG. 5. From this depiction, it is apparent that the present invention is able to automatically calculate and adjust the irrigation schedule in a simple manner, without resorting to the numerous and complex data and calculations found in the various ETo methods. Note that step 63a is an optional external input that can, under certain circumstances, affect the WBR with the ESF factor.

FIG. 6 is a published table of extra terrestrial radiation values at various latitudes. As indicated herein, this table is stored within the one of the data storage devices 14, 15 of an apparatus embodying the present invention, or within microprocessor or microcontroller 13.

Figure 7:
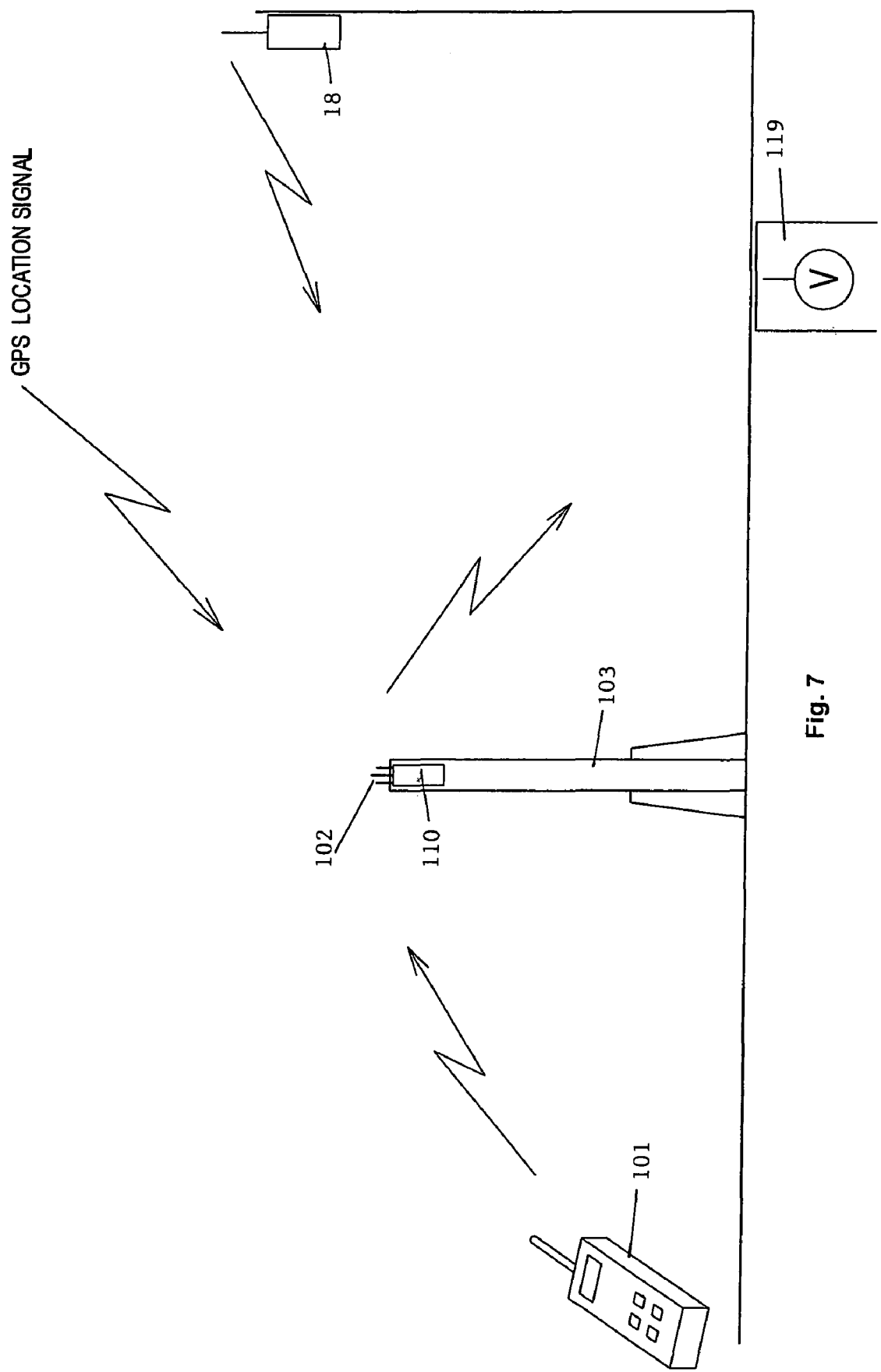
FIG. 7 is a diagram showing wireless programming, wireless rain and temperature sensor input, GPS input, and wireless control signal to valves remotely located from the controller.

FIG. 7 shows the block diagram for a wireless CBM embodiment. The programming is accomplished by means of a hand held or other remote unit 101. The controller 110 is mounted at a location such as on top of either a pipe or galvanized pole, on top of a decorative lamp post, on a wall or mounting post 103, inside a valve box, etc. The radio receiver antenna 102 is mounted adjacent to the controller. The rain switch 18 and temperature sensor 117 can either be mounted with the controller, or remotely located at a central point that can provide temperature and rain sensor data to a number of controllers in the area. The GPS data can be received by the same receiver in the controller to enable the controller to determine its zip code, thereby determining its average summer high temperature and latitude, which in turn determines the extraterrestrial radiation value for that location throughout the year. The valves under control of the controller 110 receive wireless signals from the controller to turn cutoff switches 119 on or off.

Alternatively, temperature, rain and/or other sensors may be mounted remotely from the controller, and the WBR or modified WBR calculation performed at this remote location. The WBR is then transmitted by wired or wireless means to one or more controllers located within the wired or wireless range of the transmitter. If the WBR is calculated at the remote sensor(s) location, the controller(s) do not have to store or process the geo-environmental data, but merely receive this data and adjust their irrigation schedules based on this information. The remotely located apparatus that stores and processes the geo-environmental data, senses temperature and/or rain (or other environmental conditions), calculates the WBR, and transmits the WBR is referred to as a CBM (Central Broadcast Module).

Figure 8:
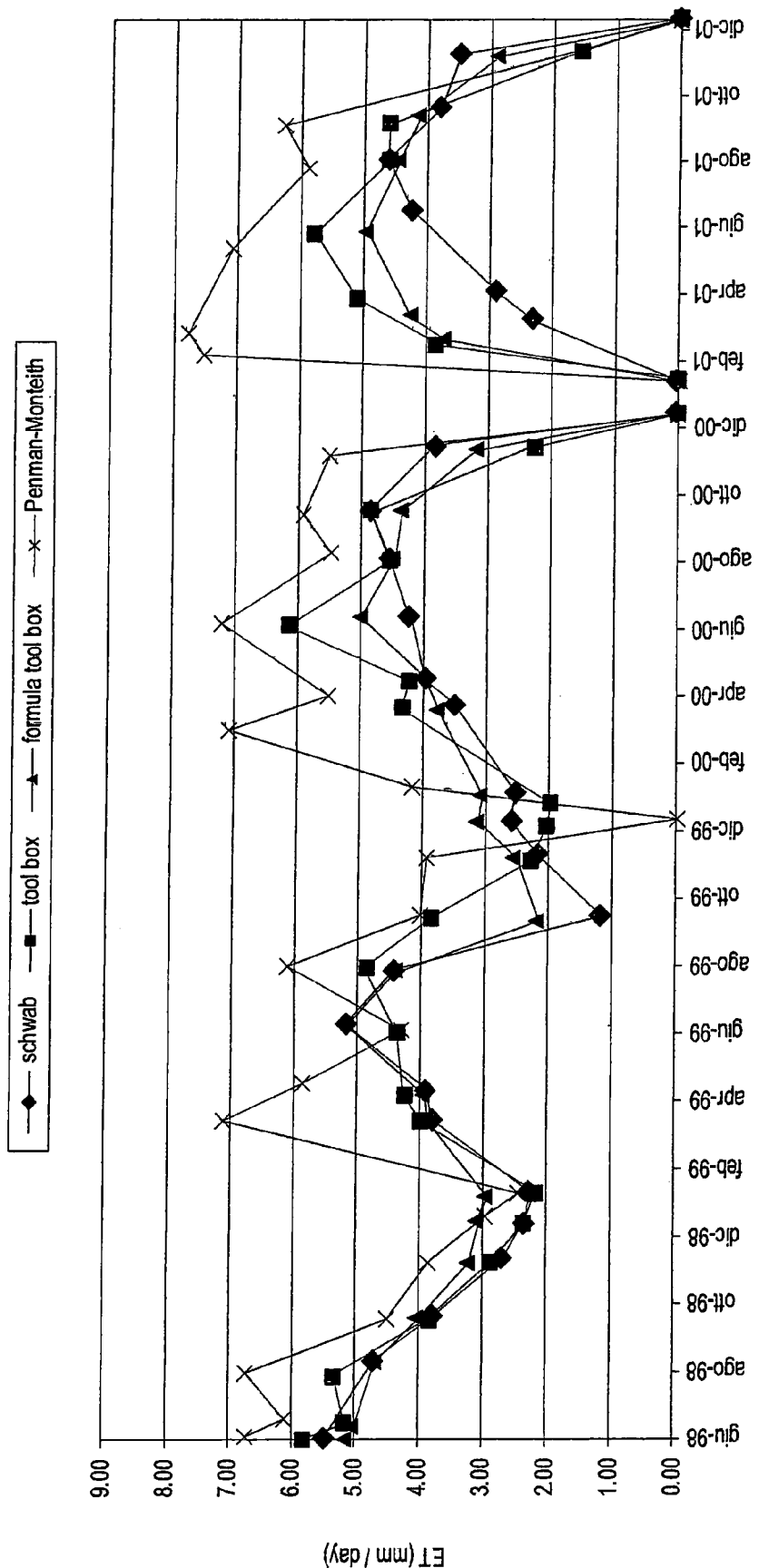
FIG. 8 is a chart comparing the theoretical ET calculations of four ET formulas as compiled by Cattaneo and Upham.

FIG. 8 shows the comparison of four different recognized ET formulas as compiled by Catteano and Upham-The Schwab, the tool box, the formula tool box, and the Penman-Monteith. This comparison was done with the same data over a four year period from 1998 to 2001 and is depicted in 2 month increments. The difference is that each formula uses different meteorological parameters. As can be noted, the most recognized Penman-Monteith formula varies by as much as 70% from the other three equations at certain times of the year, bringing into question which ET formula (if any) is correct.

FIG. 9 shows the official test results from May 2007 for an embodiment of the present invention based upon the SWAT (Smart Water Application Technology) testing posted onto the Irrigation Association (IA) website. The results verify the analytical study depicted in FIG. 1 herein. The summary reports identify the key parameters of Irrigation Adequacy, and Scheduling Efficiency expressed as Irrigation Excess. Irrigation Adequacy is an indication that the vegetation is receiving adequate watering during the test period, and Irrigation Excess is the amount above that necessary for healthy plant growth. The results indicate 100% adequacy and an average excess of 0.2% for the present invention, well within the accepted range of performance.

Figure 10B:
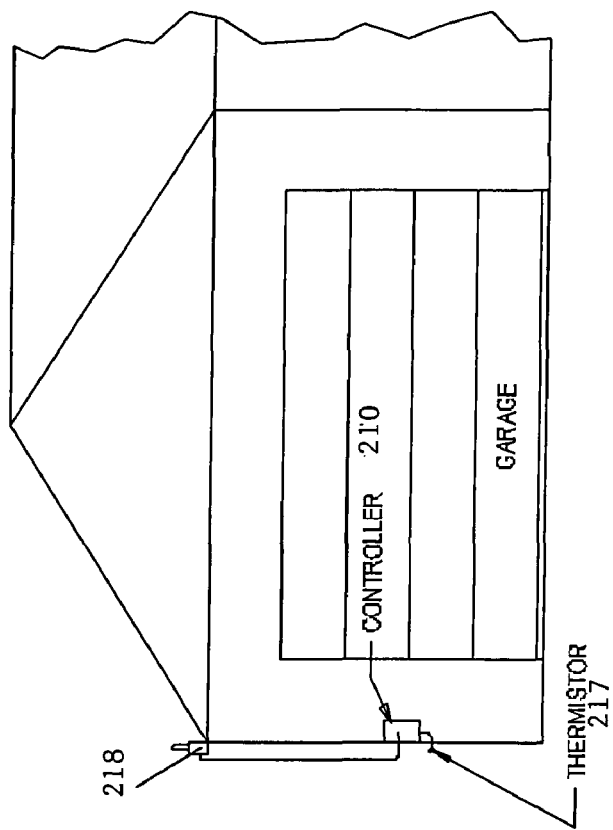
FIG. 10B is the embodiment of FIG. 10A with the optional rain switch wired to the same controller in the garage.
Figure 10A:
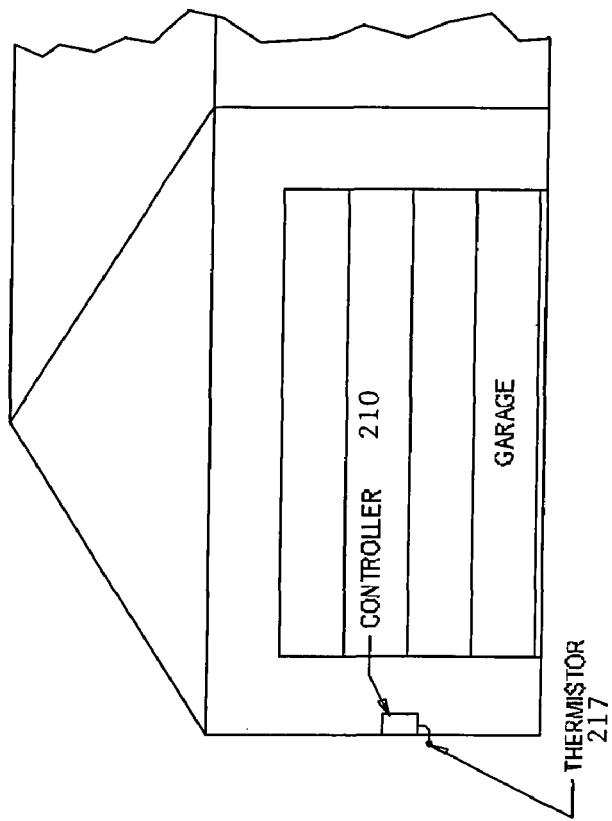
FIG. 10A is a diagrammatic illustration of a simple embodiment of the present invention including a temperature sensor (a thermistor bead, for example) mounted outside a garage hard wired to a controller inside the garage providing the controller with temperature data.

FIG. 10A illustrates a very simple embodiment of the present invention. An AC powered irrigation controller 210 is mounted inside a residential garage. A temperature sensor bead, which could be a simple thermistor 217, is mounted directly outside the garage wall where it can obtain a good ambient temperature reading. It could also be mounted at the eave of a garage away from sun loading effects of the garage wall. This temperature sensor directly communicates with the controller providing the controller with periodic or constant temperature readings from which the controller can calculate the WBR. In this simple embodiment, only an inexpensive temperature sensor with a two conductor cable is the hardware is needed. The AC controller software needs to be modified to accommodate the average summer high temperature and the extraterrestrial radiation values with which to calculate the WBR.

FIG. 10B illustrates the same general setup as shown in FIG. 10A, with the addition of an optional rain switch 218. While the rain switch is not an integral part of this invention, it is recommended for optimum water conservation. Other environmental sensors may also be implemented in these embodiments, as desired by the user.

FIG. 11A shows an embodiment of a CBM 150 with the optional rain switch or measuring sensor 118 with wired communication to a controller 110. In residential applications, the CBM would be typically mounted on the eave of a garage and hard wired to the controller inside the garage. The advantage of this method is that the controller software changes would be minimal to accommodate the WBR or $WBR_M$ data without the need for zip code or latitude or average summer high temperature data memory storage requirements. The CBM provides the information necessary to automate the manual water budget feature already present in most controllers. This version of the CBM typically only communicates with a single controller in a garage in residential applications.

FIG. 11B shows the CBM mounted in a convenient location where it has access to a good ambient temperature reading. The CBM would typically (but not necessarily) be battery powered with a transmitter and antenna in addition to a microprocessor or microcontroller with data storage and the ability to calculate the WBR. The WBR data is periodically transmitted (wired or wirelessly) to one or more controllers 110 and used to automatically adjust its water budget.

Figure 12:
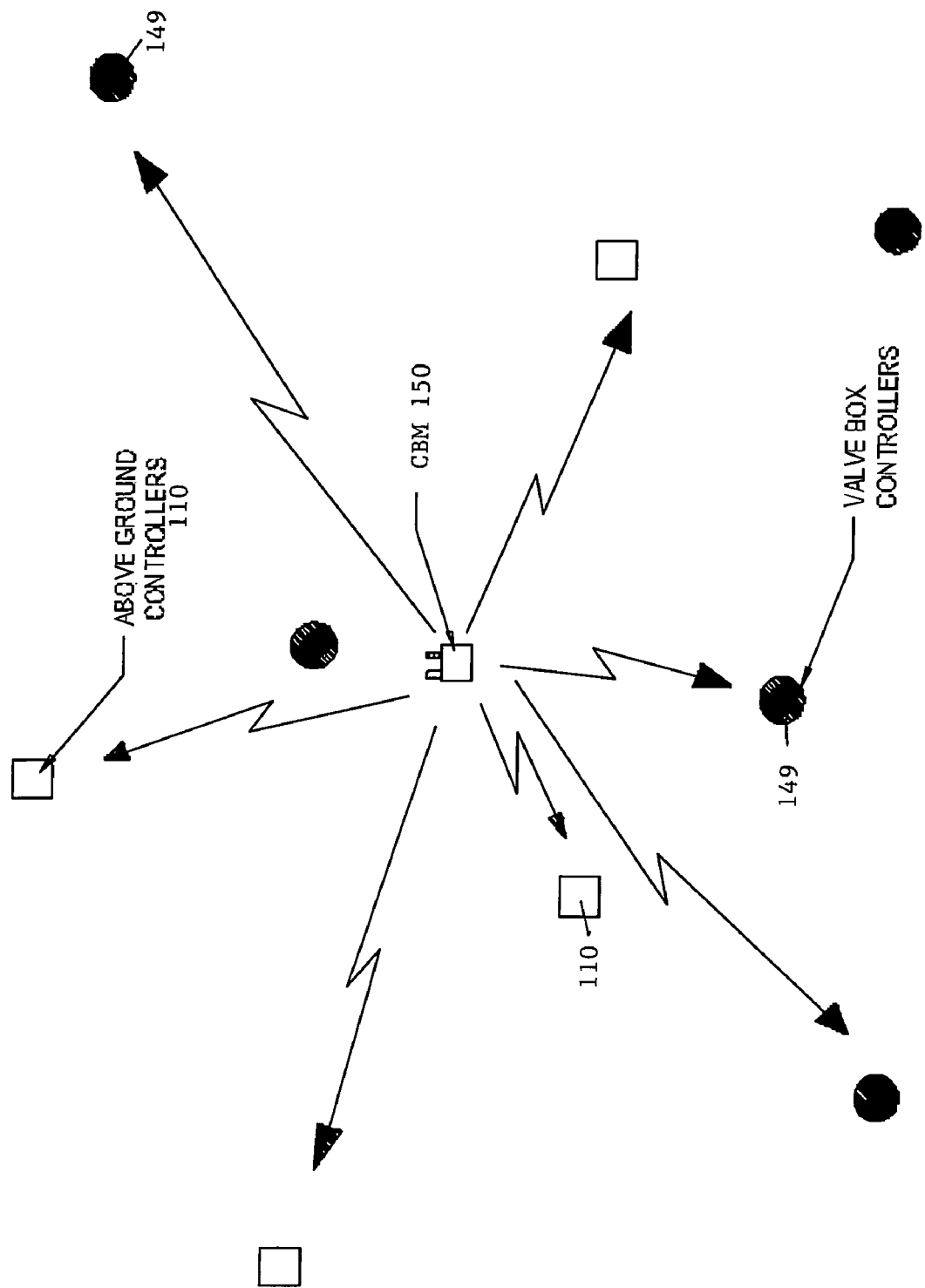
FIG. 12 illustrates a remotely located CBM that transmits the wireless or wired WBR or $WBR_M$ data to a number of remotely located receivers/controllers that can be AC or DC, solar, or ambient light powered.

FIG. 12 demonstrates a broader embodiment of the present invention. Here, a CBM 150 is mounted in a park, school, or apartment complex, for example at an elevated location such as a pole or on top of a building. It records ambient temperature and may also include a rain, wind, humidity, solar, or other sensors which are used to calculate a $WBR_M$ which can then be transmitted to a number of controllers or modules (TBMs) 110 remotely located within radio or other wireless communication range of the CBM 150. This method can be used to broadcast the WBR signal to battery powered valve box controllers 149, above ground battery or solar or ambient light powered controllers, or AC powered controllers. The CBM in this embodiment becomes the central control unit that provides the adjustment factor (WBR or $WBR_M$) for the watering duration times or schedules for the controllers or modules. No weather sensor data is directly wirelessly sent to the controllers or modules 110, 149. The CBM merely transmits a percentage (the water budget ratio—WBR) to the field remote or slave controllers. In a broad embodiment of FIG. 12, the CBM is located in a large area (parts of a city, for example) that adjusts the irrigation settings for many residential and/or commercial controllers or TBMs, and has the ability to turn off irrigation systems if the $WBR_M$ indicates a low percentage. It is to be appreciated that each of the controllers and/or modules 110 need not have their own temperature sensors, nor their own programming to calculate a WBR, but need simply have a means (wired or wireless) to receive the WBR or $WBR_M$ from the CBM.

Figure 13A:
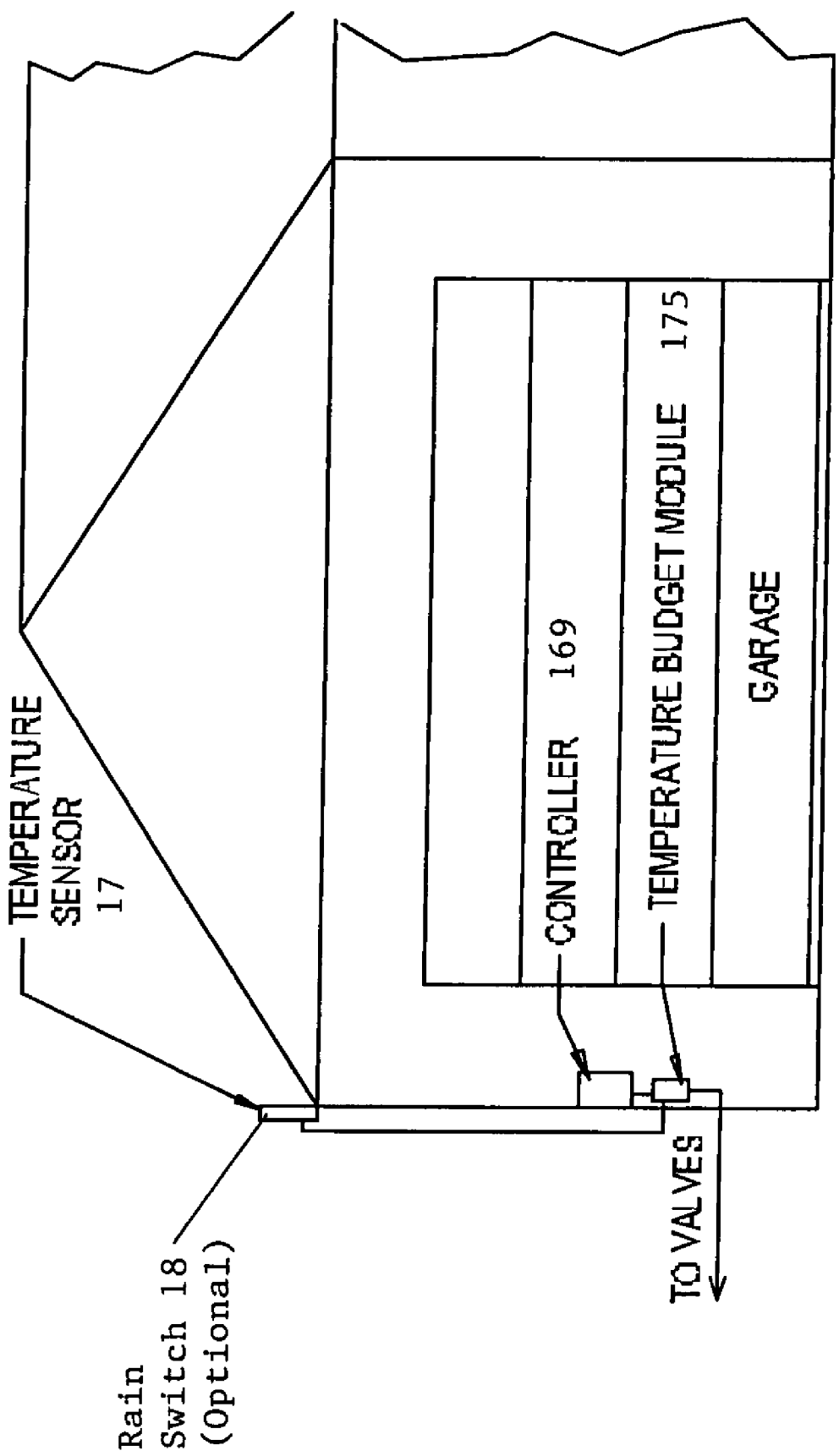
FIG. 13A is a diagrammatic illustration of a typical residential application with one embodiment of a TBM connected to an existing AC powered controller.

FIG. 13A shows an existing AC powered residential controller 169 inside a garage. The temperature and optional rain switches 17, 18 are mounted outside the garage on an eave, for example, and their signal wires come into the garage to a temperature budget module (TBM) 175 which is connected between the controller station outputs and the field wires leading to the switches or valves. Each controller station output is subjected to the WBR or $WBR_M$ produced by the TBM. The power to the cutoff switches or valves (e.g. 24V AC) is turned off when the WBR time is attained for each station. This method allows the use of any existing irrigation controller without the objectionable service fee normally required for ET based systems such as provided by AccuWater, ET Water Systems, HyroPoint's Weather TRAK, or Irrisoft's Weather Reach.

FIG. 13B shows detail of an embodiment of the TBM of FIG. 13A illustrating a typical setup of an AC controller with four station outputs and their common. The controller outputs are inputted to the TBM 175 where they are monitored by the TBM microprocessor. In this version, each output is independently enabled by the TBM and shut off when the WBR is reached, allowing multiple simultaneous valve operation.

FIG. 13C is a detailed view of an embodiment of the TBM of FIG. 13A or 13B showing exemplary programming dip switches and exemplary output LEDs which may indicate, for example, the on/off status of each valve.

FIG. 13D illustrates an alternative version of a TBM that may be used when only one valve is to be operated at a time. When the WBR is reached on a station, the common line is opened, discontinuing irrigation with that valve. This would, of course, also discontinue operation of any other valves if they were in operation. Upon the completion of the summer run time for this station, the common is closed, allowing the next station to operate until its calculated WBR is reached, at which time the common is again opened, and so on, with the rest of the outputs. This simplified method is not recommended where multiple programs are active because the opening of the common would interfere with other valves in operation. However, most residential controllers would normally have only one station active at a time due to their limited water supply and pressure. This simpler design costs less to manufacture and is easier to install. The optional rain switch would be placed in series with the module. In case of rain, all outputs could be further shortened, or disabled with the $WBR_M$ calculation.

Figure 13E:
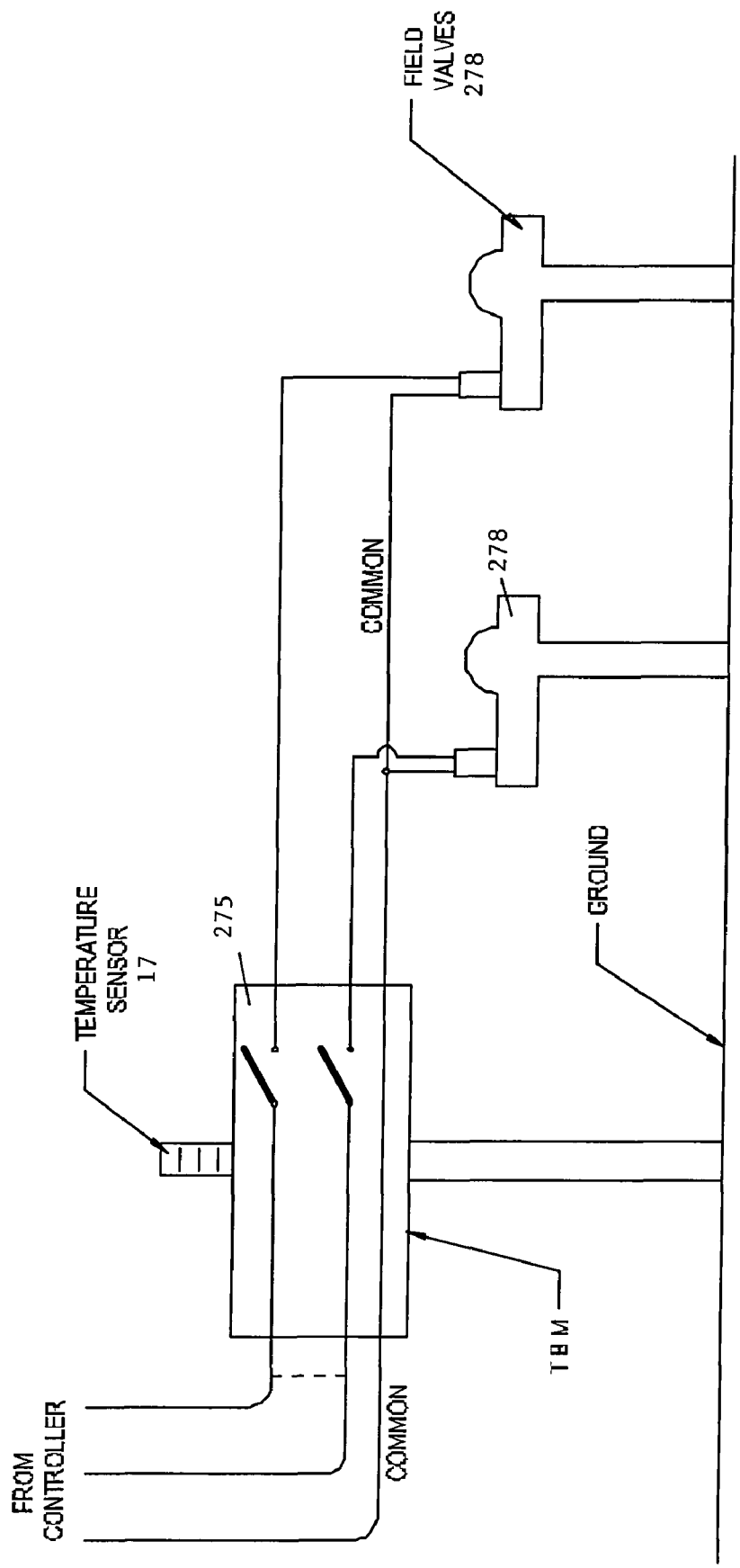
FIG. 13E is a schematic diagram of an exemplary TBM mounted between the controller and the valves with independent control of individual valves.

FIG. 13E shows an embodiment of a TBM 275 mounted remotely from a controller, at a valve 278 or a bank of valves (two valves are shown). In the preferred embodiment of such a valve-mounted TBM, the TBM is battery powered. Technology developed by this inventor allows a single 3.6 volt lithium battery to operate such a module for the life of the module (10 years) without need for replacement. The TBM may be pre-programmed with its local zip code based PRISM data providing it with its latitude and average summer high temperature. This allows the TBM to calculate its STBF. With its self-contained temperature sensor 17, and its periodic temperature readings, and its internal calendar (which determines the varying RA factor throughout the year), the PTBF is calculated. The module is therefore capable of calculating a daily WBR. Following a "training" or "learning" cycle described previously, upon the receipt of a 24 VAC valve output from the controller, the TBM determines when the WBR percentage of irrigation time is reached, and terminates the irrigation of that valve. Multiple valves can be independently budgeted in this manner.

Figure 14A:
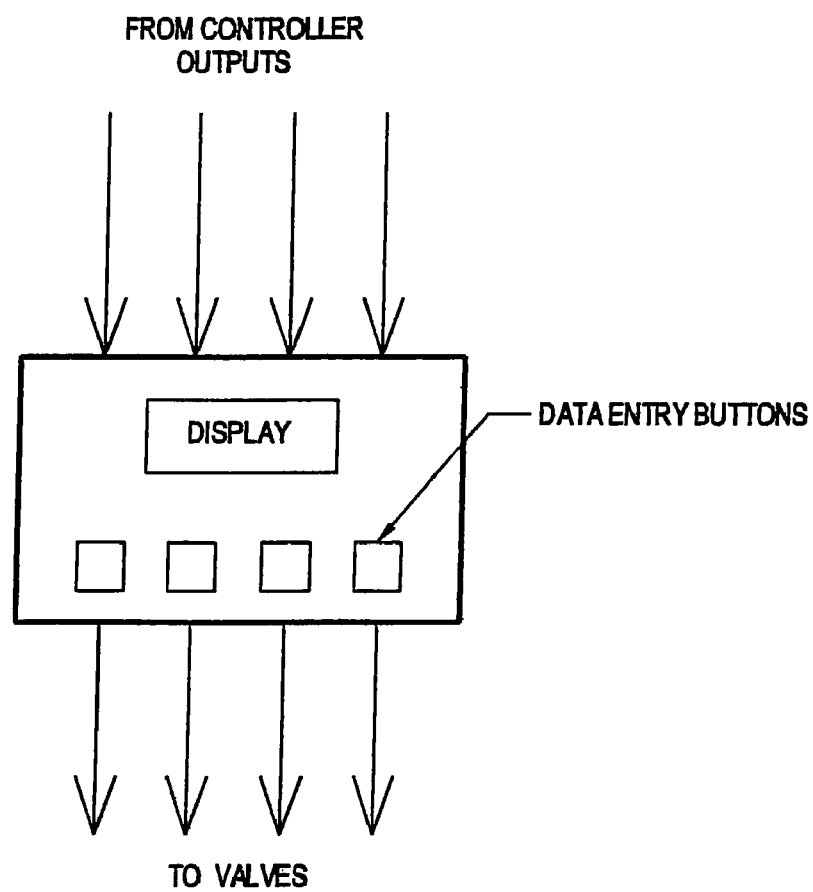
FIG. 14A illustrates an alternative embodiment of the present invention having display and data entry switches.
Figure 14B:
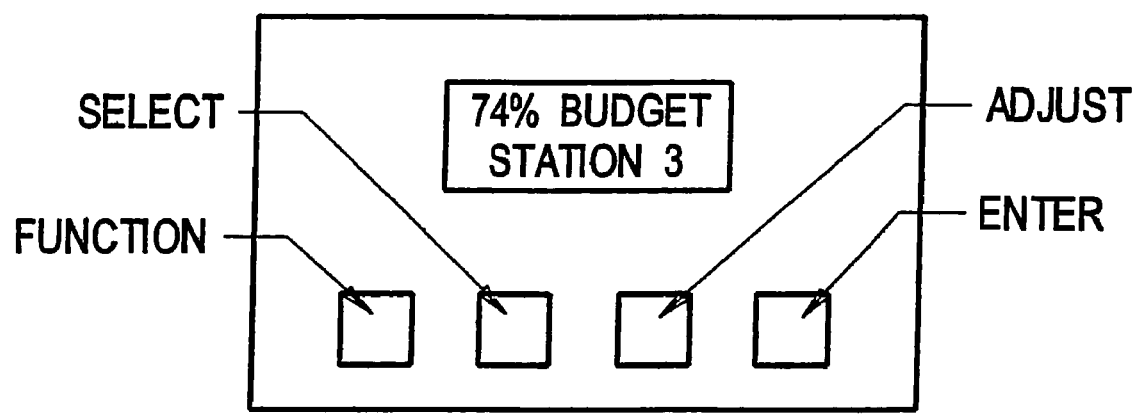
FIG. 14B illustrates an alternative embodiment of the present invention having display and data entry switches.

FIG. 14A illustrates an exemplary installation of a temperature budgeting module (TBM) on the wires leading from an existing controller to its valves. The TBM may be provided with its own temperature sensor, and be capable of calculating a WBR that is used to modify the outputs from the controller. Alternatively, the TBM may be provided with other environmental sensors in order to calculate a $WBR_M$. In other embodiments, such a TBM may not have any sensors, but will have a communication link (wired or wireless) to a CBM which provides the WBR or $WBR_M$ to the TBM. The WBR or $WBR_M$ is used to modify the outputs from the controller to the valves. FIGS. 14A and 14B also illustrate exemplary embodiments of displays and user input interface for the TBM.

Figure 15A:
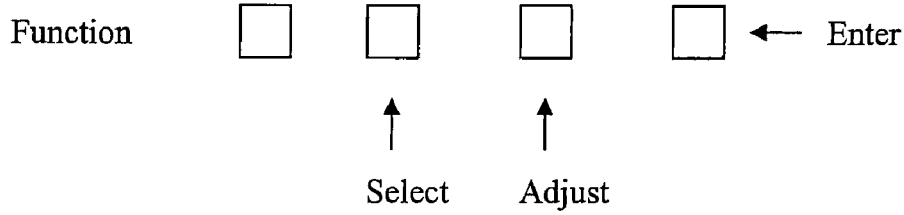
FIG. 15A illustrates an exemplary display on either a CBM, TBM, or controller for a basic time of use function either incorporated within a controller or in an external module.

FIG. 15A shows an exemplary display for a basic TOU module embodiment. The TOU system can also be incorporated directly into a controller to work with the smart water system selected by that manufacturer or model. The watering group is entered which can be an even or odd street address, or a watering group such as A-F as used by the SNWA, or the like. The display can be pre-programmed with the calendar (MM:DD:YY) which can account for daylight saving time and leap year. The time of day is also programmable. The local watering day limitations can be pre-programmed into the module by region of the country, or input if necessary. The exemplary module of FIG. 15A is programmed by means of data entry switches such as: Function, Select, Adjust, Enter, and/or other similar inputs. This data may also be provided wirelessly to the module or controller by means of a remote or hand held programmer, eliminating the data entry switches.

In some embodiments, an internal switch either allows irrigation to occur or disables it by cutting off the common electrical wire to the solenoid valves. In some embodiments, an override capability is provided for emergency use or for maintenance. Installation and programming of these embodiments is relatively simple. In residential applications, one or more screws hold the module in place on a surface such as the wall of a garage next to or near the irrigation controller. The existing common wire lead to the solenoid wires is disconnected from the controller output terminal and replaced by one of the wires from the TOU module (either wire if a relay is used). The second wire from the TOU module attaches to the common wire to the valves that was disconnected from the controller output. In this way, the TOU module is located on the common line and has the capacity to act as a switch to open or break this line. Basic programming includes entering the local designated watering group (i.e., local TOU restriction data), the time of day and date.

Figure 15B:
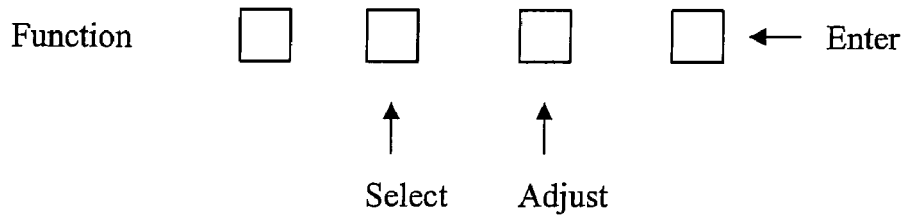
FIG. 15B illustrates an exemplary display for a combined module with time of use and basic smart technology incorporated either within a controller or in an external module.
Figure 15C:
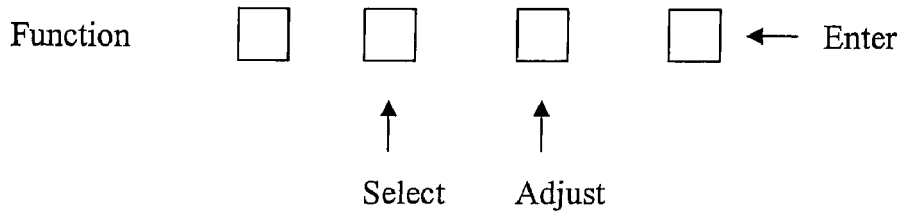
FIG. 15C illustrates an exemplary display for a more sophisticated time of use or smart controller combination incorporated either within a controller or in an external module.

FIG. 15B shows an exemplary display for TOU and/or smart water operation in either a controller or a TBM. If location information (such as a zip code) is entered and a temperature sensor is provided, at a minimum the unit can act as a smart module because the location information allows the unit to determine geo-environmental data (latitude and average summer high temperature) for that location. The attached temperature sensor provides current temperature data from which the WBR is calculated. If additional sensors are attached, such as a precipitation sensor, or wind sensor, a $WBR_M$ may be calculated as shown in FIG. 15C. In a TBM, the monitored station outputs are modified based upon the WBR. When used as a combination of TOU and smart module, in some embodiments, the daily WBR may be accumulated until a threshold is reached which would allow the next irrigation cycle to occur. If the threshold is reached on a non-watering day, the WBR is further accumulated until an allowed watering day is reached. On that day, the system is allowed to irrigate based upon the accumulated percentages. In alternative versions, the specific method of smart watering may be selected from modifying the station run time, to accumulating the water budget percentages until a pre-programmed threshold is reached, or altering the watering interval based upon a WBR percentage. For example, if the WBR percentage is 20%, watering occurs once every 5 days.

FIG. 15C shows the display of an exemplary CBM, TBM, or controller with combined temperature budgeting smart technology and time of use with additional optional inputs such as wind sensor input, rain sensor input, and minimum irrigation temperature input. The local zip code is shown in the display. Entering the zip code alone allows use of the smart technology alone. Entering the watering group alone allows use of the unit strictly as a time of use module or controller. Entering both indicates using the device both as a smart device and a time of use unit. The optional sensor inputs can further modify or interrupt the irrigation cycle.

Figure 16:
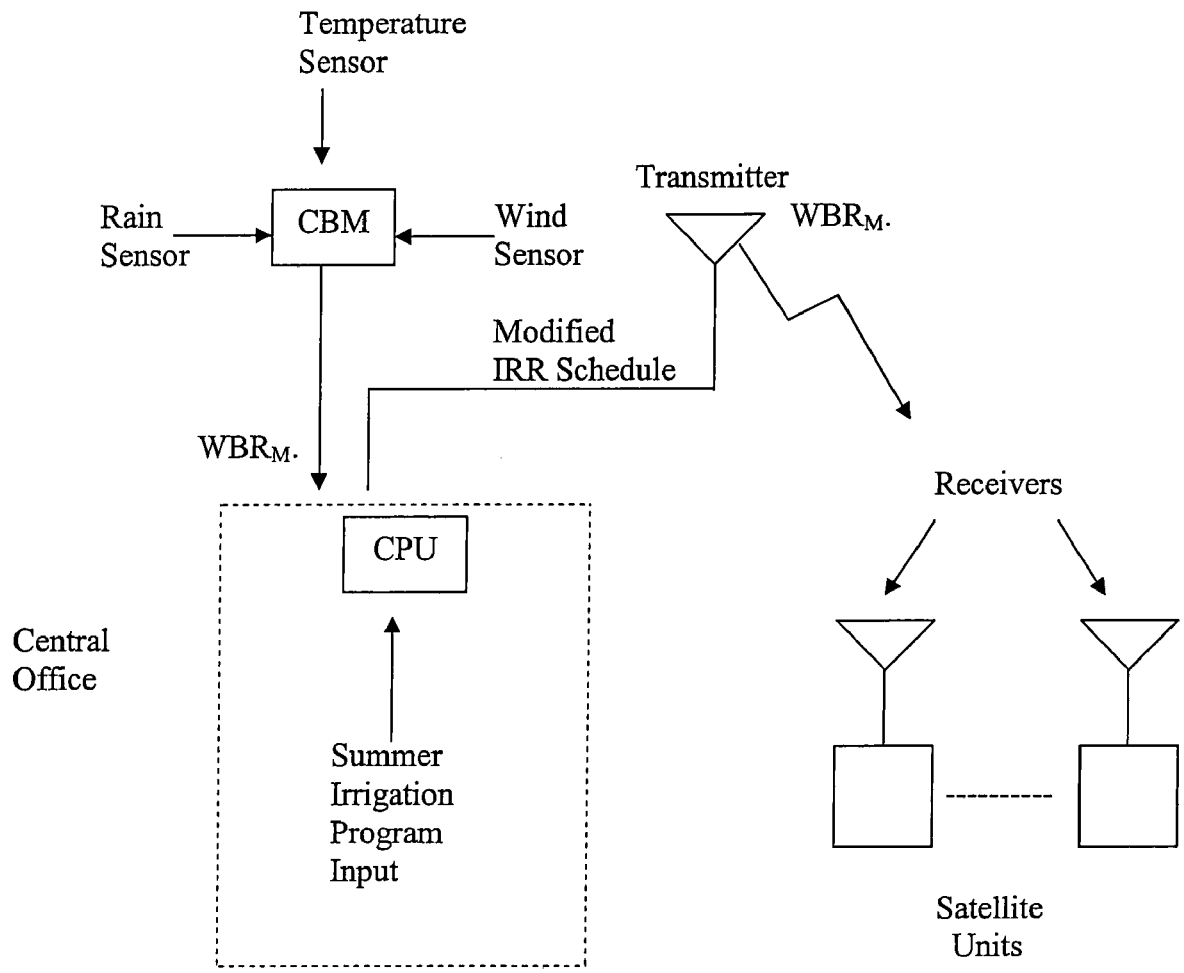
FIG. 16 illustrates an exemplary central irrigation system with water budgeting or modified water budgeting with sensor inputs broadcasting to a number of field or satellite controllers.

FIG. 16 shows an exemplary central irrigation system. A typical central municipal irrigation system may be located in an office. A common computer is loaded with an irrigation program that can be used to program or monitor a multitude of irrigation field or satellite controllers. These field controllers can be slave units or stand alone units that can operate as independent controllers. The custom irrigation software loaded into the CPU can program hundreds of satellite controllers. The information required to program each controller is inputted into the CPU such as assigning stations to programs, programming watering days for each program and start times, programming the station run times for each station, etc. Such systems may be adapted for use with the present invention. For example, a CBM can be located external to this office (e.g. on the roof or the like), with temperature and optionally other sensors exposed to the environment. The CBM is pre-programmed with location information (such as the zip code), or this information can be programmed from the office CPU, and provided and by wired or wireless means to the CBM. The CBM then calculates the WBR and provides this information to the CPU. The CPU irrigation schedules are modified by that WBR in any of the ways previously defined, and the modified information is broadcast to one or more of the satellite controllers. Thus a modified signal (according to the WBR) may be wirelessly transmitted to the satellite units. Each satellite unit can be addressed for individual control, addressed in groups, or universally addressed to provide a universal command to all field controllers such as during rainfall or high wind conditions or cold temperatures to curtail or shut down the system during these undesirable irrigation conditions.

Alternate methods allow for incorporating the temperature budgeting system into the CPU. Entering location information (such as the zip code) into the CPU provides the data needed for calculating the STBF. The externally mounted sensor(s) are connected directly to the CPU, and provide the temperature or other data used to calculate the PTBF, and then the WBR or $WBR_M$ within the CPU irrigation program. The temperature budgeted signal is then transmitted to the field controller units.

Figure 17:
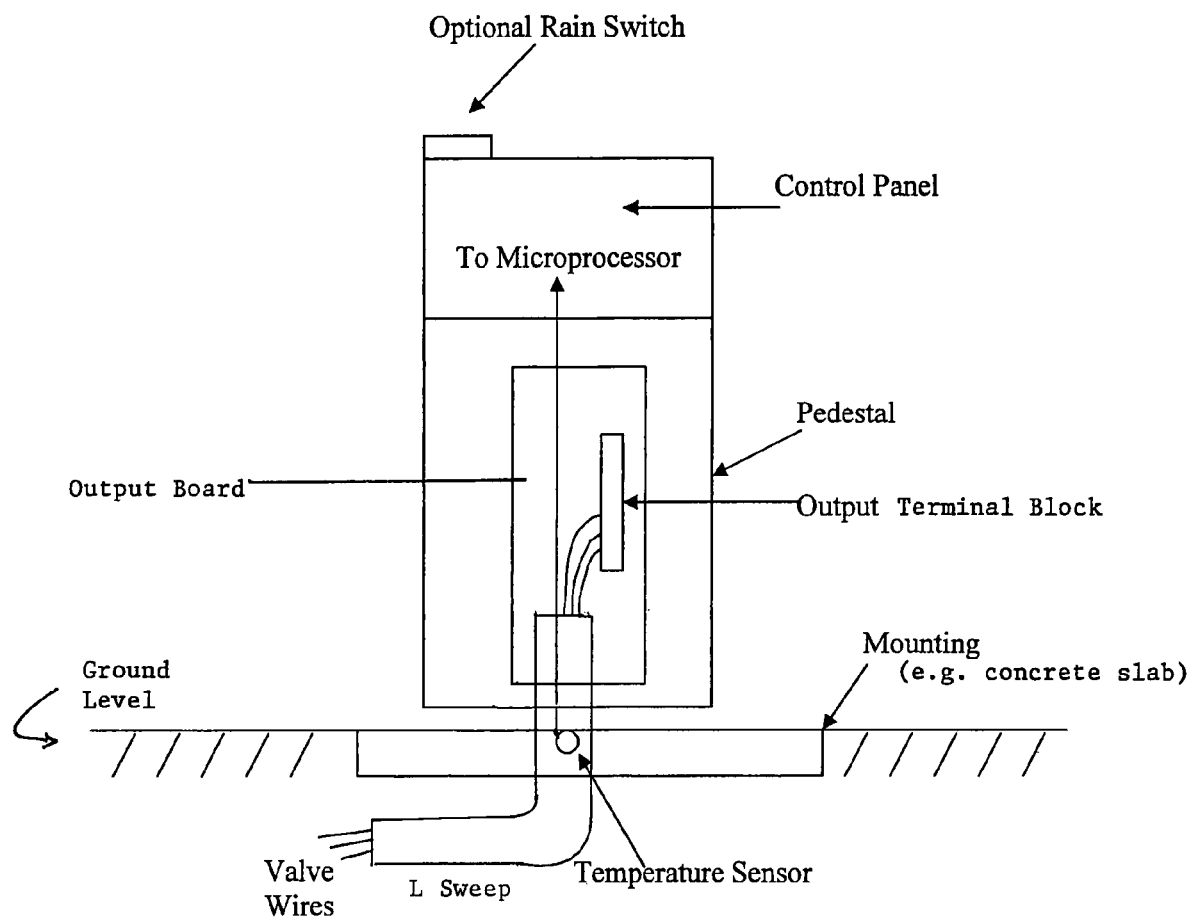
FIG. 17 illustrates an exemplary irrigation controller in a pedestal with an exemplary mounting of the temperature sensor within the pedestal and a rain switch mounted on top of the pedestal.

FIG. 17 shows an exemplary placement of a temperature sensor at or just below ground level. In this example, a 4-inch deep area is prepared on the ground and a sweep "L" normally made of PVC pipe brings the wiring to the valves to the controller output board terminals. The temperature sensor is dropped out of the control panel down inside the sweep L pipe to ground or just below ground level, providing some protection while also allowing exposure to the air. The temperature readings taken at this location will closely approximate ambient temperatures throughout the day and the year. An optional rain sensor or other sensors may be mounted, for example, on top of the pedestal exposed to precipitation in such a manner that they are both sturdy and limited in exposure to minimize the likelihood of vandalism. This embodiment allows for a WBR or $WBR_M$ to be calculated by the microprocessor or microcontroller within the device.

Figure 18A:
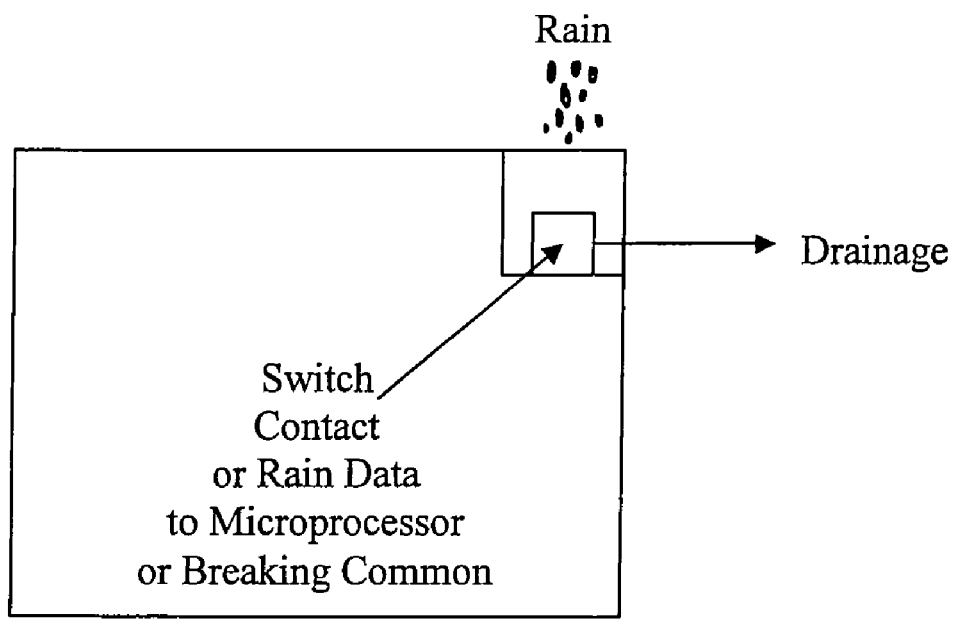
FIG. 18A shows detail of an exemplary rain switch or sensor mounted internally within an outdoor irrigation controller enclosure.

FIG. 18A shows detail of an exemplary precipitation sensor mounted within the enclosure of an irrigation controller. In this example, the switching compartment is completely within the enclosure, whether it is a pedestal or a standard outdoor enclosure mounted on an outdoor surface such as a wall or post. An opening at the top of the enclosure allows the precipitation to enter the sensor compartment. If hygroscopic material is used (such as that commonly used with rain switches), the precipitation soaks the hygroscopic material which causes it to expand. The top of the material is stopped by the screen on top of the enclosure. Upon pressing upon this solid upper surface, the material expands downwardly. A switch is mounted below the hygroscopic material. At some determined mechanical point of this expansion related to the amount of rainfall, the switch contact is activated to either open or close the contact. Such a signal may be used to either break the common output line, or transmitted directly to the controller microprocessor for modifying the water budget calculation as described elsewhere herein. The resulting modified water budget is used to alter the irrigation schedules as described elsewhere herein. Alternately, a precipitation sensor that can measure the actual rainfall may send rainfall amount data to the microprocessor which can then also modify the $WBR_M$, thereby altering the irrigation schedules. The internal compartment should be sealed or isolated from the control unit to protect it from the moisture. A drainage opening can be provided at the rear or the side of the controller to allow the excess water to drain. Perforations can also be provided at the side of the controller enclosure to allow the hygroscopic material to "breathe" so that it may dry out in a timely manner to allow resumption of irrigation.

Figure 18B:
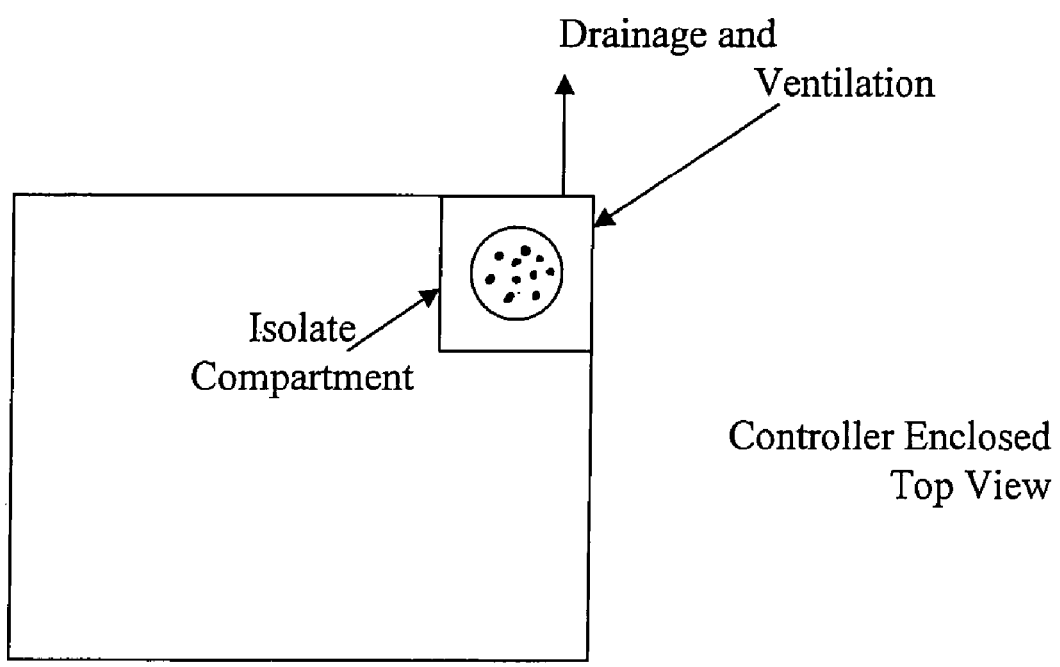
FIG. 18B is a top view of a rain switch or sensor enclosure of FIG. 18A.

FIG. 18B shows a top view of an exemplary controller with a precipitation access area, and side drainage and ventilation holes. One assembly method calls for manufacturing the enclosure with pre-drilled precipitation access on top of the enclosure. One or more of the sides may also be provided with ventilation and drainage holes. The switch or sensor is mounted within a small enclosure and mounted internally inside the controller case. It can be held in place with internal nuts and bolts and sealed with a gasket or "O" ring, or the like. The data wires from the rain switch/sensor in these embodiments are sealed and come out of the bottom or side of the small enclosure. The leads can go to the controller microprocessor for calculating the modified water budget, or if used conventionally, the switch contacts may be used to break the common line to the irrigation solenoid valves.

Figure 19A:
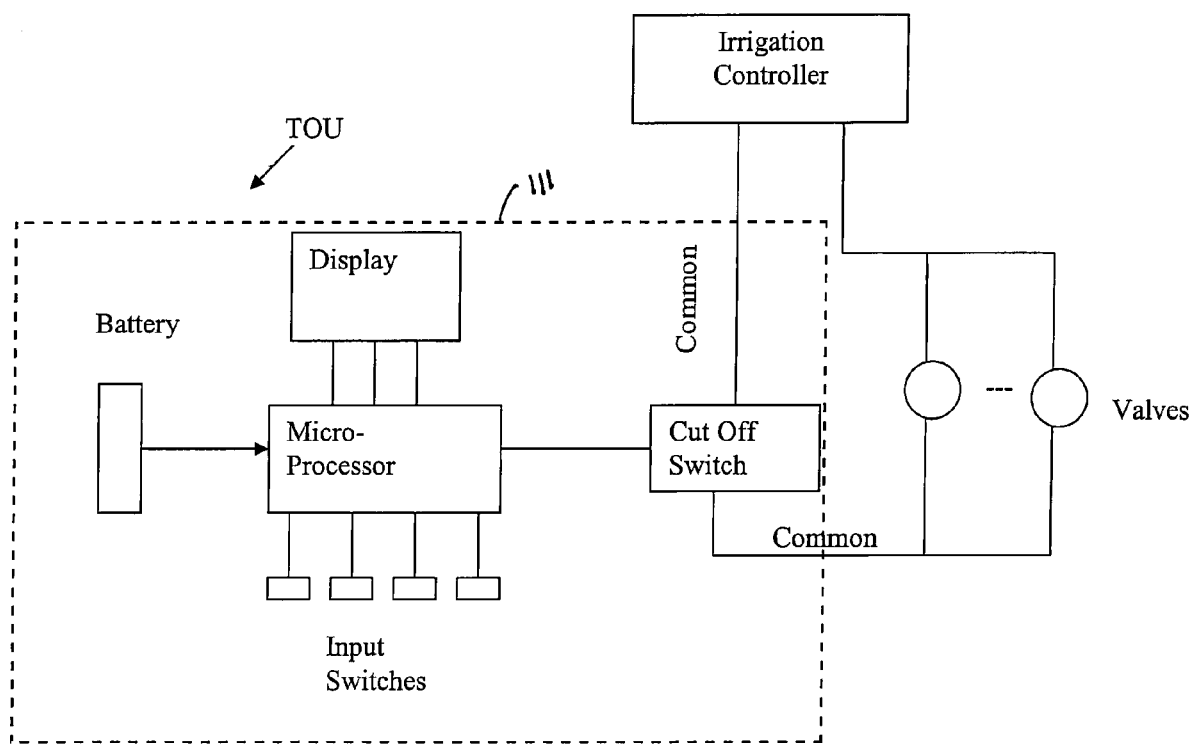
FIG. 19A illustrates TOU typically mounted and wired near an existing irrigation controller.
Figure 19B:
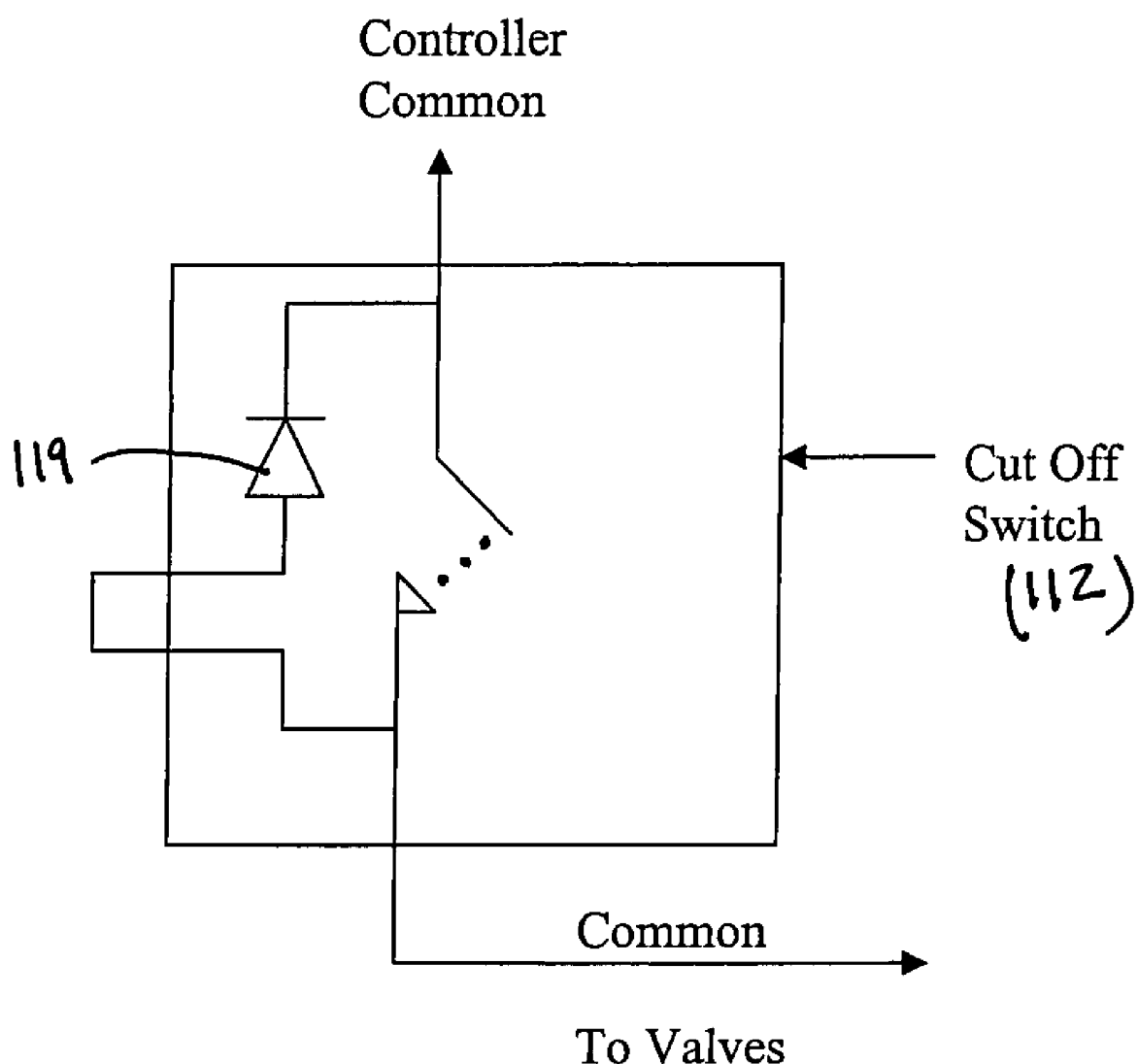
FIG. 19B is an exemplary illustration of how the cutoff switch of 19A might be modified to work with a battery powered controller. This cutoff switch configuration can also be used with a TBM or combination of TOU and TBM.

FIG. 19A is an exemplary time of use (TOU) module 111 that may be mounted near an existing irrigation controller. In this exemplary illustration, module 111 is self-powered with its own battery, but it could obtain its power from the nearby normally AC powered controller. Being self-powered has the advantages that it is electrically safe, does not require an electrician to install, and it is immune to power outages and surges because it is isolated from both the primary power and the secondary power. The module 111 is provided with any locally mandated restricted watering schedules stored within its microprocessor or microcontroller, and opens the cutoff switch 112 whenever irrigation is not to occur. The cutoff switch 112 may be a triac, a transistor, a relay, or the like. A relay is preferred for total isolation and its adaptability for DC powered controllers as shown in FIG. 19B. An override button or switch or programming capability allows for emergency valve operation or for routine maintenance to insure proper irrigation system operation.

FIG. 19B is a diagram of an exemplary cutoff switch (such as switch 112) that could be used in a battery powered controller, or in a TBM or a TOU module 111 operating with a battery powered controller. For example, if the SNWA restricted watering schedule shown in FIG. 21 is used, it does not allow irrigation during the summer between 11AM and 7PM. An AC powered controller provides continuous 24 VAC power to operate valves. When the cutoff switch opens with an AC system, the valve no longer receives power and the valve shuts off. In contrast, a battery powered controller provides a positive pulse to open a valve and a negative pulse to close it with no power between them. Without the diode circuit of FIG. 19B, a DC powered latching solenoid could not open or close when the switch is open. If a valve were to be on when the cutoff switch opens, it would have no way to close, resulting in a flooding situation and much wasted water. The diode 119 would allow an open valve to close and no other valve to open since it would be back-biased when a positive valve opening pulse arrives. When a closing negative pulse arrives to close a valve, the diode 119 becomes forward biased, allowing the valve to close.

Figure 19C:
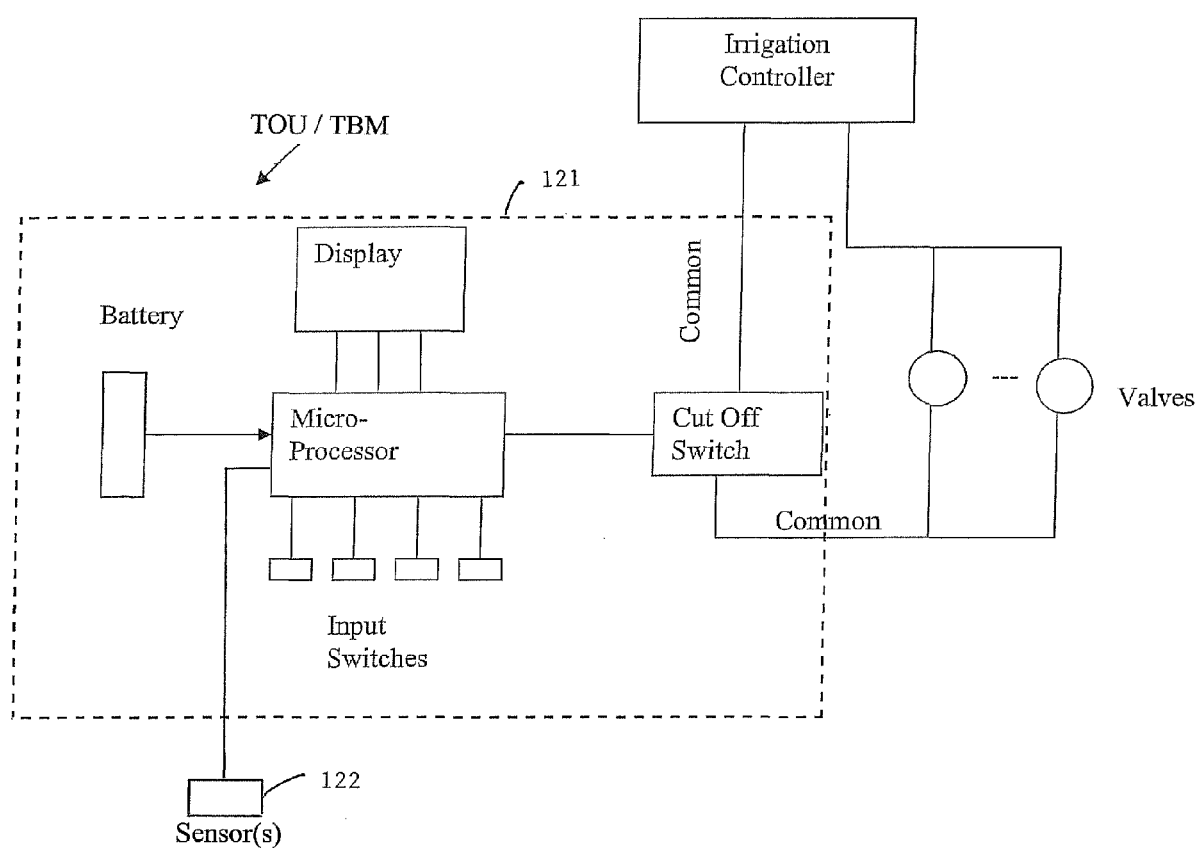
FIG. 19C is an exemplary illustration of an embodiment of a combination TOU and TBM.

FIG. 19C is an exemplary embodiment of a combination time of a use (TOU) and temperature budgeting module (TBM) 121 that may be mounted near an existing irrigation controller. As with the module of FIG. 19A, module 121 is self-powered with its own battery, but it could obtain its power from the nearby normally AC powered controller. Module 121 is provided with any locally mandated restricted watering schedules stored within its microprocessor or microcontroller, and also includes programming to calculate WBR using input from the attached environmental sensor(s) 122. If the module 121 is used in a temperature budgeting mode, current temperature readings are taken periodically to determine the high temperature of the previous day that is used to calculate the WBR. A rain sensor can be used to interrupt irrigation during precipitation and for a period thereafter. The sensor(s) 122 can be hard wired or wireless, separately, or combined in the form of a weather station. It is possible that the local municipality has both a water supply issue and an infrastructure water delivery problem. In this case, module 121 can be used simultaneously as a TOU and a TBM. The periodic WBR are accumulated until the threshold is reached. The watering schedule is checked for an allowed day or time of day, and the rain and temperature sensors are checked. If all conditions are met, the cut-off switch is closed allowing irrigation to occur.

Figure 20:
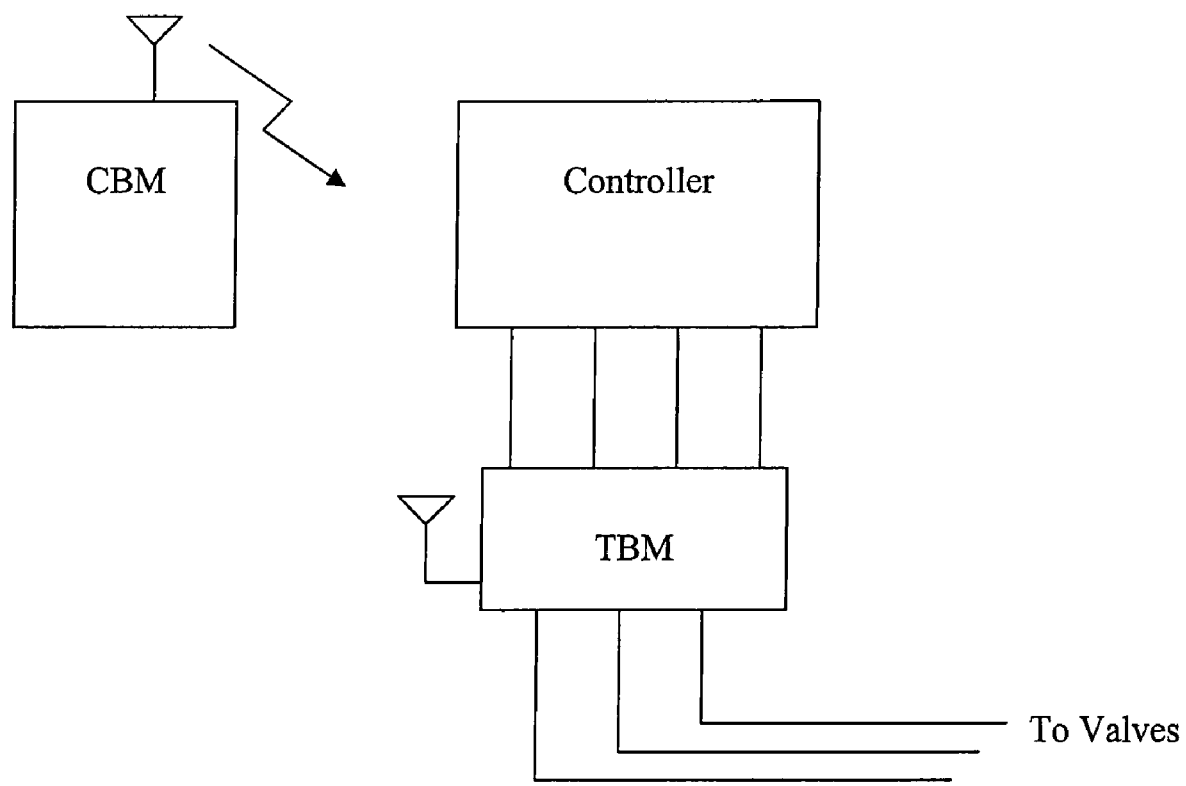
FIG. 20 shows a CBM wirelessly communicating with a TBM.

FIG. 20 shows an exemplary CBM wirelessly communicating with a TBM associated with a controller. In most embodiments, the CBM provides one or more TBMs with the WBR or $WBR_M$. The TBM in this embodiment requires no stored geo-environmental data or weather sensors, which simplifies its installation and reduces its manufacturing cost. The CBM may communicate with one or more TBMs.

FIG. 21 is a reproduction of a recent SNWA "Drought Watering Restrictions" schedule for Clark County, Nev. It has divided the 500,000 residences and commercial areas into six watering groups. All groups may water every day during the summer (May 1 to the end of August), but not from 11 AM to 7 PM (not shown here). In the spring and fall, the different watering groups can water three times a week on their designated watering days, at any time of the day. In the winter, each group can only water one day a week. It is inconvenient for most homeowners to remember to change their watering schedules 4 times a year in addition to changing their controller settings. The TOU module by itself or in combination with temperature budgeting or any other smart technology can alleviate these responsibilities by including programming and data storage to receive such a watering schedule, which will eliminate watering fines by complying with the local watering restrictions. Other communities or water districts may have different watering restrictions depending upon their local water availability and ability to pump and deliver that water, which may be input into the TOU module.

FIRST EXAMPLE OF THE PRESENT INVENTION

The following example is provided for illustrative purposes only and without limiting the appended claims. This example assumes that the operator has already determined the preliminary irrigation schedule using any number of commonly available methods, such as personal experience, or from the system designer.

Assume for the purpose of this example that an irrigation controller embodying the present invention is to be installed in Fresno, California, at 10:15 a.m. on Feb. 15, 2004. This can be a residential AC powered controller, or a commercial AC, DC (battery), solar, or ambient light powered controller. The operator installs the controller and enters the current time, date, month and year. (S)he then enters the local zip code. The display appears as follows:

| Current Time/Date: | 10:15 AM Feb. 15, 2004 |
|---|---|
| Controller location zip code: | 93711 |

The controller determines from the zip code that the local latitude is 36 N. From its lookup table, it determines that the July RA factor at that latitude is 16.7. From the PRISM data, the microprocessor or microcontroller determines that the average July high temperature in Fresno for the last 30 years is 96 F. This makes an STBF of 16.7 ×96 =1603.

Assume that the date is now November 2. The recorded high temperature for the previous period (twenty-four hours herein) was 52° F. The controller lookup table based upon the local zip code indicates that the Fresno RA on this particular day is 7.7. This means that the PTBF is 400 (the temperature of 52° F., multiplied by the RA of 7.7). Dividing the PTBF by the STBF provides a WBR value of approximately 0.249. The irrigation duration for this particular period will be decreased to approximately 1.5 minutes of water (the 6 minute initial irrigation schedule, multiplied by the WBR value of 0.249=1.49 minutes of water), thrice per day.

The operator could also program the controller to suspend irrigation if the temperature at the beginning of an irrigation cycle is below the specified minimum temperature, or (if a precipitation sensor is included) if precipitation exists during, or before, an irrigation cycle. For example, assume that precipitation exists during the second watering irrigation time above. The precipitation sensor detects the existence of such precipitation, and communicates such existence to the controller, causing the controller to cancel the previously scheduled second watering duration of 1.5 minutes. Further assume that the minimum temperature is set at 35° F. Further assume that, at the beginning of the third irrigation time above, the current temperature was 34° F. This would cause the controller to cancel the previously scheduled third watering duration of 1.5 minutes.

SECOND EXAMPLE OF THE PRESENT INVENTION

In this example, there is no user input to the controller(s) in terms of the zip code, nor is there a requirement for the controllers to store any historical geo-environmental data. Without the need for storing this significant additional data, there generally will be no need for hardware changes such as additional memory storage, nor significant software changes since most controllers already have a manual water budgeting method in use. This example discusses two versions of this application. Both calculate the WBR remotely and transmit it to controllers in the field. In the case where the rain/temperature module is battery powered, it can use technology developed by the present inventor to conserve battery energy, or the battery life can be augmented by means of a small solar panel at the sensor.

The CBM includes a microprocessor or microcontroller with adequate data storage, a wireless transmitter (most likely radio, but other wireless means are suitable), and a temperature sensor. A rain switch is not an integral part of this invention, but effective to maximize water conservation. Typically, this assembly is mounted on a light pole or on top of a building such that it can transmit readily and reliably to every controller within its perimeter. The area covered could be a school, park, golf course, apartment complex, or a series of street medians. The controllers could be valve box controllers with the capability of wireless programming, or above ground controllers mounted on walls, posts, residential AC powered units inside garages, or in a pedestal with an external antenna.

In one embodiment, the CBM containing the WBR calculating microprocessor or microcontroller is pre-programmed with the local geo-environmental data (latitude, and average summer high temperature). This can be accomplished in a number of ways. One way is by downloading the latitude and average high temperature from a hand-held wired or wireless unit with its stored zip codes as described previously. Another way is by means of a set of dip switches on the CBM. These switches (or sets of switches) can be set with the current month or calendar (for the RA factor); additional dip switch(es) may set the latitude; and/or other(s) may provide the average summer high temperature. The temperature sensor monitors the ambient temperature periodically and reports the recorded high temperature of a previous time frame (e.g. over the last 24 hours) to the WBR microprocessor. The extraterrestrial radiation (RA) factor for that particular day is multiplied by the high temperature recorded during the previous time frame and divided by the STBF. This results in the WBR. If it has rained of sufficient amount to activate the rain switch, that information is also supplied to the microprocessor. The remote WBR or $WBR_M$ is transmitted to the controllers within the applicable area. In one embodiment, the controllers receiving this $WBR_M$ data could be addressed individually for separate controller recognition. The controllers receive and process the $WBR_M$ to determine whether to budget or suspend their individual irrigation schedules.

In a broader version of this second example of an application of a remotely and centrally calculated WBR, a city or community could broadcast a universal WBR signal to every controller in its area. Every controller with wireless reception capability could receive this information and determine whether to be water budgeted and/or shut down in case of a rain event, or a low temperature condition, or an excessive wind condition. As an analogy, there are currently capabilities to shut air conditioners within zones in cities to help control the peak hours of air conditioning demand to preserve the capabilities of the power grids. Similar to air conditioning controls, areas of cities could be transmitted the WBR and/or rain shut down commands.

The CBM itself could be programmed by using a hand held wireless programmer, or by manual data entry means such as with the dip switches previously described. The CBM in effect becomes the central controller with self-contained geo-environmental data and temperature, rain, humidity, or wind sensors or the like, that provides information to its field satellite "slave" controllers which use that information to determine if and when and how much to irrigate. Once again, it is to be appreciated that in these embodiments, no sensor data such as a rain switch or wind switch contact change is directly transmitted to controllers. The sensor data is provided to the CBM microprocessor by hard wire connection within the sensor module, and is used by the central processor to calculate a WBR or $WBR_M$ factor. That CBM becomes in effect a central controller that disseminates a water budget ratio in the form of a percentage of irrigation run times, watering intervals, or accumulated water budget percentages to its satellite controllers.

This simple, intuitive, cost-effective, user-friendly approach encourages significantly higher long-term consumer participation, making it possible to save most of the wasted landscape water and subsequent runoff, which in California would be over one million acre feet. The additional infrastructure and environmental benefits of this water conservation have previously been enumerated by the EPA, as described herein.

It is to be appreciated that in alternative embodiments, one or more (or all) of the temperature, precipitation, and rain sensors may be physically separated from the controller itself, and may communicate with the controller via wire or wireless or radio communications.

It is to be appreciated that in alternative embodiments, user input to the controller may be provided directly through a keypad or other input device on the controller, or by using a wireless or radio programming device with the controller having a receiver/transmitter to accept and report such input.

THIRD EXAMPLE OF THE PRESENT INVENTION

This example deals with a residential application. The exemplary controller in this example is AC powered and the output to the valves is 24 VAC, although other controllers may be used in an analogous fashion. The controller can be any existing pre-installed conventional one (not having "smart" technology, existing or new). The temperature sensor and optional rain switch are mounted on the eave of the garage and the wires come into the garage as shown in FIG. 13A. The controller may be programmed with its summer irrigation schedule any time of the year for the purpose of this initial temperature budgeting setup. If the TBM is self-DC powered (batteries, solar, etc.), the local zip code and day of month and month may be entered into the TBM by one of any several means already discussed (e.g. dip switches) for convenience, such that the TBM may be pre-programmed with this information prior to the time of installation. If the TBM is not DC powered, it may receive its power from the 24 VAC transformer normally supplied with the controller so that the zip code and month and day information may be supplied to the unit after power up. Once programmed, an internal EPROM memory retains the programmed information in case of power failure. In the case where the TBM is powered with the controller AC, loss of power for short periods of up to one day would not significantly affect the WBR calculating ability of the TBM since the STBF is fixed for a particular zip code, and the RA factor used with the PTBF calculation does not vary significantly from day to day. However, prolonged lack of power would be detrimental since it would result in the inability to update the WBR based on recent temperature readings that could vary significantly from one day to the next.

To install this exemplary embodiment, the wires from the output of the controller to the valves are disconnected from the controller outputs. The controller outputs are instead connected to the TBM inputs using wires, a cable w/connector, or the like, plugged into the controller outputs. The previously disconnected valve wires, including the common, are connected to the outputs from the TBM. Ordinarily, no watering will be wanted during set up, so the common wire to the field from the TBM is disconnected (or not yet connected). The summer irrigation program already in the controller is activated and each station output (e.g., 24 VAC signal) is monitored by the TBM and their times recorded in the TBM microprocessor or microcontroller memory (the TBM "learns" the irrigation schedule). If this is done with the common line disconnected after the module, no watering occurs during the "learning" phase. Upon completion of the summer irrigation cycle, the installer or homeowner reconnects the common to the valves. The TBM monitors the temperature from the temperature sensor and performs the PTBF and WBR calculations. Upon the next start of an irrigation cycle, each station output is monitored. When the WBR (percentage) of duration time is reached for each station, those stations are turned off by the TBM (e.g. by opening the line to the valve, or opening the common).

Since the summer schedule is normally the highest percentage during the course of the year, the WBR will almost always be less than 100% of the summer duration. A WBR over 100% may cause an overlap over another operating station. It may or may not be hydraulically efficient to have more than one valve on at a time. If this is not desirable, for example if the water supply or pressure is inadequate to support two valves at a time, the TBM may be programmed to limit the WBR to the 100% allocated. If an overlap is acceptable, where the TBM has 24 VAC available to it from the controller power supply, the TBM may extend the time while the overlapping station goes on as directed by the controller. This independent monitoring and activation of individual stations allows for multiple programs to run concurrently.

Simplified versions of the TBM are also envisioned. While independent enabling outputs in the module allow for multiple program operation, this practice is not normally done in residential applications for the reasons cited above of limited water supply and operating pressure. In the cases where there are no simultaneous valve operations, the TBM can be simplified as follows: the outputs from the controller are still monitored. However, instead of enabling the individual output means, such as triacs or relays, when the WBR time duration on a station is reached, the common line is opened, terminating (all) valve operation. Once the 100% station duration is reached, the common is reconnected, allowing the next valve in sequence to operate until its WBR time duration is reached, and so on, until all the stations have completed their irrigation durations. See FIG. 13D. This design costs less to manufacture and has improved reliability due to its significantly decreased component count.

To allow for manual testing of certain valves for maintenance purposes, a TBM bypass means may be provided to allow fully timed manual activation without disrupting the maintenance function. Upon reversing the bypass, the WBR monitoring is resumed.

There are several advantages to temperature budgeting with a TBM over ET add on modules:
1. Since the TBM is pre-programmed with its calendar, programming the TBM may be as simple as entering the local zip code.
2. The TBM is compatible with all existing and new 24 VAC output controllers, of which there are over 1.5 million sold each year, and nearly 50 million in current use.
3. The TBM is very inexpensive to build, flexible, and qualifies for most government water conservation rebate programs.
4. There are no electrical safety issues with the TBM since it works with class 2 circuits which are considered safe by Underwriters Laboratories standards.
5. The TBM is easy to install and maintain.
6. There are no service fees associated with the TBM, which is a major drawback of other ET "add on" systems.

FOURTH EXAMPLE OF THE PRESENT INVENTION

Other embodiments of the temperature budgeting methods and apparatus are suitable for all applications: residential, commercial, or turf. In these embodiments, the irrigation schedule of any valve may be adjusted without making hardware or software changes to the controller in use. The valves, solenoids, and the wiring going to the valves are also largely unaffected, except for the installation of the TBM near the solenoids. Exemplary versions of the embodiments of the invention for these methods are described below, and shown in FIG. 13E.

In these embodiments, a TBM is housed in an outdoor (weather proof) enclosure. A temperature sensor is housed within a case in a manner ventilated to provide an accurate ambient temperature reading, in communication with the TBM. Ordinarily, the TBM is battery powered (because of its remote location near the valves), although other empowering means are possible such as a solar panel, or water flow or wind generated power—or AC, if available. Having an internal battery allows the module to be pre-programmed with its calendar and its local zip code and minimum irrigation temperature for convenience prior to installation. Or, the module may be provided with a means for programming the local zip code with, for example, dip switch(es), wireless programming, etc. As an example for entering the zip code via dip switches, dip switch could be set for zip code programming and the zip code entered as follows: (a) flip the numbered position on the dip switch corresponding with the first digit of the zip code to the "on" position for one second, then off; (b) flip the second digit of the 5 digit zip code for to "on" one second then off; (c) continue until all 5 digits are entered; (d) return the zip code programming dip switch to its "off" position. The 5 digit zip code is now programmed into this module. As described above, the zip code allows the unit to determine the local latitude and average summer high temperature for that location. The calendar day and month may be pre-programmed at the factory, or at the time of installation. A deviation of a few hours from the actual time will not significantly affect the RA factor daily selection.

If a minimum irrigation temperature is desired, it may be programmed wirelessly, as above, with a second dip switch that is labeled, for example, "min irr temp," or by other local means. For example, the same 10-position dip switch used to program the zip code may now be used to enter the minimum irrigation temperature, in conjunction with a mode switch (which could be a toggle or second dip switch) indicating whether the input is a zip code, a minimum temperature, or something else. Thus, if the desired minimum temperature is 36 F, in one embodiment a mode switch is set to indicate that the input is a minimum temperature; then the "3" switch on the 10 position switch is set to "on" then "off", followed by the same with the "6" switch.

Once the module is pre-programmed, it can be mounted on the valve(s) themselves, or separately such as on a short post or stake above ground next to the valves. If vandalism is a concern, the TBM can be mounted inside a cage that is commonly used to protect the controllers or backflow preventors. The wiring from any AC powered controller to the valves is interrupted by the module. Modules for any number of stations can be made available. One module can handle from one station to 8 for typical residential applications, or virtually an unlimited number for larger commercial applications. The common line and each of the solenoid lines from the controller are inputted to the module, and then output to the valves as shown in FIG. 13E. The microprocessor or microcontroller monitors the power (e.g. 24 VAC) from the controller output and "learns" the summer programmed run time for each station the first time each output is energized, as described previously. Starting with the next start of each station, the WBR is calculated and limits the timing of each station based upon that day's WBR.

The TBM itself may be modular. A base unit may incorporate the microprocessor or microcontroller with its PRISM data, zip code entry means, its temperature sensor, and battery. To this base unit, small modules may be plugged in to accommodate any number of individual modules which simply consist of output relays or triacs with their driving circuits and output indicator LEDs. These outputs may be plugged into their base or mother board. In these embodiments, the customer orders exactly the number of stations needed without unnecessary cost for unused stations.

For an example of temperature budgeted watering with one of these embodiments of the TBM, assume that the summer time for station 1 is 10 minutes, for station 2 (on a drip system) is 1 hour, and station 3 (on bubblers) is 14 minutes. If the WBR for that day is calculated at 80%, then station 1 valve will be cut off by the module after 8 minutes of watering, station 2 after 48 minutes, and station 3 after about 11 minutes. With independent station output control, any number of stations can be operated simultaneously if the water supply and pressure permit it. This is one of the limitations of currently available ET add-on modules for most commercial applications in that the common to all valves is cut off at one time.

If a minimum irrigation temperature is programmed, the microprocessor in the TBM checks the current or latest temperature reading to verify that it exceeds the set temperature. If it is below that temperature, it disables all the outputs and no irrigation occurs. If this feature is not programmed or the temperature is above the minimum point, it proceeds with its WBR function.

In a slight variation of this remote TBM method with respect to minimum irrigation temperature, the TBM may be programmed to inhibit irrigation if the maximum temperature of the previous day does not reach a set point. This implies that it was not warm enough to allow for a significant amount of evaporation and plant transpiration to warrant irrigation. This is common in winter in some parts of the country that allows for the shutting off of irrigation for weeks at a time.

An override may be provided in the TBM to allow for manual operation of valves for maintenance purposes. A reset mechanism may also be provided in the TBM to clear the microprocessor memory of the zip code, minimum temperature, etc.

FIFTH EXAMPLE OF THE PRESENT INVENTION

In this example, a temperature budgeting controller is programmed with its summer irrigation schedule. Because of the soil conditions, slope, and type of landscape vegetation, it is desirable in this example to only irrigate when an adequate minimum amount of irrigation water can efficiently water the plant root zone. This level is determined by experience to be, in this example, 60% of the normal summer station run time. So, the controller (or a CBM in communication with the controller, or a TBM in communication with the outputs from the controller) is programmed not to water if the water budget is less than 60%. Then the winter season arrives, and on a given day, it is not raining, and the temperature, for example, is above a set minimum operating temperature of 35 degrees Fahrenheit. The given day's calculated water budget is 10%. Since this is below the 60% threshold, no watering occurs that day. The next day, the budget is 14%, the following day 18%, and on the fourth day it is 20%. The total after four days is 62%. This exceeds the 60% minimum threshold. If there are no watering day restrictions in that community, (such as in the Los Angeles Metropolitan Water District) on the day the threshold is met (in this case, day four), the irrigation will now be permitted to occur (at 62% of the normal station run time), and the water budgeting accumulation will reset to zero. If the day the threshold is met (day four, in this example) is a non-watering day, the percentages continue to accumulate until an allowed watering day is reached. On the next such day, irrigation will then be permitted using the accumulated percentage of the normal station run time, and the accumulation will be reset to zero and start to accumulate for the next irrigation cycle. In this manner, the appropriate amount of water is supplied for the particular soil conditions on a permitted appropriate watering day.

SIXTH EXAMPLE OF THE PRESENT INVENTION

A Central Broadcast Module (CBM) may be placed in a central location in a new housing development tract, a park, a large school, or in a city, or the like. The CBM calculates the WBR and may have additional sensor inputs which allow it to modify the WBR as discussed herein such as wind sensor input, a rain sensor (such as a tipping bucket that measures rainfall), etc. Numerous remote controllers (or TBMs) are provided in residences, parks, schools, street medians, and/or other locations throughout the city, each having wireless communications means compatible with the CBM. The controllers or TBMs may all be addressed at the same time, or they may be individually addressable, or they may be addressed in different groups of controllers (e.g. programmed to respond to a given signal, different groups of controllers on the same radio frequency, and other groups on other frequencies, etc.). On a normal day, the WBR may be transmitted periodically (preferably daily) to these field controllers or TBMs. The controllers or TBMs can be AC, DC, solar, or ambient light powered, above the ground or inside valve boxes or inside garages in residential applications, or the like. During normal days, the WBR received by the controllers or TBMs from the CBM or central irrigation system computer will be used to either adjust the station run times, alter the watering intervals, or accumulate to alter one or more irrigation schedules within the controllers. Based upon the selected method, the field controllers or TBMs (or selected ones, or selected groups thereof—depending upon the established addressability) will water with the temperature budgeted "smart" water technology.

If sufficient recent rainfall has occurred, the broadcast WBR may be modified to transmit a very low number, such as a percentage that is below 1%, that is understood by the controllers or TBMs as a signal to shut down irrigation for that day. Upon the automated resetting of the rain sensor (if such a device is used), the irrigation cycles resume based upon the standard water budget calculations. A similar modification to the broadcast WBR may be used in case of excessively windy days, or any other abnormal conditions such as near freezing conditions.

In alternative embodiments, the CBM may be provided with a minimum water budget percentage (described in example five above), and accumulate percentages for a number of days until the minimum percentage is reached before broadcasting a signal to the controllers or TBMs to irrigate (i.e., a percentage of less than 1% is broadcast on the days before the accumulation reaches the minimum threshold). These embodiments may also take into account allowed watering days, such that the CBM broadcasts a signal (such as a percentage less than 1% that is understood as a no-watering signal) and continues accumulation until an allowed watering day, whereupon the accumulated percentage is then broadcast to the controllers or TBMs. If the power or communications fail, the controllers or modules will irrigate according to the last WBR received and will be updated when power returns or communications are re-established.

The advantages to this approach are as follows:
1. Insures controller shut down when irrigation is unnecessary or ineffective such as a rainy or very windy day where most of the sprinkler water would be blown onto the sidewalks or streets and running off.
2. In city owned landscaping, such as offices, parks, street medians, etc., the invention eliminates the requirement for city maintenance personnel to manually shut down the controllers, only to return one or a few days later to turn them back on.
3. Automatically saves water.
4. In the case of residential controllers, relieves the homeowners from the responsibility and inconvenience of remembering to shut down the controllers and then turn them back on on allowed watering days.
5. Since the controllers will preferably be programmed with a zip code, as described herein, the city may provide an override signal to certain zip codes to selectively and temporarily shut down certain parts of the city in case of drought created conditions or water delivery limitations By 2012, the State of California will require all irrigation controllers to be "smart." Effective Jul. 1, 2007, the Metropolitan Water District (MWD) of Los Angeles no longer rebates controllers that are not officially posted on the IA web site as having been successfully SWAT tested. Furthermore, nationally, the absence of a "WaterSense" label by the EPA will inhibit the sale of irrigation controllers throughout the U.S. For these reasons and for the purposes of the necessity of promoting water conservation, irrigation controller manufacturers are or will soon have to change the designs of dozens of their controller models to some form of "smart" controller. In spite of strong encouragement by water agencies (such as providing 100% price rebates), participation in the installation and use of ET based smart controllers has been minimal.

The MWD of Los Angeles reports less than 0.2 percent participation in their 100% rebate program. The SNWA reports less than 0.1% participation. Other water districts report similarly weak participation. The reasons for this minimal participation are as follows:

1. For areas that have no rebates, homeowners do not want to spend hundreds of dollars for a new controller.
2. Homeowners do not want to pay monthly ET based service fees for some of the ET based controllers.
3. Homeowners do not want to learn to program a difficult controller, nor pay for water audits or assistance in programming their new controller.
4. Some ET controllers require weather stations, which are either too expensive or too impractical to install.
5. Contractors do not have the time to learn to program the dozens of new controllers on the market, nor can they afford the callbacks to re-explain or reprogram the newly installed ET controllers.
6. With this minimal response to new ET controllers, controller manufacturers do not want to completely redesign their entire controller line.

The CBM offers a solution to most of the above listed resistance in the following manner:

1. The CBM may be provided with the zip code information, and calculates the WBR and $WBR_M$. This data is no longer required to be included within individual controllers themselves with the use of the CBM.
2. Virtually every irrigation controller has a manual water budget function whereby the user can manually change the station run time for all stations by a fixed percentage. The present invention automates that method with smart water technology.
3. Using the CBM would require some minor internal changing of the software and hardware of the controller, but in terms of user interface and front panel programming, the controller would look, install, and program identically to the controller they were using previously. This means that the only likely additional input required from the user would be the entry of location information such as the zip code—to match up with the broadcast from the CBM (broadcasts may be for specific zip codes or areas of the city). Such smart controllers would be useful in communities participating in a voluntary but automated shutdown of irrigation when it is raining or during extreme drought conditions.
4. The contractors would be already familiar with the installation and programming of this new controller since it would be virtually identical to the non-smart version.
5. The cost of the new controller would be minimally more than the old controller because only a simple receiver would be required for wireless reception. In many instances, controllers are already equipped with radio receivers used with their remote maintenance hand held units. The CBM transmitter could be easily designed to interface with the existing controller receiver.
6. The controller would qualify for rebates in most water districts because it is smart.
7. The controller should qualify for the WaterSense label.
8. The controller manufacturers could keep the same molded plastic or metal Housings.
9. There would be little or no training required for the manufacturing, marketing, or for the irrigation distributors.
10. Very little inventory change would be required by the manufacturers.
11. Years of engineering and development time and cost would be saved by the manufacturers.
12. Instructions for installing, programming, and using these new controllers would be minimally greater than for the existing controllers (just enter the local zip code) making them extremely user friendly.
13. It would be a simple task for a centrally located CBM with AC power to transmit over a large area to effectively shut down irrigation not only during rainy, windy, or cold days, but in case of a drought emergency by sending either a city-wide or a zip code or address selective signal for inhibiting irrigation.
14. A controller that is nearly as accurate as an ET based controller, reasonably priced, requires no weather station, has no service fees, and intuitively simple to program, implemented over a large area such as a city, will save much more water than one that cannot accomplish the above.

SEVENTH EXAMPLE OF THE PRESENT INVENTION

In embodiments made for communities that have watering day schedules (such as Clark County, Nev.) or communities that are promoting smart water technology, embodiments of the present invention may provide both smart technology and time of use within the controller, CBM, or TBM capabilities. In these embodiments, instead of broadcasting the shut down signal from a central location in the city, the time of use watering schedules (which may be season dependent) are pre-programmed within the irrigation controller and/or the CBM or TBM. By virtue of the entry of a zip code or other location parameter, the controller or TBM already knows the part of town where it is installed, and can be provided with the watering day schedule(s) for that location. Alternatively, the CBM may have this schedule, and simply broadcast a low water budget ratio signal (e.g. 1% or less). The controller or TBM is programmed to recognize that a WBR or $WBR_M$ below a certain value is to indicate that an inadequate amount of irrigation would occur because it would be of little or no value due to the time of year or the soil condition, the controller would terminate or not allow irrigation under these conditions. Note that no specific sensor data or rain shut down signal is sent to the controller, and that the irrigation is not shut down as is commonly done with rain switches by cutting off the controller output common to the valves. The built-in watering schedule determines whether or not it is a watering day for that zip code or that part of town and controls whether or not irrigation is to occur. Watering may then be allowed based upon the reaching of the set threshold water budget percentage, as described in example five above, or by means of proportionally reducing or increasing the station run times.

Alternately, depending upon the special conditions or limitations of the community, it may be more effective because of user participation to allow the use of the controller or TBM either as only a time of use unit that inhibits irrigation during published days of the week or times of the day depending on the time of the year, or as only a smart controller with the temperature budgeting technology.

EIGHTH EXAMPLE OF THE PRESENT INVENTION

In some embodiments, the calculated water budget ratio may be used to establish a watering interval. In these embodiments, the calculated ratio is converted into a number of days between 1 and 10. For example, a ratio of 20% converts to 5, so that the watering interval is 5 days; a ratio of 25% converts to 4, resulting in a watering interval of 4 days, and so on. Converted ratios are rounded to the closest whole number, for example a ratio of 30% will result in a watering interval of 3 days, but a ratio of 28% will result in an interval of 4 days.

In use, once the ratio is converted into a watering interval, these embodiments of the present invention prevent watering until the watering interval is reached. So, using the 20% figure above, this establishes a watering interval of 5 days. No watering is allowed until the fifth day following the day the ratio was established. When that day is reached, watering according to the full watering schedule is allowed to take place. Ratios calculated during the interim days are ignored. It is to be appreciated that if the watering day determined by the interval occurs on a day when watering is not permitted (e.g., the fifth day is a no-watering day), watering is prevented from day to day, until a day is reached when watering is permitted. Once the watering occurs, a new water budget ratio is then determined, and a new watering interval is established.

In the above example, if watering occurred on the fifth day, then on the sixth day a new ratio would be calculated and a new interval established. If that ratio is 31%, then the new interval is 3 days, and watering is prevented until that day is reached. Then, as above, that day is checked to determine if it is a no-watering day, watering is prevented until an allowed watering day is reached, watering eventually takes place, then a new watering interval is established, and so on.

POTENTIAL USES FOR THE PRESENT INVENTION

The Southern Nevada Water Authority (SNWA) includes Cark County, Nev. and includes Las Vegas. About 500,000 households comprise the area controlled by SNWA. For about 4 years, SNWA has instituted watering restrictions during various times of the year with six designated watering groups, A-F. These "Drought Watering Restrictions" are set forth in FIG. 21. After about 4 years of public education and levied fines for violators of these watering restrictions, SNWA is reporting about 30% compliance to these watering restrictions. This approach has saved a reasonable amount of water. The SNWA total annual water requirement is approximately 300,000 acre feet for residential and commercial use. For about two years, SNWA has encouraged the use of smart controllers by providing up to 50% rebates on the purchase and installation of smart controllers. Fewer than 200 rebates have been processed during this period out of the possible 500,000 potential users of smart controllers. When SNWA's allocation of water is inadequate, their cost to obtain private water is about $11,000 per acre foot. This cost per acre foot is far in excess of other non-desert communities. SNWA recently approved relaxation of watering day restrictions for customers who use smart controllers which are more expensive and much more complicated as we have previously discussed.

The present invention would satisfy the smart controller requirements in either a controller with smart water temperature budgeting technology, a TBM that works with any existing controller, or a CBM that can handle a multitude of controllers. The time of use module would automatically limit the watering to the prescribed day(s) of the week, and would satisfy the watering restrictions and eliminate unnecessary fines. However, this invention would be of greatest value to the SNWA region or other similar regions if the customer could select from either the smart technology or the time of use method, or both simultaneously in areas that have not relaxed the watering day restrictions. In these cases, the embodiment selected could, in some aspects, accumulate the water budget percentages and allow watering on the allowed days, saving both water and the infrastructure pumping and delivering demands. SNWA estimates that if a majority of their customers used either method, about 10% of the entire water needs of Clark County would be saved, or about 30,000 acre feet. In a year when 15,000 acre feet of water needs to be purchased from private entities to satisfy the water needs, this would save one hundred and sixty five million dollars in the cost of water alone, not counting the energy (pumping and delivery) costs. Offering customers a choice of simple smart technology such as offered by the current method, or an easily programmed time of use which are mostly or entirely subsidized by SNWA would strongly encourage residents of Clark County or any other area with similar water related issues to comply.

OTHER POTENTIAL USES OF THE PRESENT INVENTION

In many communities and municipalities, commercial controllers are scattered throughout the city in parks, street medians, schools, etc. These controllers are programmed from a central system in an office downtown. The central CPU has a custom program that can command these controllers remotely by radio, pager, or cell phone, satellite, or the like. Each controller can be addressed individually. The irrigation schedules are typically entered on the CPU and downloaded into the field or remote controllers. Each controller is equipped with a wireless transceiver that is compatible with the central system transceiver. The CPU continuously monitors each controller. An ET obtained from a weather station located near the CPU typically provides ET data that is used by such systems. As an alternative, water budgeting information can be provided by the present invention in numerous ways.

For example, a CBM may be mounted on the roof of the CPU office that can send the daily WBR or $WBR_M$ to the CPU that can then in turn communicate a modified irrigation schedule to the remote controllers at a cost of a fraction of a weather station. (See FIG. 16.) The controllers in the field do not need any modifications since they are "slaves" responding to the CPU. The only requirement is to make the signal from the CBM accessible to the CPU. During rainy days, the $WBR_M$ is a low water budget that is used by the CPU to signal the controllers to suspend irrigation. With these methods, no rain or wind switches or any other sensors need to be installed at each controller. Labor is saved because the field controllers do not have to be reprogrammed during or after rainfall, or during cold or windy days. The CBM could be hardwired or transmit the daily WBR to the CPU.

It is apparent from the foregoing that temperature budgeting offers a multitude of embodiments and methods of water conservation in a simple cost effective method can save much more water than any other method, including theoretical ET calculations.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. A method for controlling the use of irrigation water comprising the steps of:
   a. producing a water budget ratio using a measured high temperature for a current time period and non-evapotranspiration based geo-environmental data for a location;
   b. changing at least one irrigation schedule using said ratio.

2. The method of claim 1 comprising the additional step of modifying said water budget ratio based on the input from at least one environmental sensor.

3. The method of claim 2 wherein said at least one environmental sensor is selected form the group of: temperature, precipitation, solar, wind, humidity, and combination thereof.

4. The method of claim 1 wherein said at least one irrigation schedule is changed by multiplying at least one watering time period by said ratio.

5. A method for controlling the use of irrigation water comprising the steps of:
   a. establishing a watering threshold;
   b. producing periodic water budget ratios for a location using measured high temperatures for current time periods at said location and non-evapotranspiration based geo-environmental data for said location;
   c. accumulating said periodic water budget ratios over time; and
   d. allowing watering to take place when said accumulated ratios reach said threshold.

6. The method of claim 5 comprising the additional step of resetting said accumulated ratios after irrigation has taken place.

7. A method for controlling the use of irrigation water comprising the steps of:
   a. establishing a watering threshold;
   b. producing periodic water budget ratios for a location using measured high temperatures for current time periods at said location and non-evapotranspiration based geo-environmental data for said location;
   c. accumulating said periodic water budget ratios over time until said threshold is reached; and
   d. allowing watering to take place when both (i) said accumulated ratios have at least reached said threshold and (ii) watering is allowed.

8. A method for controlling the use of irrigation water comprising the steps of:
   a. producing a periodic water budget ratio for a location using a measured high temperature for a current time period at said location and non-evapotranspiration based geo-environmental data for said location;
   b. calculating a watering interval using said water budget ratio;
   c. preventing irrigation until said watering interval is reached.

9. A method of controlling a schedule of at least one electronically operated irrigation valve comprising the steps of:
   a. establishing a cumulative watering budget ratio threshold;
   b. calculating periodic water budget ratios by comparing stored geo-environmental data with current non-evapotranspiration geo-environmental data;
   c. accumulating said periodic water budget ratios until said threshold is reached;
   d. allowing irrigation to occur according to said accumulated ratios when said threshold is reached.

10. A method of controlling a schedule of at least one electronically operated irrigation valve comprising the steps of:
   a. establishing a watering budget ratio threshold;
   b. calculating periodic water budget ratios by comparing stored geo-environmental data with current non-evapotranspiration geo-environmental data;
   c. accumulating said periodic water budget ratios until a time when said threshold is reached;
   d. providing a schedule of allowed watering times; and
   e. allowing irrigation to occur according to said accumulated ratios when said threshold and an allowed watering time have been reached.

11. A method of controlling irrigation comprising the steps of:
   a. installing a module between an irrigation controller and at least one electronically operated valve, said module containing at least one schedule of allowed watering times not derived using evapotranspiration data;
   b. selecting one of said schedules; and
   c. disabling said at least one valve at times when watering is not allowed according to said selected schedule.

12. The method of claim 11 wherein said module is provided with programming to calculate a water budget ratio in said module without using evapotranspiration data.

13. The method of claim 12 comprising the additional steps of attaching an environmental sensor to said module, and providing programming to disable said at least one valve based on input from said sensor.

14. The method of claim 11 wherein said at least one schedule is a municipal watering schedule.

15. The method of claim 11 wherein said plurality of at least one schedule is a drought stage.

16. A method of affecting an irrigation schedule of a controller comprising the steps of:
   a. installing a programmable module between said controller and at least one electronically operated valve associated therewith, said module being in communication with at least one environmental sensor;
   b. programming said module with at least one schedule of allowed watering times;
   c. calculating a water budget ratio in said module without using evapotranspiration data;
   d. adjusting said irrigation schedule according to said water budget ratio; and
   e. disabling said at least one valve at times when watering is not allowed.

17. A method of affecting a watering schedule of at least one irrigation controller comprising the steps of:
   a. calculating a water budget ratio externally from said at least one controller without using evapotranspiration data;
   b. communicating a signal to at least one module provided between said at least one controller and at least one electronically operated valve, said signal containing said water budget ratio and one of the following: identification information, allowed watering times data, and combinations thereof; and
   c. said module adjusting said watering schedule according to said signal.

18. A method of affecting a watering schedule of at least one irrigation controller comprising the steps of:
   a. calculating a water budget ratio externally from said at least one controller without using evapotranspiration data;
   b. communicating a signal to at least one controller, said signal containing said water budget ratio and one of the following: identification information, allowed watering times data, and combinations thereof; and
   c. said controller adjusting said watering schedule according to said signal.

19. A method of affecting a watering schedule of at least one irrigation controller comprising the steps of:
   a. communicating a signal to at least one module provided between said at least one irrigation controller and at least one electronically operated valve, said signal containing one of the following: module identification information, allowed watering times data, environmental sensor data, and combinations thereof;
b. calculating a water budget ratio in said module without using evapotranspiration data;
c. determining in said module whether watering is allowed; and
d. said module adjusting said watering schedule according to said water budget ratio and allowed watering times data.

20. A method of affecting watering accomplished using an irrigation controller comprising the steps of:
a. providing a schedule of allowed watering times not derived using evapotranspiration data to said controller in communication with at least one irrigation valve; and
b. said controller disabling said at least one valve at times when watering is not allowed according to said schedule.

21. A method of affecting a watering schedule of at least one irrigation controller comprising the steps of:
a. providing said controller with a schedule of allowed watering times;
b. calculating a water budget ratio without using evapotranspiration data;
c. adjusting said watering schedule according to said watering times and said water ratio.

22. An irrigation control device comprising a programmable module provided between an irrigation controller and at least one electronically operated valve, said module further comprising:
a. at least one input for communication with a controller output;
b. at least one output for communication with said at least one valve;
c. at least one separate input for receiving a schedule of allowed watering times;
d. a microprocessor with programming to calculate a water budget without using evapotranspiration data, and programming to disable said controller output at times when watering is not allowed; and
e. at least one environmental sensor in communication with said microprocessor.

23. An irrigation control device comprising:
a. a central broadcasting unit, said broadcasting unit further comprising:
(1) a microprocessor with data storage and programming to calculate a water budget ratio without using evapotranspiration data;
(2) at least one environmental sensor in communication with said microprocessor;
(3) at least one input for receiving a schedule of allowed watering times;
(4) a transmitter for broadcasting a signal that includes one of the set of: a water budget ratio, identification information, allowed watering data, and combinations thereof; and
b. at least one programmable module provided between an irrigation controller and at least one electronically operated valve, said module further comprising:
(1) a microprocessor with programming to perform one of the set of: interpreting said identification information, implementing said water budget ratio, disabling said at least one valve at times when watering is not allowed, and combinations thereof;
(2) a receiver for receiving said broadcast signal;
(3) at least one input to said microprocessor for communication with a controller output; and
(4) at least one output from said microprocessor for communication with said at least one valve.

24. An irrigation control device comprising:
a. a central broadcasting unit, said broadcasting unit further comprising:
(1) a microprocessor with data storage and programming to calculate a water budget ratio without using evapotranspiration data;
(2) at least one environmental sensor in communication with said microprocessor;
(3) at least one input for receiving a schedule of allowed watering times;
(4) a transmitter for broadcasting a signal that includes one of the set of: said water budget ratio, identification information, allowed watering data, and combinations thereof; and
b. at least one programmable controller in communication with at least one electronically operated valve, said controller further comprising:
(1) a microprocessor with programming to perform one of the set of: interpreting said identification information, implementing said water budget ratio, disabling said at least one valve at times when watering is not allowed, and combinations thereof;
(2) a receiver for receiving said broadcast signal; and
(3) at least one output from said microprocessor for communication with said at least one valve.

25. An irrigation control device comprising:
a. a central broadcasting unit, said broadcasting unit further comprising:
(1) a microprocessor in communication with at least one input for receiving a schedule of allowed watering times;
(2) a transmitter for broadcasting a signal that includes one of the set of: identification information, allowed watering data, and combinations thereof; and
b. at least one programmable module provided between an irrigation controller and at least one electronically operated valve, said module further comprising:
(1) a microprocessor with data storage and programming to calculate a water budget ratio without using evapotranspiration data, and programming to perform one of the set of: identifying said module, implementing said water budget ratio, disabling said at least one valve at times when watering is not allowed, and combinations thereof;
(2) a receiver for receiving said broadcast signal; and
(3) at least one environmental sensor in communication with said microprocessor;
(4) at least one input to said microprocessor for communication with a controller output; and
(5) at least one output from said microprocessor for communication with said at least one valve.

26. An irrigation control device comprising:
a. a central broadcasting unit, said broadcasting unit further comprising:
(1) a microprocessor in communication with at least one input for receiving a schedule of allowed watering times;
(2) a transmitter for broadcasting a signal that includes one of the set of: identification information, allowed watering data, environmental sensor data and combinations thereof; and
b. at least one programmable module provided between an irrigation controller and at least one electronically operated valve, said module further comprising:

(1) a microprocessor with data storage and programming to calculate a water budget ratio without using evapotranspiration data, and programming to perform one of the set of: identifying said module, implementing said water budget ratio, disabling said at least one valve at times when watering is not allowed, and combinations thereof;

(2) a receiver for receiving said broadcast signal; and (3) at least one input to said microprocessor for communication with a controller output; and (4) at least one output from said microprocessor for communication with said at least one valve.

27. An irrigation control device comprising a programmable irrigation controller in communication with at least one electronically operated valve, said controller further comprising a microprocessor with non-evapotranspiration based programming to select a schedule of allowed watering times and programming to disable said at least one valve according to said schedule.

28. An irrigation control device comprising a programmable irrigation controller in communication with at least one electronically operated valve, said controller further comprising a microprocessor with programming to select a schedule of allowed watering times, to calculate a water budget ratio without using evapotranspiration data, and to alter a watering schedule for said at least one valve according to said water budget and schedule.

29. A device for altering the schedule of at least one electronically operated irrigation valve comprising a programmable module in communication with said valve, said module further comprising a microprocessor adapted to receive a schedule of allowed watering times, and to receive a threshold watering percentage, said microprocessor including programming to calculate a water budget ratio without using evapotranspiration data, and programming to alter said watering schedule for said at least one valve according to one of the following: said water budget ratio, said threshold percentage, said schedule, and combinations thereof.

30. The device of claim 29 wherein said microprocessor is further adapted to receive location information.

31. An irrigation controller comprising:
a. a power source;
b. a microprocessor with programming to calculate a water budget without using evapotranspiration data;
c. at least one water control switch in communication with said microprocessor.

32. An apparatus for adjusting an irrigation schedule of at least one controller comprising:
a. a means for calculating a water budget without using evapotranspiration data;
b. a means for communicating said water budget to one of the group of (i) said at least one controller and (ii) an electronic module provided between a controller and its associated valves; and
c. a means for changing said irrigation schedule using said water budget.

33. The apparatus of claim 32 wherein said communication means is selected from the group of wired and wireless.

34. The apparatus of claim 32 wherein said water budget is modified by an input from a sensor selected from the group of: precipitation, temperature, solar, wind, humidity, and combinations thereof.

35. The apparatus of claim 32 wherein said at least one controller is remotely located from said apparatus.

36. The apparatus of claim 32 wherein said at least one controller is powered by one of the group of: AC, DC, solar power, battery power, wind power, water power, and ambient light power.

37. A method of adjusting a station operating time of at least one irrigation controller comprising the steps of:
a. calculating a water budget without the use of evapotranspiration data;
b. communicating said water budget to said at least one controller; and
c. adjusting said station operating time with said water budget.

38. The method of claim 37 comprising the additional step of modifying said water budget by an input from a sensor selected from the group of: precipitation, temperature, solar, wind, humidity, and combinations thereof.

39. The method of claim 37 comprising the additional steps of accumulating said water budgets over time until a predetermined threshold is attained, and using said accumulated budgets to adjust said schedule.

40. A method of altering an irrigation schedule of at least one satellite controller from a central computer in communication with said at least one controller comprising the steps of:
a. providing said central computer with a non-evapotranspiration based water budget;
b. broadcasting said water budget to said at least one controller; and
c. said at least one controller modifying an irrigation schedule using said water budget.

41. A method of altering an irrigation schedule of at least one satellite controller from a central computer in communication with said at least one controller comprising the steps of:
a. said central computer calculating a non-evapotranspiration based water budget;
b. broadcasting said water budget to said at least one controller; and
c. said at least one controller modifying an irrigation schedule using said water budget.

42. A method of adjusting a station operating time of at least one controller comprising the steps of providing said controller with a non-evapotranspiration based water budget, and changing said station operating time according to said budget.

43. The method of claim 42 comprising the additional step of modifying station operating time using said water budget.

44. The method of claim 42 comprising the additional steps of:
a. accumulating said water budgets; and
b. preventing irrigation until the accumulation of said water budgets reaches a predetermined threshold.

45. The method of claim 42 comprising the additional step of altering an irrigation cycle to start at intervals based upon said water budget.

46. The method of claim 42 wherein said water budget is provided by wireless means.

47. A method of adjusting a watering cycle of at least one irrigation controller comprising the steps of periodically calculating a water budget using non-evapotranspiration based geo-environmental data, and modifying said watering cycle using said water budget.

48. The method of claim 47 comprising the additional steps of:
a. accumulating said water budgets; and
b. preventing irrigation until the accumulation of said water budgets reaches a predetermined threshold.

49. The method of claim 47 comprising the additional step of starting an irrigation cycle at a watering interval based upon said calculated water budget.

50. An irrigation controller comprising:
   a. att least one environmental sensor in communication with a microprocessor;
   b. said microprocessor being capable of calculating a non-evapotranspiration based water budget using input from said at least one sensor; and
   c. an output switch in communication with said microprocessor.

51. The controller of claim 50 wherein said at least one environmental sensor is selected from the group of: temperature, precipitation, wind, humidity, solar radiation and combinations thereof.

52. The controller of claim 50 wherein said at least one sensor communicates with said controller by a means selected from the group of wired and wireless.

53. A central budgeting module for altering a cycle of at least one field irrigation controller comprising:
   a. a microprocessor with programming to calculate a non-evapotranspiration based water budget;
   b. at least one environmental sensor in communication with said microprocessor;
   c. a means of communicating said water budget to said at least one controller, and
   d. a means in said controller for altering said cycle according to said water budget.

54. The module of claim 53 wherein said at least one environmental sensor is selected from the group of: temperature, precipitation, wind, humidity, solar radiation and combinations thereof.

55. The module of claim 53 said at least one sensor communicates with said controller by a means selected from the group of wired and wireless.

56. The module of claim 53 wherein said module is powered by one of the group of: AC, DC, solar power, battery power, wind power, water power, and ambient light power.

57. A method for providing a water budget to a controller within an enclosure comprising the steps of:
   a. providing a temperature sensor at a location within said controller enclosure that is near ground level; and
   b. the controller calculating said water budget using data from said temperature sensor without using evapotranspiration data.

58. A self-contained smart irrigation device comprising:
   a. an irrigation controller mounted within an outdoor enclosure;
   b. a temperature sensor mounted within said enclosure, and
   c. a microprocessor capable of calculating a water budget without using evapotranspiration data.

59. The controller of claim 58 further comprising a precipitation sensor associated with said enclosure in communication with said microprocessor for providing data used in calculating said water budget.

60. A method of governing the output of an irrigation controller comprising the steps of:
   a. providing a programmable module on a common output line between said controller and at least one valve associated with said controller;
   b. programming said module with a set of watering restrictions not derived using evapotranspiration data; and
   c. disabling the common line to said at least one valve during said watering restrictions.

61. The method of claim 60 comprising the additional step of modifying said watering restrictions according to one or more drought stages.

62. A device for controlling the output of an irrigation controller to comply with restricted watering schedules comprising:
   a. a power source;
   b. a module with a memory containing at least one pre-defined watering schedule not derived using evapotranspiration data that complies with said restricted watering schedules;
   c. a means for selecting one of said pre-defined watering schedules; and
   d. at least one cutoff switch connected to said controller output.

63. The device of claim 62 further comprising a display with data input means.

64. The device of claim 62 further comprising an override function.

65. The device of claim 62 further comprising a battery voltage monitoring function.

66. The device of claim 62 wherein said power source is selected from the group of AC, DC, solar, and ambient light.

67. The device of claim 62 wherein said device is battery powered.

68. A method of governing the output of an irrigation controller comprising the steps of:
   a. attaching a device containing locally set restricted watering schedules not derived using evapotranspiration data to the output of an existing irrigation controller; and
   b. cutting off at least one output of said controller based upon said at least one restricted watering schedule.

69. A method of adjusting an irrigation schedule of at least one irrigation controller comprising the steps of:
   a. calculating a water budget without the use of evapotranspiration data;
   b. communicating said water budget to said at least one controller; and
   c. adjusting said irrigation schedule with said water budget.

70. A method of governing the operation of at least one valve of an irrigation controller comprising the steps of:
   a. placing an electronic module having a switch on a common line between said controller and said at least one valve;
   b. providing said module with at least one schedule of allowed watering times;
   c. establishing a watering threshold;
   d. producing periodic water budget ratios for a location using input from at least one environmental sensor at said location and non-evapotranspiration based geo-environmental data for said location;
   e. accumulating said periodic water budget ratios until said threshold is reached; and
   f. closing said switch to allow operation of said valves when both (i) said accumulated ratios have at least reached said threshold and (ii) watering is allowed according to said schedule.

71. A method of governing the operation of at least one valve of an irrigation controller comprising the steps of:
   a. installing an electronic module having a switch on a line between said controller and said at least one valve;
   b. providing said module with a schedule of allowed watering times;
   c. calculating a water budget ratio in said module without using evapotranspiration data; and
   d. said module controlling the operation of said at least one valve by opening and closing said switch according to said allowed watering times and said water budget ratio.

* * * * *